(12) United States Patent
Inatani et al.

(10) Patent No.: US 6,683,829 B2  
(45) Date of Patent: Jan. 27, 2004

(54) DISC CHANGER APPARATUS

(75) Inventors: Akihisa Inatani, Kanagawa (JP); Shinji Ito, Tokyo (JP); Harutoshi Yoshimura, Saitama (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 09/947,524

(22) Filed: Sep. 7, 2001

(65) Prior Publication Data

US 2002/0036956 A1 Mar. 28, 2002

(30) Foreign Application Priority Data

Sep. 8, 2000 (JP) ........................................ 2000-274204

(51) Int. Cl.[7] .............................................. G11B 17/22
(52) U.S. Cl. ..................................................... 369/30.85
(58) Field of Search ............................ 369/30.77, 30.78, 369/30.85, 30.87, 30.92, 30.98

(56) References Cited

U.S. PATENT DOCUMENTS

| | | | | |
|---|---|---|---|---|
| 5,210,728 A | * | 5/1993 | Noguchi et al. | 369/30.78 |
| 5,528,442 A | * | 6/1996 | Hisatomi | 369/191 |
| 6,262,963 B1 | * | 7/2001 | Nakamura et al. | 369/191 |

FOREIGN PATENT DOCUMENTS

| | | | | |
|---|---|---|---|---|
| JP | 2000057678 A | * | 2/2000 | G11B/17/26 |
| JP | 2000082251 A | * | 3/2000 | G11B/17/30 |
| JP | 2000100051 A | * | 4/2000 | G11B/17/26 |

\* cited by examiner

*Primary Examiner*—William Klimowicz  
(74) *Attorney, Agent, or Firm*—Oblon, Spivak, McClelland, Maier & Neustadt, P.C.

(57) ABSTRACT

A disc changer apparatus includes a disc table, reproducing device, a first tray, a second tray, containing device, and movement device. The first tray carries a disc mounted thereon between a loading position at which a disc is loaded and a mounting position at which a disc is mounted on the disc table and between the disc mounting position and a containing position at which a disc is contained. The second tray is engaged with the first tray, to carry the first tray between the disc loading position and the disc mounting position. The containing device stacks and contains the first trays in a stacking direction substantially perpendicular to principal planes of discs mounted on the first trays. The moving device moves at least one of the first trays contained in the containing device in one direction based on the stacking direction, to form a containing space for containing the first tray located at the disc mounting position on the side, opposed to the side of the one direction, of the containing device.

15 Claims, 68 Drawing Sheets

F I G. 55
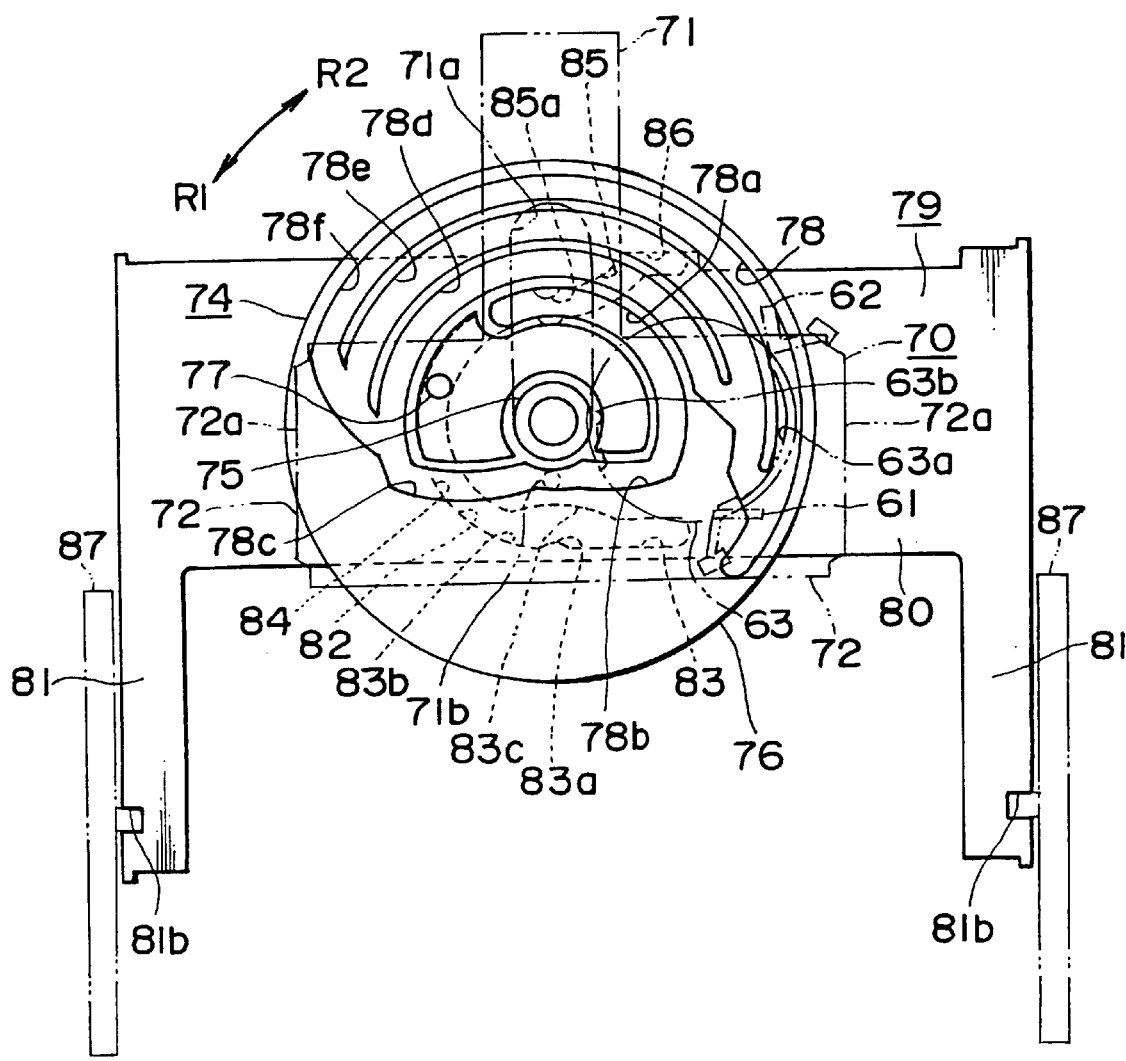

F I G. 74
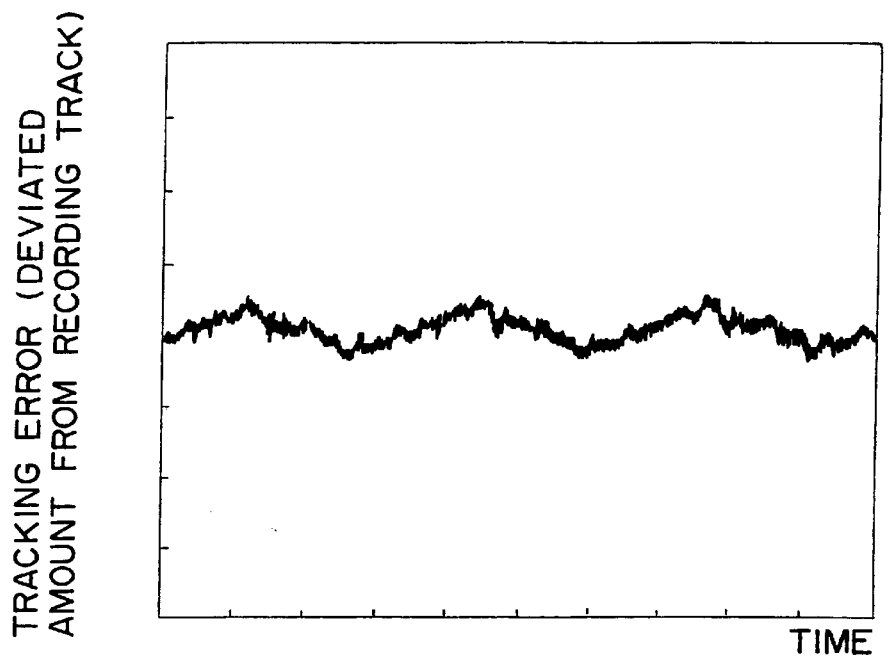
VIA RELAY BOARD (INNER PERIPHERAL PORTION OF DISC-LIKE RECORDING MEDIUM)
F I G. 75
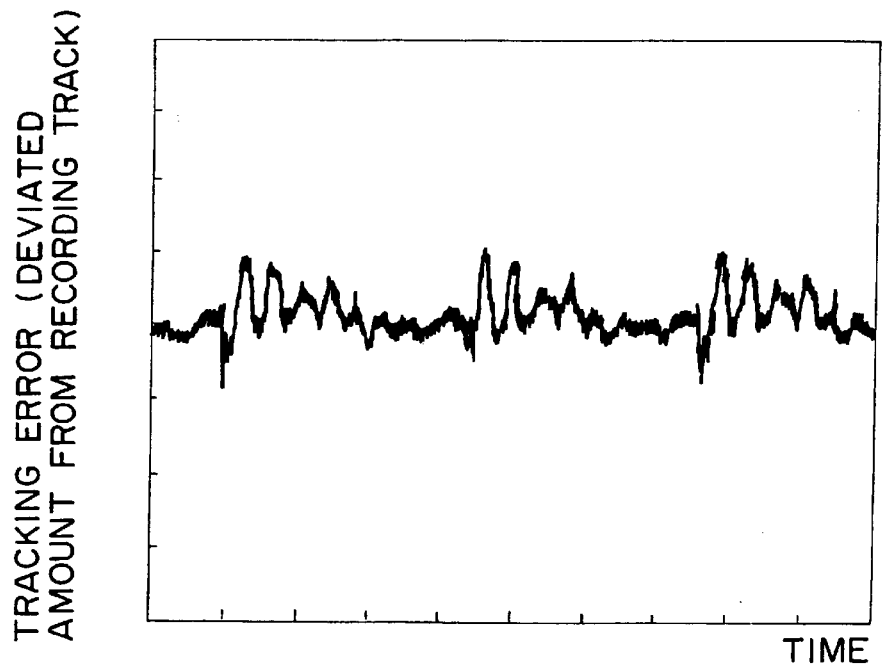
NOT VIA RELAY BOARD (INNER PERIPHERAL PORTION OF DISC-LIKE RECORDING MEDIUM)

VIA RELAY BOARD (INTERMEDIATE PORTION OF DISC-LIKE RECORDING MEDIUM)

NOT VIA RELAY BOARD (INTERMEDIATE PORTION OF DISC-LIKE RECORDING MEDIUM)

DISC CHANGER APPARATUS

BACKGROUND OF THE INVENTION

The present invention relates to a disc changer apparatus, and particularly to a technical field of a disc changer apparatus for suitably selecting one of a plurality of disc-like recording media inserted in a housing and performing reproduction of information from the selected recording medium and the like.

Known disc changer apparatuses have a configuration including trays for carrying disc-like recording media, a stocker having a plurality of containing portions for separately containing the disc-like recording media mounted on the trays, and a drive portion for recording or reproducing information signals on or from a desired one of the disc-like recording media carried by the trays.

One of these related art disc changer apparatuses is of a type in which at the time of containing a disc-like recording medium in the stocker, the stocker is lifted or lowered to contain the disc-like recording medium in an empty containing portion.

In the above-described related art disc changer apparatus in which the stocker is lifted or lowered to contain a disc-like recording medium in an empty containing portion, it is required to provide a specialized lifting/lowering mechanism, a sensor for detecting an empty containing portion, and the like, and further to provide a specialized motor for operating the lifting/lowering mechanism in addition to a motor for carrying the trays. As a result, there occurs a problem in increasing the number of parts, thereby obstructing the reduction in production cost.

On the other hand, there is known a disc changer apparatus intended to reduce the number of parts, which includes a plurality of containing portions for containing disc-like recording media, wherein roulette type trays serving as a stocker are rotated to exchange the disc-like recording media from each other; however, in such a disc changer apparatus, since the disc-like recording media are contained on one plane, there occurs a problem in increasing the entire size of the disc changer apparatus.

SUMMARY OF THE INVENTION

An object of the present invention is to reduce the number of parts of a disc changer apparatus and to miniaturize the disc changer apparatus.

To achieve the above object, according to a first aspect of the present invention, there is provided a disc changer apparatus including:

a disc table rotating together with a disc mounted thereon;

reproducing means for reproducing information from a disc rotating together with the disc table;

a first tray for carrying a disc mounted thereon between a loading position at which a disc is loaded and a mounting position at which a disc is mounted on the disc table and between the disc mounting position and a containing position at which a disc is contained;

a second tray which is engaged with the first tray for carrying the first tray between the disc loading position and the disc mounting position;

containing means for stacking and containing a plurality of the first trays in a stacking direction substantially perpendicular to principal planes of discs mounted on the first trays; and moving means for moving at least one of the first trays contained in the containing means in one direction based on the stacking direction, to form a containing space for containing the first tray located at the disc mounting position on the side, opposed to the side of the one direction, of the containing means.

With this configuration, unlike the related art disc changer apparatus in which the stocker is lifted/lowered to contain a tray in an empty containing portion, it is possible to eliminate the need of provision of a specialized lifting/lowering mechanism, a sensor for detecting an empty containing portion, and the like, and hence to correspondingly reduce the number of parts. This is advantageous in reducing the production cost.

Since the sub-trays can be stacked in the stocker without use of roulette type trays serving as the stocker in consideration of reduction in the number of parts, the disc changer apparatus can be miniaturized.

According to a second aspect of the present invention, there is provided a disc changer apparatus including:

a base unit including a disc table rotating together with a disc mounted thereon and reproducing means for reproducing information from a disc rotating together with the disc table;

a sub-tray for carrying a disc mounted thereon between a loading position at which a disc is loaded and a mounting position at which a disc is mounted on the disc table and between the disc mounting position and a containing position at which a disc is contained;

a main tray which is engaged with the sub-tray for carrying the sub-tray between the disc loading position and the disc mounting position;

a stocker lifted or lowered relative to the main tray, the stocker internally having a plurality of containing portions allowed to stack a plurality of the sub-trays in the lifting/lowering direction of the stocker;

a cam gear rotated by a drive motor;

a first slider which is moved, along with rotation of the cam gear, in a carrying direction where the sub-trays are carried so as to carry the main tray and the sub-trays in the carrying direction along with movement of the first slider in the carrying direction;

a second slider having a cam groove formed into a stepped shape in the lifting/lowering direction of the stocker, wherein the second slider is moved in the carrying direction along with rotation of the cam gear so as to control lifting/lowering operations of at least the base unit and the stocker by the cam groove formed in the second slider; and movement means which is lifted or lowered together with the base unit along with movement of the second slider so as to move at least one of the sub-trays contained in the stocker in the lifting or lowering direction to form one containing portion for containing the sub-tray located at the disc mounting position on the side, opposed to the side of the lifting or lowering direction, of the plurality of containing portions.

With this configuration, since the first slider and the second slider are selectively moved in the longitudinal direction by rotation of the cam gear rotated by a motor to move the main tray and the sub-trays and lift or lower the base unit and the stocker, it is possible to more reduce the number of parts.

In the disc changer apparatus according to the second aspect, preferably, the cam gear has a cam groove in one surface and an engagement pin on the other surface; the first slider has a cam groove in which the engagement pin of the cam gear is to be engaged; and the cam groove of the first slider has a first projection for moving, when the sub-tray is moved from the disc containing position to the disc mounting position, the first slider to a first position corresponding to the disc mounting position, and a second projection for moving, when the sub-tray is moved from the disc loading position to the disc mounting position, the first slider to a second position offset to the disc containing position side from the first position corresponding to the disc mounting position.

With this configuration, when the sub-tray is moved from the disc containing position to the disc mounting position, the engagement pin of the cam gear is moved in the movement direction from the disc containing position to the disc mounting position by an amount corresponding to the projecting amount of the first projection, while when the main tray is moved from the pull-out position to the disc mounting position, the engagement pin of the cam gear is moved in the movement direction from the pull-out position to the disc mounting position by an amount corresponding to the projecting amount of the second projection. As a result, it is possible to certainly move the sub-tray and the main tray to the disc mounting position.

The disc changer apparatus according to the second aspect, preferably, further includes a housing provided to cover the components of the disc changer apparatus; a control circuit board provided in the housing and having at least a control circuit for controlling the motor; a relay board provided in the housing and electrically connected to the control circuit board via a flexible board; and a main board provided in the housing, the main board being electrically connected to the relay board via a flexible board so as to control at least power supply to the control circuit board via the relay board.

With this configuration, since a vibration system generated at the time of reproducing the disc-like recording medium and the like is ended in the disc changer apparatus and is less affected by another connection line led from the relay board and connected to the main board, it is possible to reduce occurrence of tracking errors and hence to optimize the operation of reproducing signals recorded on a disc-like recording medium and the like.

BRIEF DESCRIPTION OF THE DRAWINGS

In the drawings showing an embodiment of a disc changer apparatus of the present invention, in which FIGS. 1 to 44 are for illustrating the configuration of the disc changer apparatus and FIGS. 45 to 73 are for illustrating the operation of the disc changer apparatus, wherein:

FIG. 1 is a schematic front view of acoustic equipment provided with a disc changer apparatus;

FIG. 2 is a plan view of a housing of the disc changer apparatus;

FIG. 3 is a plan view showing the housing in which a cover body, a unit holder, and the like are arranged;

FIG. 4 is a plan view of a main tray;

FIG. 5 is a rear view of the main tray;

FIG. 6 is a plan view showing a state in which the main tray is connected to a sub-tray;

FIG. 7 is a plan view showing another state in which the main tray is connected to the sub-tray;

FIG. 8 is a side view of the main tray;

FIG. 9 is an enlarged perspective view of a lock lever;

FIG. 10 is a plan view of a rack member;

FIG. 11 is a side view of the rack member;

FIG. 12 is an enlarged plan view of the sub-tray;

FIG. 13 is an enlarged bottom view of the sub-tray;

FIG. 14 is an enlarged plan view showing the unit holder on which a base unit is arranged;

FIG. 15 is an enlarged side view showing the unit holder on which the base unit is arranged;

FIG. 16 is an enlarged sectional view showing the unit holder on which the base unit is arranged;

FIG. 17 is an enlarged plan view showing a chucking member on which a chucking pulley is supported;

FIG. 18 is an enlarged sectional view showing the chucking member on which the chucking pulley is supported;

FIG. 19 is an enlarged plan view of a stocker;

FIG. 20 is an enlarged bottom view of the stocker;

FIG. 21 is an enlarged side view of the stocker;

FIG. 22 is an enlarged perspective view of a restricting member;

FIG. 23 is an enlarged rear view, with parts partially cutaway, showing a state before the sub-tray is lifted up;

FIG. 24 is an enlarged rear view, with parts partially cutaway, showing a state that the sub-tray is lifted up;

FIG. 25 is an enlarged right side view of a hold-down member;

FIG. 26 is an enlarged rear view of the hold-down member;

FIG. 27 is an enlarged left side view of the hold-down member;

FIG. 28 is an enlarged side view showing the inner surface of a lifting/lowering slider;

FIG. 29 is an enlarged side view showing the outer surface of the lifting/lowering slider;

FIG. 30 is an enlarged side view of a lock releasing lever;

FIG. 31 is a plan view showing a main mechanism arranged on the housing;

FIG. 32 is a schematic enlarged plan view showing the main mechanism;

FIG. 33 is a schematic enlarged plan view showing another main mechanism;

FIG. 34 is an enlarged plan view of a drive force transmission slider;

FIG. 35 is an enlarged bottom view of the drive force transmission slider;

FIG. 36 is an enlarged plan view of a cam gear;

FIG. 37 is an enlarged bottom view of the cam gear;

FIG. 38 is an enlarged plan view of the slider for movement;

FIG. 39 is an enlarged bottom view of the slider for movement;

FIG. 40 is an enlarged side view of a drive rack;

FIG. 41 is an enlarged plan view of the drive rack;

FIG. 42 is a side view showing a mechanism arranged on a side surface of the housing;

FIG. 43 is an enlarged bottom view showing a control circuit board and a relay board;

FIG. 44 is an enlarged front view of a rear surface panel;

FIG. 45 is a side view showing a state (initial state) that the main tray is located at a pull-out position;

FIG. 46 is a side view, with parts partially cutaway, showing initial states of the unit holder on which the base unit is arranged and the chucking member for supporting the chucking pulley;

FIG. 47 is a side view showing initial states of the chucking member for supporting the chucking pulley and the stocker;

FIG. 48 is an enlarged plan view showing initial states of the cam gear and the like;

FIG. 49 is a side view showing a state that the main tray is located at a disc mounting position;

FIG. 50 is an enlarged plan view showing states of the cam gear and the like when the main tray is located at the disc mounting position and the unit holder is located at a lower position;

FIG. 51 is a side view showing a state that the main tray is located at the disc mounting position and the unit holder is halfway through lifting;

FIG. 52 is a side view showing states of the chucking member and the like when the disc-like recording medium is chucked;

FIG. 53 is a side view, with parts partially cutaway, showing the states of the unit holder and the like when the disc-like recording medium is chucked;

FIG. 54 is an enlarged side view, with parts partially cutaway, showing a state that the unit holder is positioned to the sub-tray;

FIG. 55 is an enlarged plan view showing states of the cam gear and the like when information is reproduced from the disc-like recording medium;

FIG. 56 is a side view showing a state that the chucking of the disc-like recording medium is released;

FIG. 57 is an enlarged plan view showing states of the cam gear and the like when the chucking of the disc-like recording medium is released;

FIG. 58 is an enlarged side view, with parts partially cutaway, showing a state that the locking of the sub-tray is released;

FIG. 59 is a side view showing a state that the sub-tray is contained in the stocker;

FIG. 60 is a side view showing a position of the stocker and the like when the sub-trays are contained in the stocker;

FIG. 61 is an enlarged plan view showing states of the cam gear and the like when the sub-trays are contained in the stocker;

FIG. 62 is an enlarged plan view showing states of the cam gear and the like when the stocker is located at an intermediate position;

FIG. 63 is a side view showing a state that the stocker is lowered to the intermediate position;

FIG. 64 is a side view showing a state that the sub-tray is pulled out of a second containing portion;

FIG. 65 is an enlarged plan view showing states of the cam gear and the like when the sub-tray is pulled out of the second containing portion;

FIG. 66 is an enlarged plan view showing states of the cam gear and the like when the stocker is lowered to the lower end;

FIG. 67 is a side view showing a state that the stocker is lowered to the lower end;

FIG. 68 is a side view, with parts partially cutaway, showing a state that the unit holder is tilted when the stocker is lowered to the lower end;

FIG. 69 is a side view showing a state that the sub-tray is pulled out of a first containing portion;

FIG. 70 is an enlarged plan view showing states of the cam gear and the like when the sub-tray is pulled out of the first containing portion;

FIG. 71 is a side view, with parts partially cutaway, showing a state that the sub-tray contained in the stocker is lifted up;

FIG. 72 is a conceptual view showing a state that one of gear teeth of a second side surface gear is in contact with the corresponding one of one-sided wall planes of rack teeth of a rack portion for illustrating backlash between the rack portion and the second side surface gear;

FIG. 73 is a conceptual view, similar to FIG. 72, showing a state that one of gear teeth of the second side surface gear is in contact with the corresponding one of the other sided wall planes of the rack teeth of the rack portion;

FIG. 74 is a graph showing an experimental example for examining an occurrence state of tracking errors in the case where a control circuit board is connected to a main board via a relay board, wherein values measured at an inner peripheral portion of a disc-like recording medium are shown;

FIG. 75 is a graph showing an experimental example for examining an occurrence state of tracking errors in the case where the control circuit board provided in the disc changer apparatus is connected to the main board provided outside the disc changer apparatus not via the relay board, wherein values measured at the inner peripheral portion of the disc-like recording medium are shown;

DESCRIPTION OF THE INVENTION

Hereinafter, embodiments of a disc changer apparatus of the present invention will be described with reference to the accompanying drawings.

Figure 1:
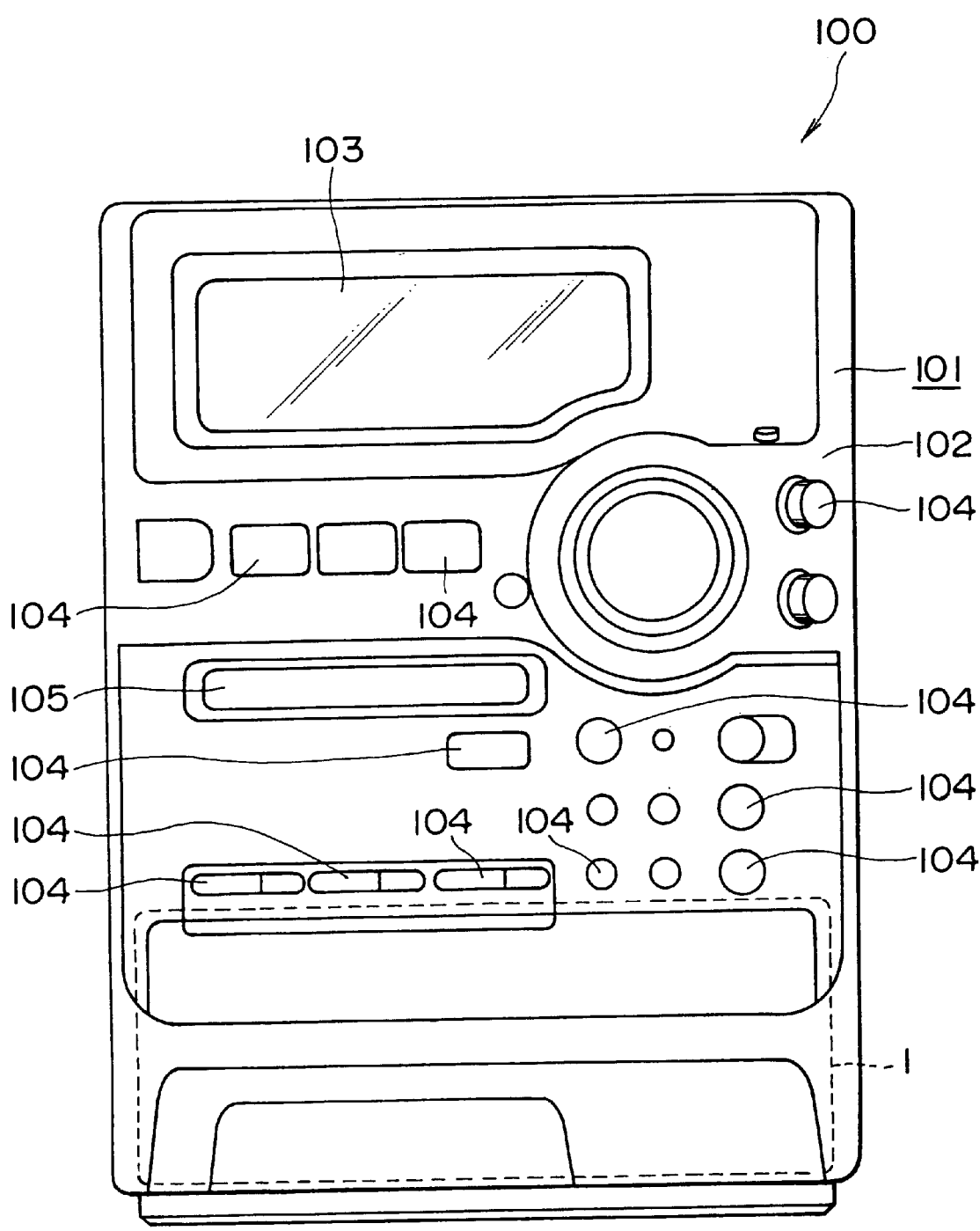

Referring to FIG. 1, there is shown acoustic equipment 100 including, in an outer housing 101, a disc changer apparatus 1 and the other necessary units. Concretely, a front panel 102 of the outer housing 101 has a liquid crystal display unit 103 located on the upper end side and the disc changer apparatus 1 located on the lower end side; a plurality of operating buttons 104; and a slot 105 allowing a disc-like recording medium having a diameter of about 64 mm (Minidisc, trade name) to be inserted in the acoustic equipment 100 therethrough in order to record or reproduce information signals on or from the recording medium. The acoustic equipment 100 also has a radio unit.

Figure 2:
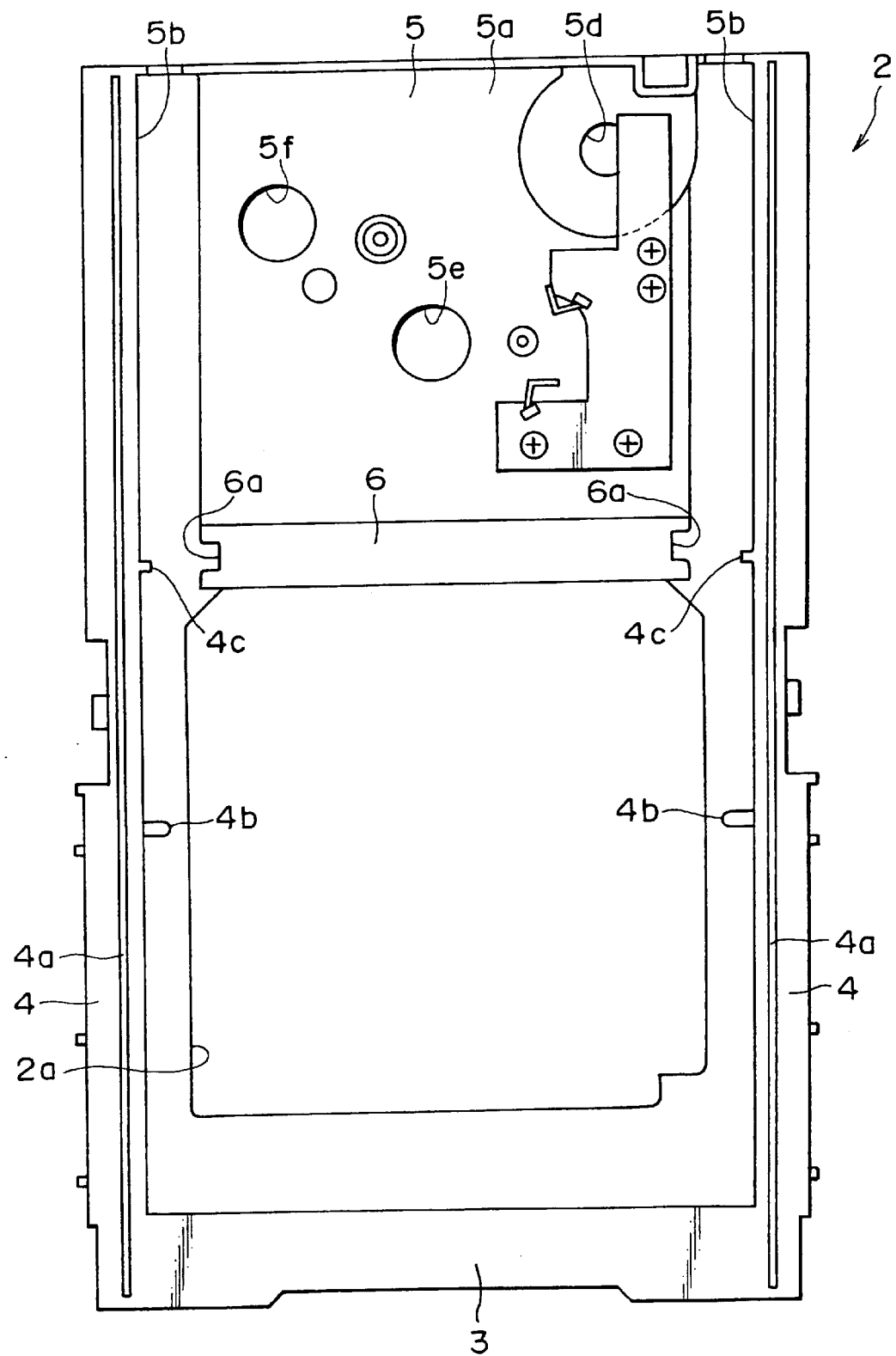
Figure 3:
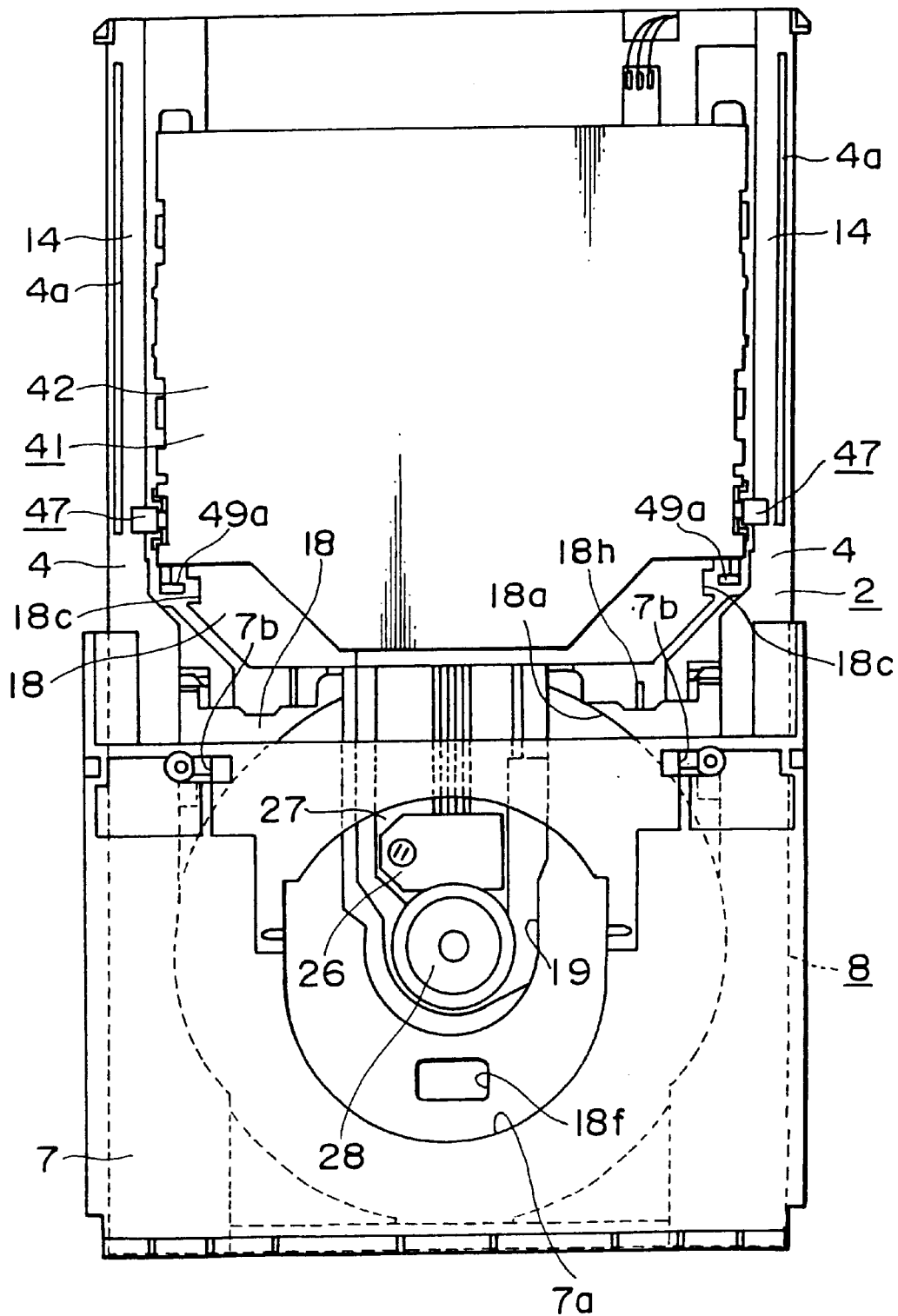

The disc changer apparatus 1 has necessary members and mechanism in a housing 2 as shown in FIGS. 2 and 3.

Figure 42:
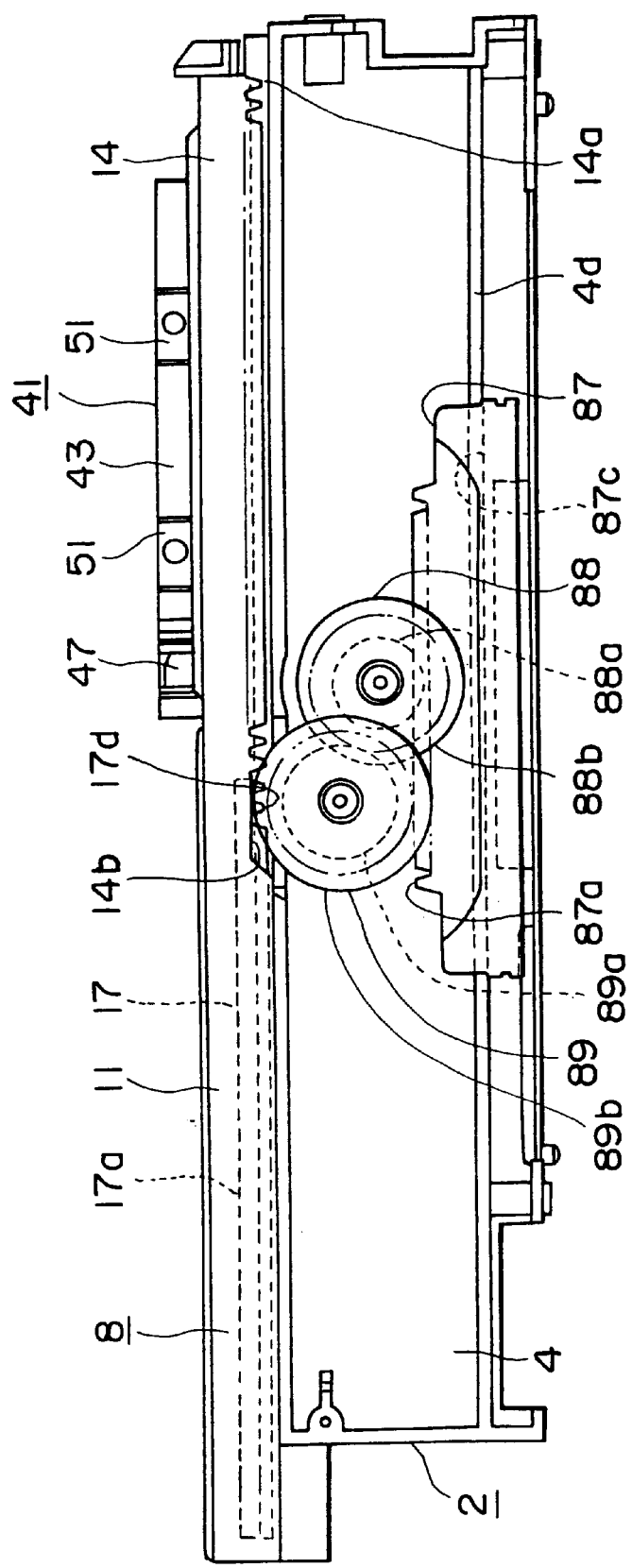

The housing 2 formed into a vertically-elongated shape has a front surface portion 3 and both side surface portions 4 extending rearward from both side edges of the front surface portion 3 (see FIGS. 2 and 42). The side surface portions 4 are each formed into an approximately rectangular shape extending longer in the longitudinal direction. Rear half portions of the side surface portions 4 are connected to each other by an arrangement plate portion 5. The upper surface of each side surface portion 4 has a slightly wide width in the lateral direction, and has a guide projection 4a extending in the longitudinal direction. The inner surface of each side surface portion 4 has, at a position slightly offset from a central portion in the longitudinal direction, a lever supporting pin 4b projecting inward therefrom. The inner surface of each side surface portion 4 also has, at a position slightly offset from the central portion in the longitudinal direction, a guide projection 4c projecting inward therefrom. The outer surface of each side surface portion 4 has, at a position near the lower end, a guide rail 4d extending in the longitudinal direction (see FIG. 42).

The arrangement plate portion 5 is formed as a flat-plate like gear arrangement portion 5a except for right and left end portions of the arrangement plate portion 5. Both right and left sides of the gear arrangement portion 5a are formed into two slider arrangement groove portions 5b opened upward. The slider arrangement groove portions 5b each extend to the front end portion of the housing 2 (see FIG. 2). The back surface of the bottom surface portion forming each slider arrangement groove portion 5b has a guide rail 5c extending to a position near the front end of the side surface portion 4 (see FIG. 43).

The arrangement plate portion 5 has a motor shaft insertion hole 5d located at a rear end portion, a first gear insertion hole 5e located at a central portion, and a second gear insertion hole 5f located at a position near the rear end. The arrangement plate portion 5 also has, at a central portion of the back surface, a guide projection 5g extending in the longitudinal direction (see FIG. 33).

A portion on the front side of the gear arrangement portion 5a is formed as a stepped portion 6 higher than the gear arrangement portion 5a. The stepped portion 6 has, on both right and left side edges, two supporting grooves 6a extending in the vertical direction (see FIG. 2). The housing 2 has a large arrangement space 2a located in front of the arrangement plate portion 5.

The front half portion of the housing 2 is covered with a cover body 7 (see FIG. 3). The cover body 7 made from a transparent material has, at a central portion, a pulley insertion hole 7a. The upper surface of the cover body 7 has, at two positions near the rear ends of right and left end portions, two supporting groove portions 7b.

A main tray 8 is longitudinally movably supported on the housing 2 (see FIG. 3). The main tray 8 has a receiving surface portion 9, a front end portion 10 erected from the front end of the receiving surface portion 9, two side portions 11 erected from both side edges of the receiving portion 9, and two hold-down portions 12 projecting from the upper edges of the side portions 11 in the direction where the hold-down portions 12 become closer to each other (see FIGS. 4 to 8). Both the side edges of the front end portion 10 are continuous to the front edges of the side portions 11 and right end left end portions of the upper edge of the front end portion 10 are continuous to the front edges of the hold-down portions 12, to form two insertion portions 13 opened inward and rearward on the right and left sides of the main tray 8.

Figure 5:
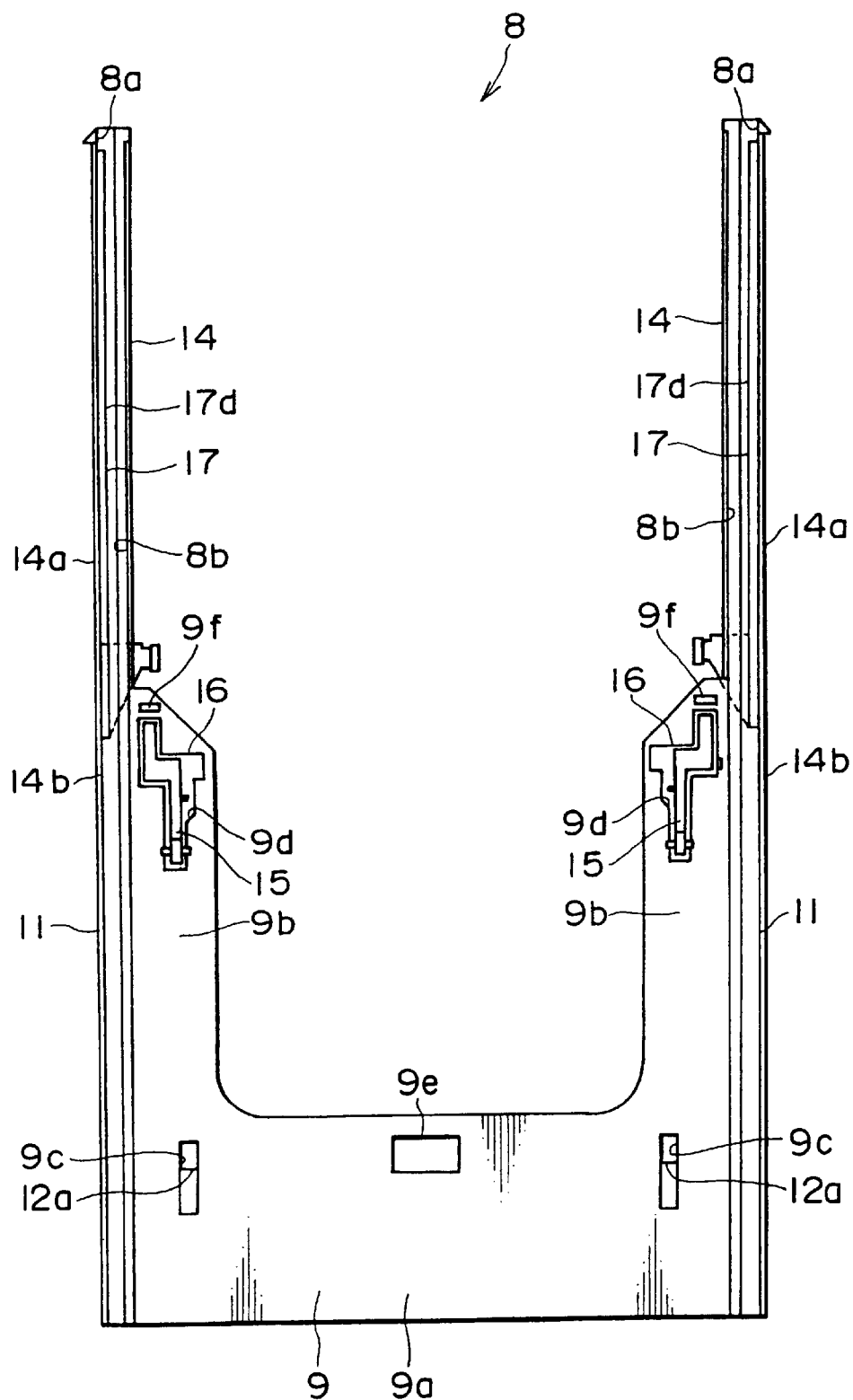

The receiving surface portion 9 includes a base portion 9a which is continuous to the front end portion 10 and is formed into an approximately rectangular shape laterally elongated, and two projections 9b projecting rearward from right and left ends of the base portion 9a. The base portion 9a has, at both right and left end portions, two positioning holes 9c extending longer in the longitudinal direction. Each projection 9b has, at a rear end portion, a lock lever arrangement hole 9d. The receiving surface portion 9 has, at a central portion in the lateral direction, a through-hole 9e. The receiving surface portion 9 also has, on its back surface, two projecting pieces 9f to be restricted (see FIG. 5). As shown in FIG. 5, the projecting pieces 9f are positioned directly at the back of the lock lever arrangement holes 9d.

Each hold-down portion 12 has a positioning hole 12a formed directly over the positioning hole 9c. The length of the positioning hole 12a in the longitudinal direction is shorter than the length of the positioning hole 9c in the longitudinal direction.

The main tray 8 also has two leg portions 14 projecting rearward from the rear edges of both the side portions 11. Each leg portion 14 has, at the lower edge of an outer surface portion, a rack portion 14a (see FIGS. 5 and 8). A portion, continuous to the side portion 11, of the leg portion 14 is notched so as to be opened outward, which portion is taken as a notch portion 14b with no rack portion 14a (see FIGS. 5 and 8).

The main tray 8 has, in portions positioned directly inward from the rack portions 14a, two sliding grooves 8a which are open downward and extend in the longitudinal direction. Each sliding groove 8a extends from a front end portion of the side portion 11 to a rear end portion of the leg portion 14 (see FIG. 5). The main tray 8 also has, in portions positioned directly inward from the sliding grooves 8a, grooves 8b to be supported which are opened downward and extend in the longitudinal direction.

Figure 4:
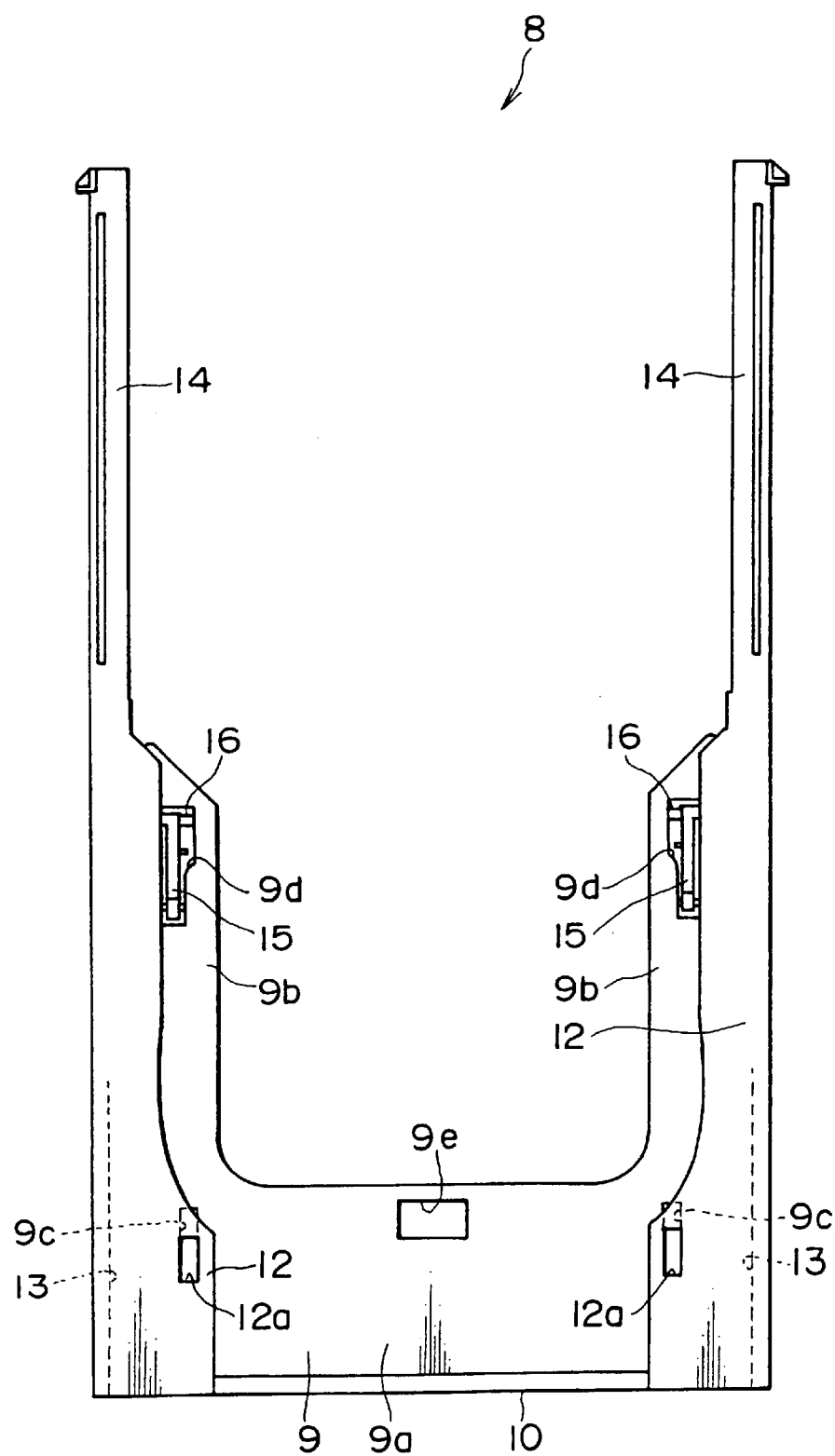
Figure 7:
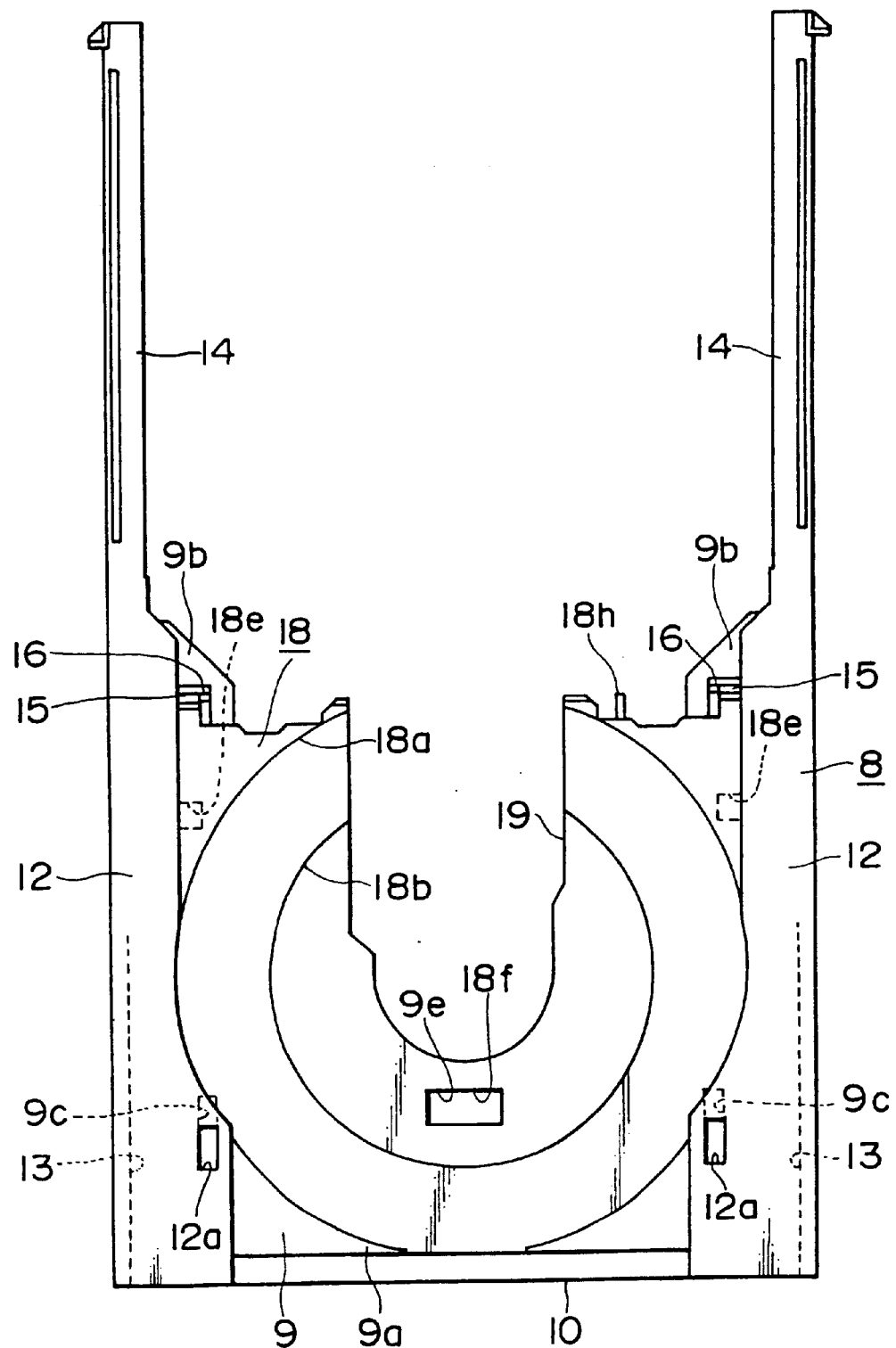
Figure 9:
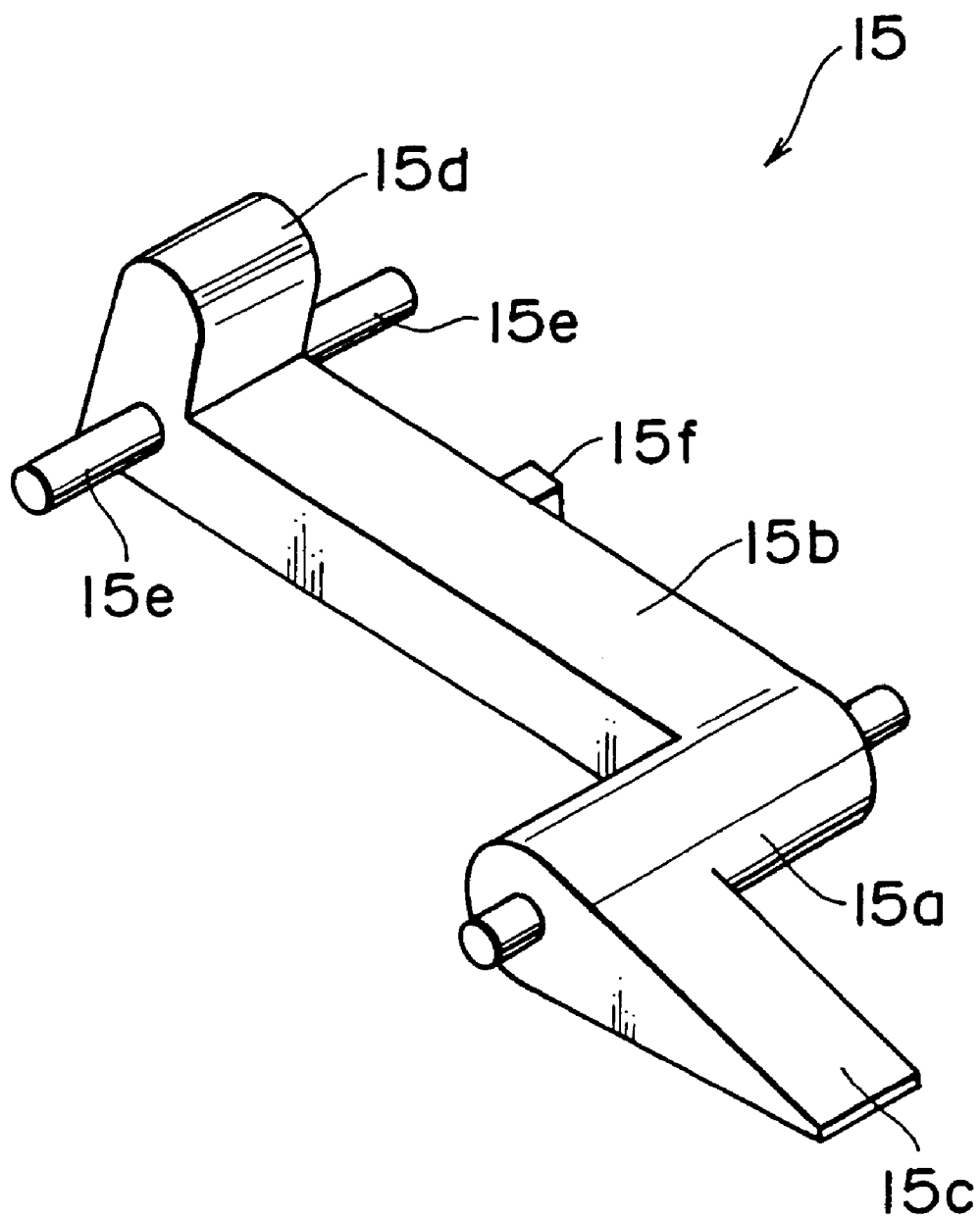

A lock lever 15 is turnably supported in each of the lock lever arrangement holes 9d of the main tray 8 (see FIGS. 4, 7 and 9). Referring to FIG. 9, the lock lever 15 integrally includes a supporting shaft portion 15a extending longer in the lateral direction, an extending portion 15b projecting approximately forward from the supporting shaft portion 15a, and a portion 15c to be operated which projects approximately rearward from the supporting shaft portion 15a. The lock lever 15 further includes a lock projection 15d disposed at a front end portion of the extending portion 15b in such a manner as to project upward therefrom, two turning restricting projections 15e disposed at the front end portion of the extending portion 15b in such a manner as to project therefrom in the lateral direction, and a spring receiving projection 15f disposed at a position, near the supporting shaft portion 15a, of the extending portion 15b.

Each lock lever 15 is supported in the lock lever arrangement hole 9d in such a manner that the supporting shaft portion 15a is turnably supported by part of the opening edge of the lock lever arrangement hole 9d and the lock projection 15d is biased by a torsion coil spring 16 in the direction where the lock projection 15d is moved up. The torsion coil spring 16 is arranged such that a coil portion thereof is wound around the supporting shaft portion 15a; one end portion thereof is brought into elastic-contact with the spring receiving projection 15f; and the other end portion thereof is brought into elastic-contact with the back surface of the receiving surface portion 9 of the main tray 8. With this arrangement of the torsion coil spring 16, since the turning restricting projections 15e are brought into elastic-contact with the back surface of the receiving surface portion 9, the turning of the lock lever 15 in the direction where the lock projection 15d is moved up is restricted.

Figure 8:
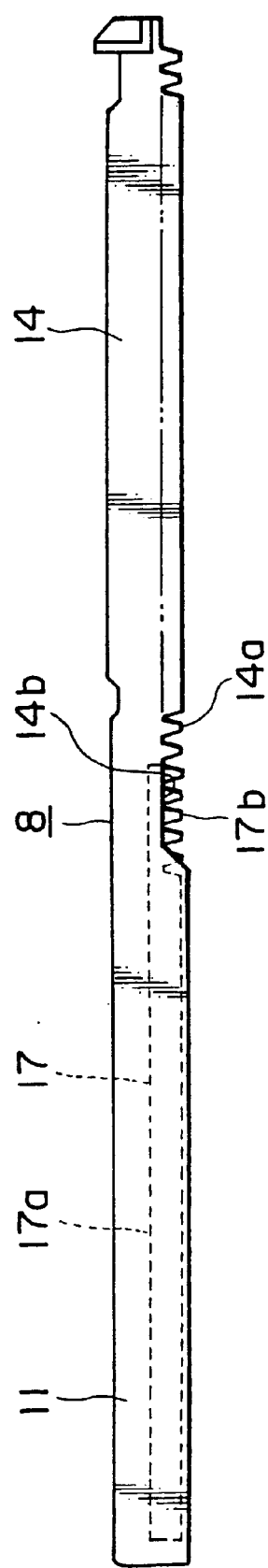
Figure 10:
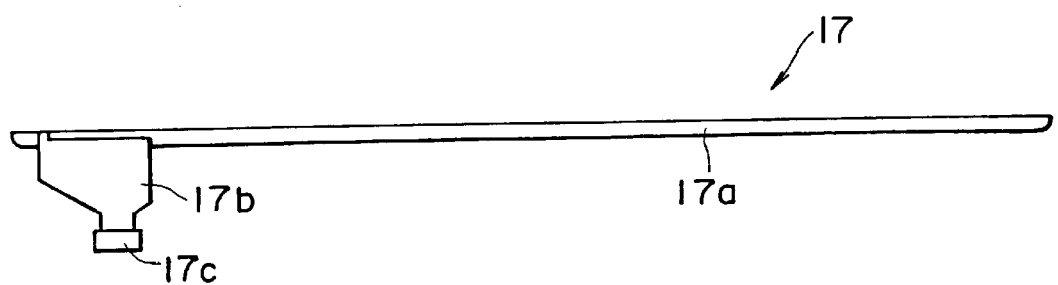
Figure 11:
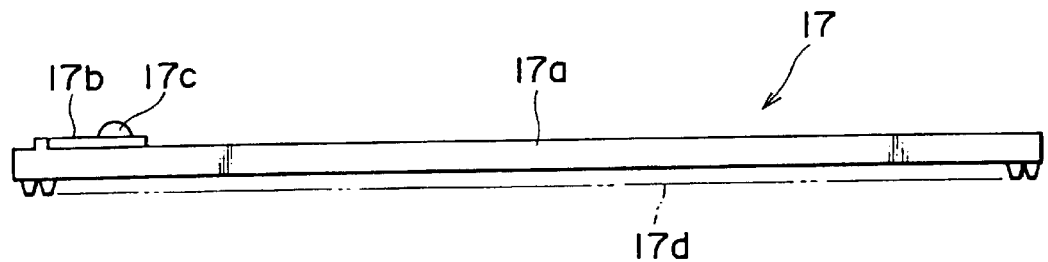
Figure 12:
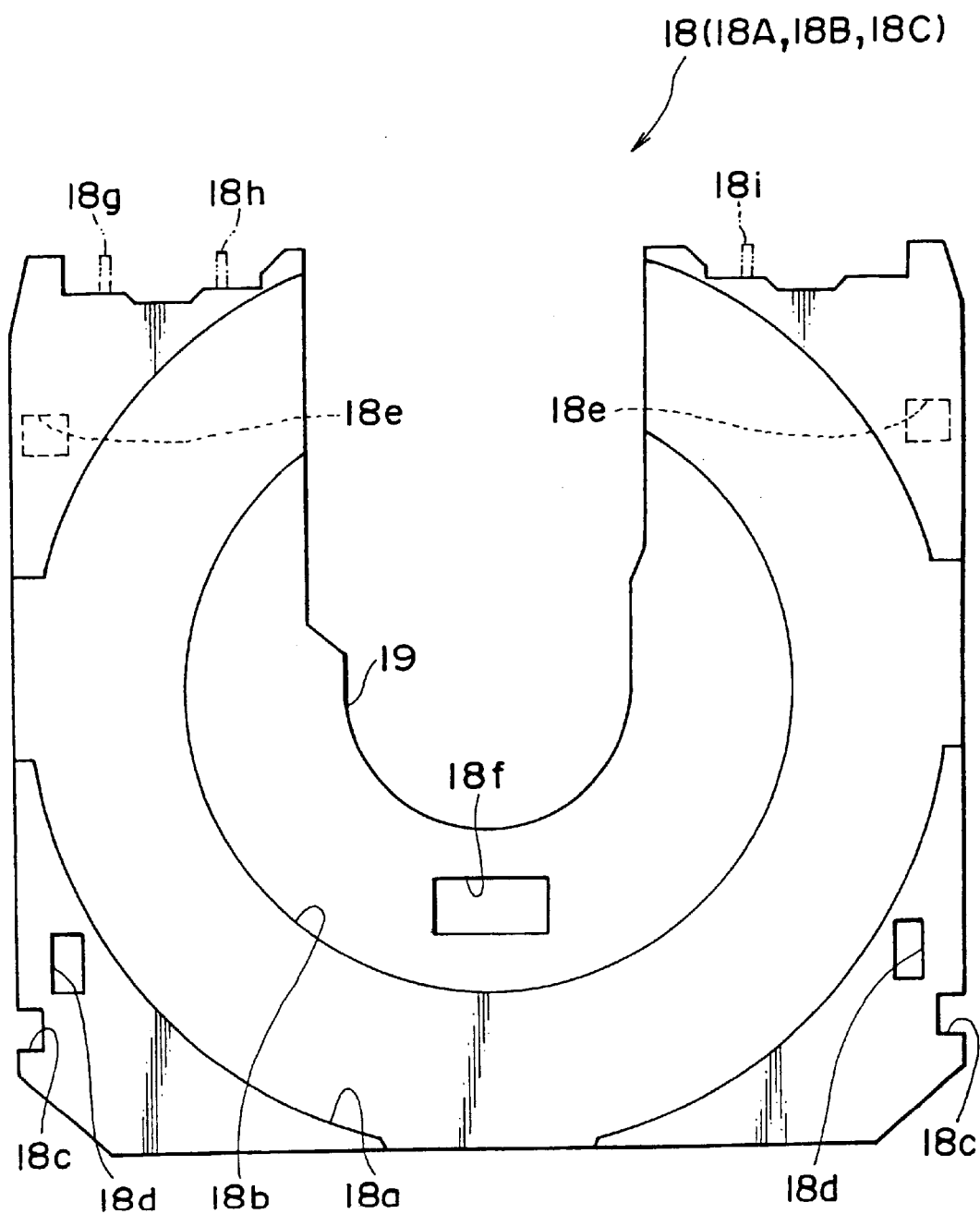
Figure 13:
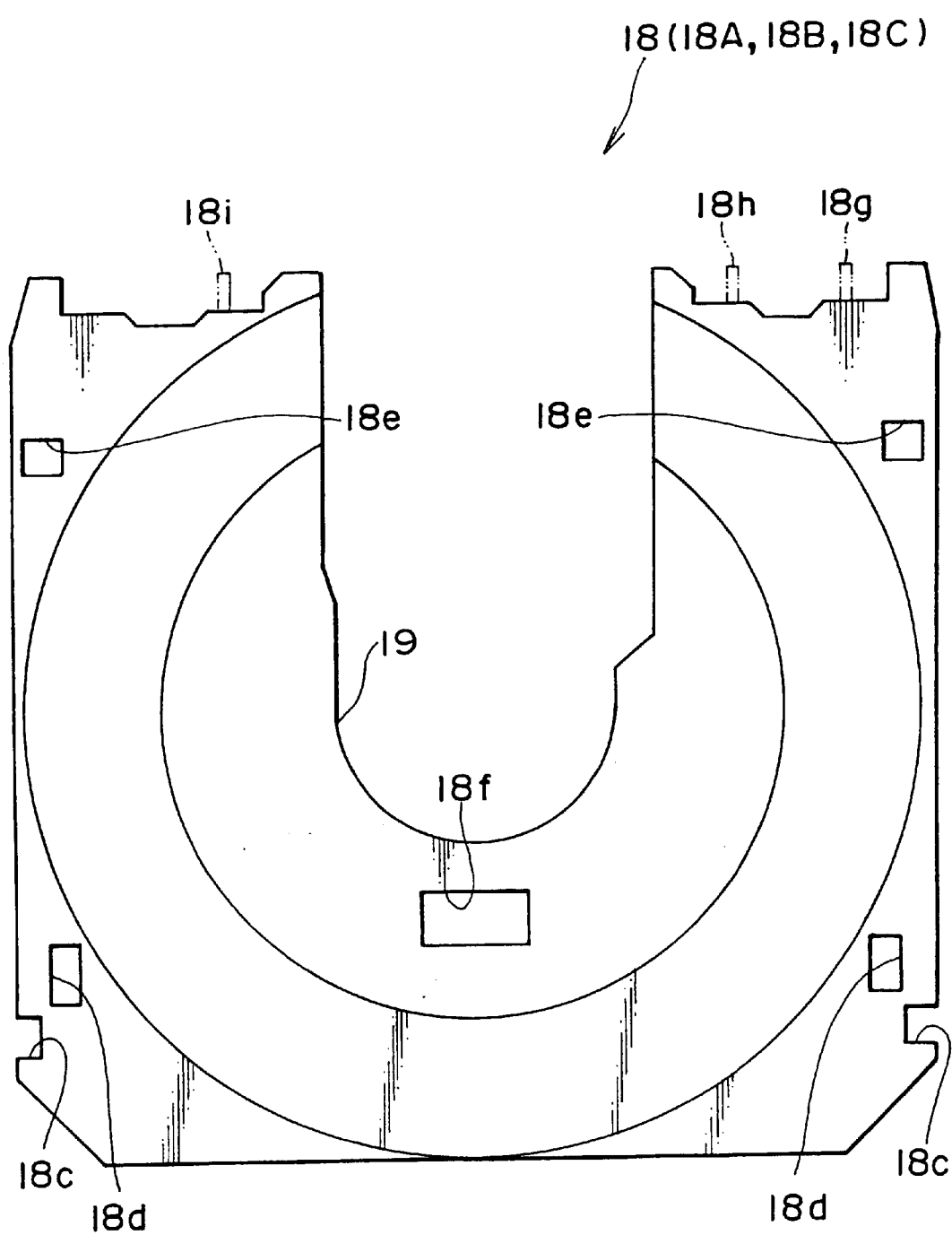

Two rack members 17 are movably supported in the sliding grooves 8a of the main tray 8 (see FIGS. 8, 10 and 11). Referring to FIGS. 10 and 11, each rack member 17 integrally includes a plate-like main portion 17a extending longer in the longitudinal direction, a projection 17b projecting inward from a front end portion of the main portion 17a, and a connecting portion 17c provided at the leading end of the projection 17b. The lower edge of the main portion 17a, which is provided with a rack, is taken as a rack portion 17d.

The main portion 17a of each rack member 17 is inserted in and supported by the sliding groove 8a, and the connecting portion 17c thereof is insertable in a connecting groove 18c of a sub-tray 18 (which will be described later).

The grooves 8b to be supported of the main tray 8 are slidably supported by the guide projections 4a provided on the upper surfaces of the side surface portions 4 of the housing 2, whereby the main tray 8 becomes movable in the longitudinal direction.

The sub-tray 18, on which a disc-like recording medium is to be mounted, includes a first mounting recess 18a on which a disc-like recording medium having a diameter of about 12 cm is to be mounted, and a second mounting recess 18b, deeper than the first mounting recess 18a, on which a disc-like recording medium having a diameter of about 8 cm is to be mounted (see FIGS. 6, 7, 12 and 13) The sub-tray 18 has a large insertion notch 19 extending inward from the rear end of the sub-tray 18 to a central portion of the mounting recess 18b.

The sub-tray 18 has, at right and left side edges on the front end side, two connecting grooves 18c opened outward and has, at right and left side edge portions on the front end side, two positioning holes 18d. The length of the positioning hole 18d in the longitudinal direction is the same as the length of the positioning hole 9c of the main tray 8. The back surface of the sub-tray 18 has, at right and left end portions on the rear end side, two locking recesses 18e. The sub-tray 18 also has, at a position near the front end of the second mounting recess 18b, a through-hole 18f.

The disc changer apparatus 1 is provided with three pieces of the sub-trays 18, which are taken as sub-trays 18A, 18B and 18C (see FIGS. 12 and 13) Each of the sub-trays 18A, 18B and 18C has a light shielding projecting piece 18g, 18h or 18i. These sub-trays 18A, 18B and 18C are identical to each other in shape and size except for formation position of the light shielding projecting piece. To be more specific, the sub-tray 18A has the light-shielding projecting piece 18g; the sub-tray 18B has the light-shielding projecting piece 18h; and the sub-tray 18C has the light shielding projecting piece 18i.

Figure 6:
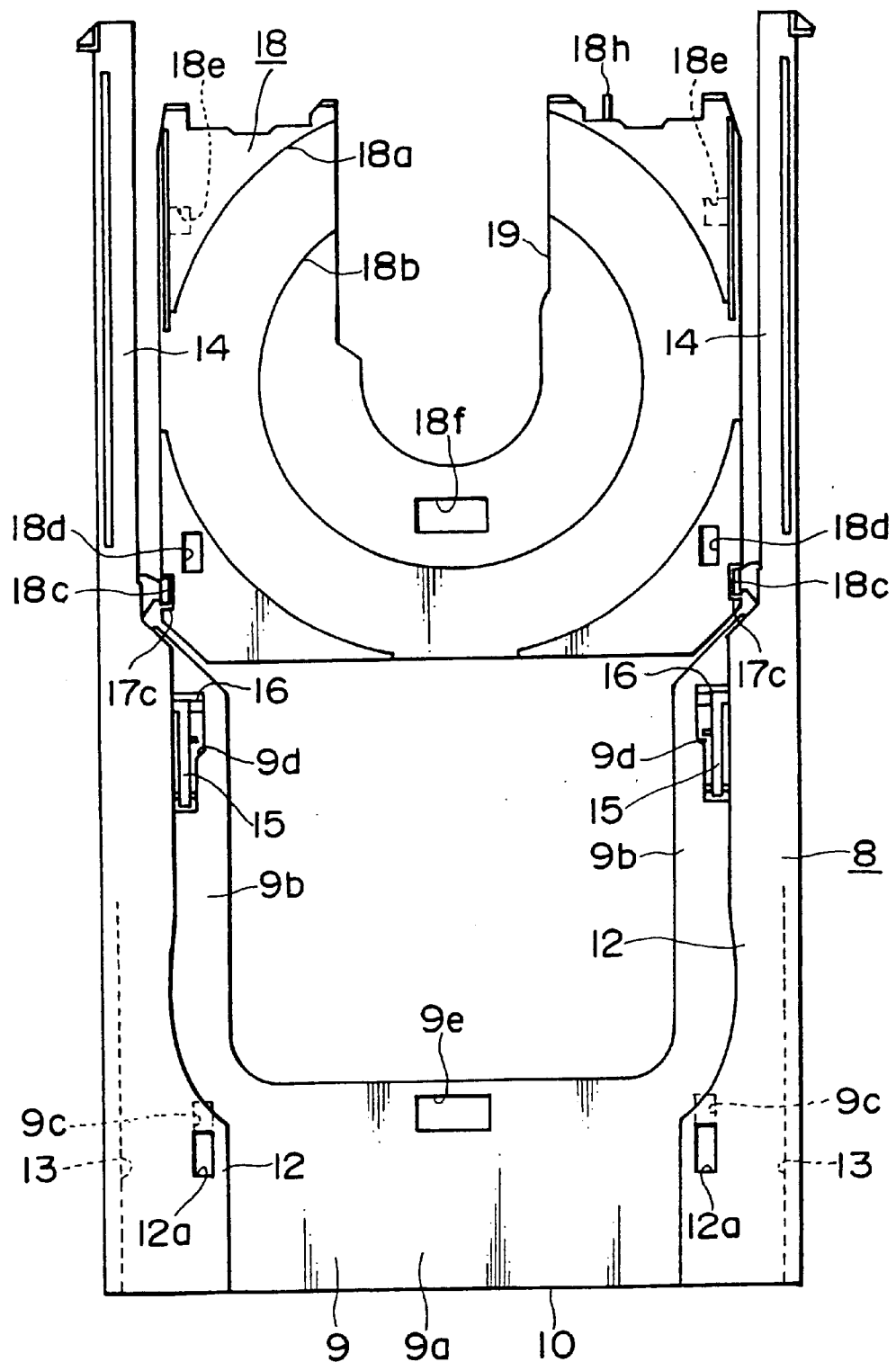

The connecting portions 17c of the rack members 17 are inserted in the connecting grooves 18c of the sub-tray 18, whereby the sub-tray 18 is connected to the rack members 17 (see FIG. 6). In this state, both right and left side edges of the sub-tray 18 are positioned in the insertion portions 13 of the main tray 8, so that the sub-tray 18 is movable relative to the main tray 8 in the longitudinal direction along with the movement of the rack members 17 in the longitudinal direction.

In a state in which the sub-tray 18 is positioned at the front end of a range movable relative to the main tray 8, the locking projections 15d of the lock levers 15 supported by the main tray 8 are inserted in and engaged with the locking recesses 18e of the sub-tray 18, whereby the sub-tray 18 is locked with the main tray 8. Accordingly, in such a locking state, the sub-tray 18 is movable in the longitudinal direction together with the main tray 8, and when the locking of the sub-stray 18 with the main tray 8 is released, the sub-tray 18 is singly movable in the longitudinal direction. In the state that the sub-tray 18 is locked with the main tray 8, the positioning holes 18d of the sub-tray 18 are positioned between the upper and lower positioning holes 12a and 9c provided in the main tray 8, and the through-hole 18f of the sub-tray 18 is aligned to the through-hole 9e of the main tray 8 in the vertical direction (see FIG. 7).

Figure 14:
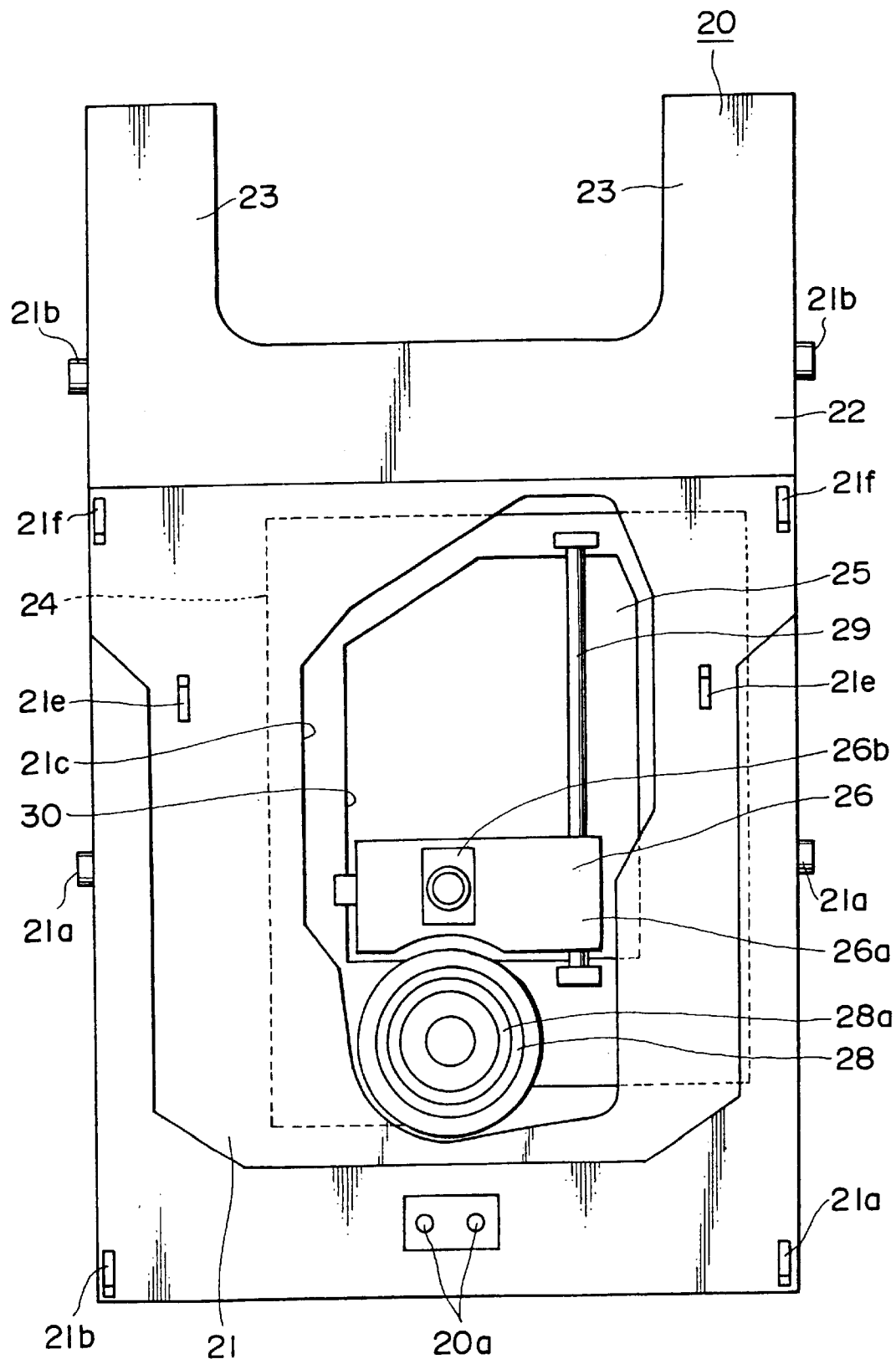
Figure 15:
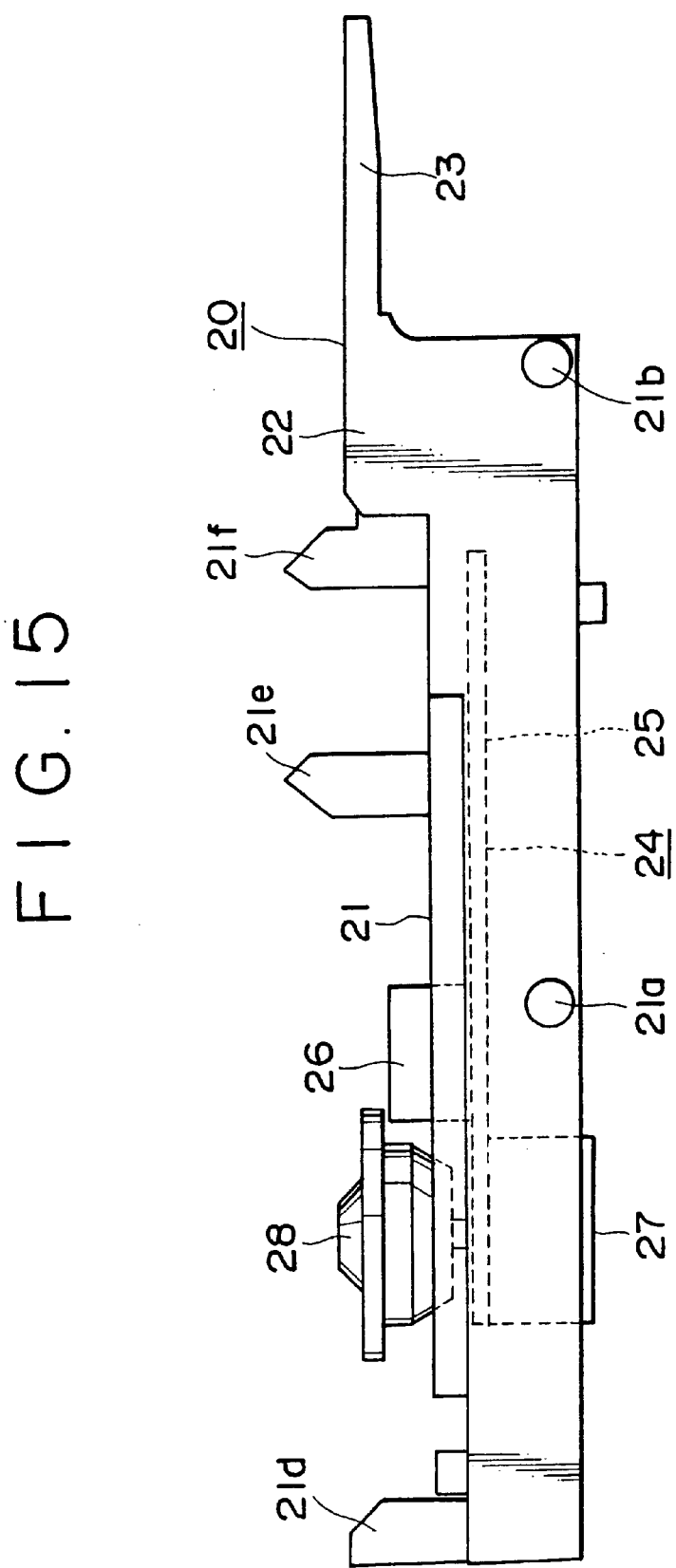
Figure 16:
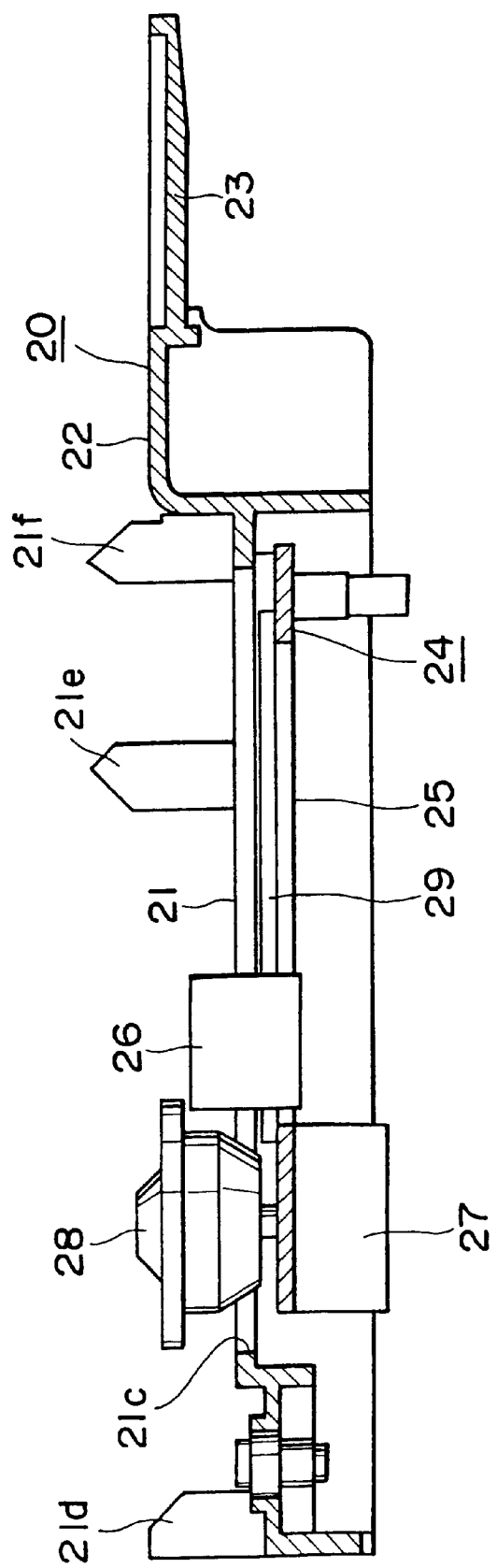

A unit holder 20 is arranged in the arrangement space 2a of the housing 2 (see FIGS. 14 to 16). The unit holder 20 integrally includes an arrangement portion 21 formed into a box-like shape opened downward, a projecting portion 22 projecting continuously from the rear edge of the arrangement portion 21, and two lift-up portions 23 projecting rearward from both right and left ends of the projecting portion 22. The arrangement portion 21 has, on each of both right and left side surfaces, a pin 21a to be supported which is located on the front side and a pin 21b to be supported which is located on the rear side. The upper surface of the arrangement portion 21 has a large opening 21c.

The arrangement portion 21 has two positioning projections 21d at the right and left ends of a portion near the front end; two positioning projections 21e on the right and left end sides of a rear end portion; and two positioning projections 21f at the right and left ends of a portion near the rear end. The upper surface of each of the positioning projections 21d, 21e and 21f is tilted (see FIGS. 15 and 16).

The unit holder 20 has, at a central area of a front end portion in the lateral direction, an optical sensor 20a (see FIG. 14).

The arrangement portion 21 is provided with a base unit 24 which is supported by the unit holder 20 via a damper (not shown). The base unit 24 includes a supporting plate 25, an optical pickup 26 supported on the supporting plate 25, a spindle motor 27 fixed on the back surface side of the supporting plate 25, and a disc table 28 fixed at an upper end portion of a motor shaft of the spindle motor 27 (see FIGS. 14 to 16). An annular magnet 28a is buried in the disc table 28 (see FIG. 14).

The optical pickup 26 includes a movable base 26a and a biaxial actuator 26b disposed on the movable base 26a. The optical pickup 26 is movable while being guided between a guide shaft 29 and a guide projecting edge 30 positioned in parallel to the guide shaft 29. The optical pickup 26 and the disc table 28 project upward from an opening 21c of the unit holder 20 (see FIGS. 15 and 16).

Figure 17:
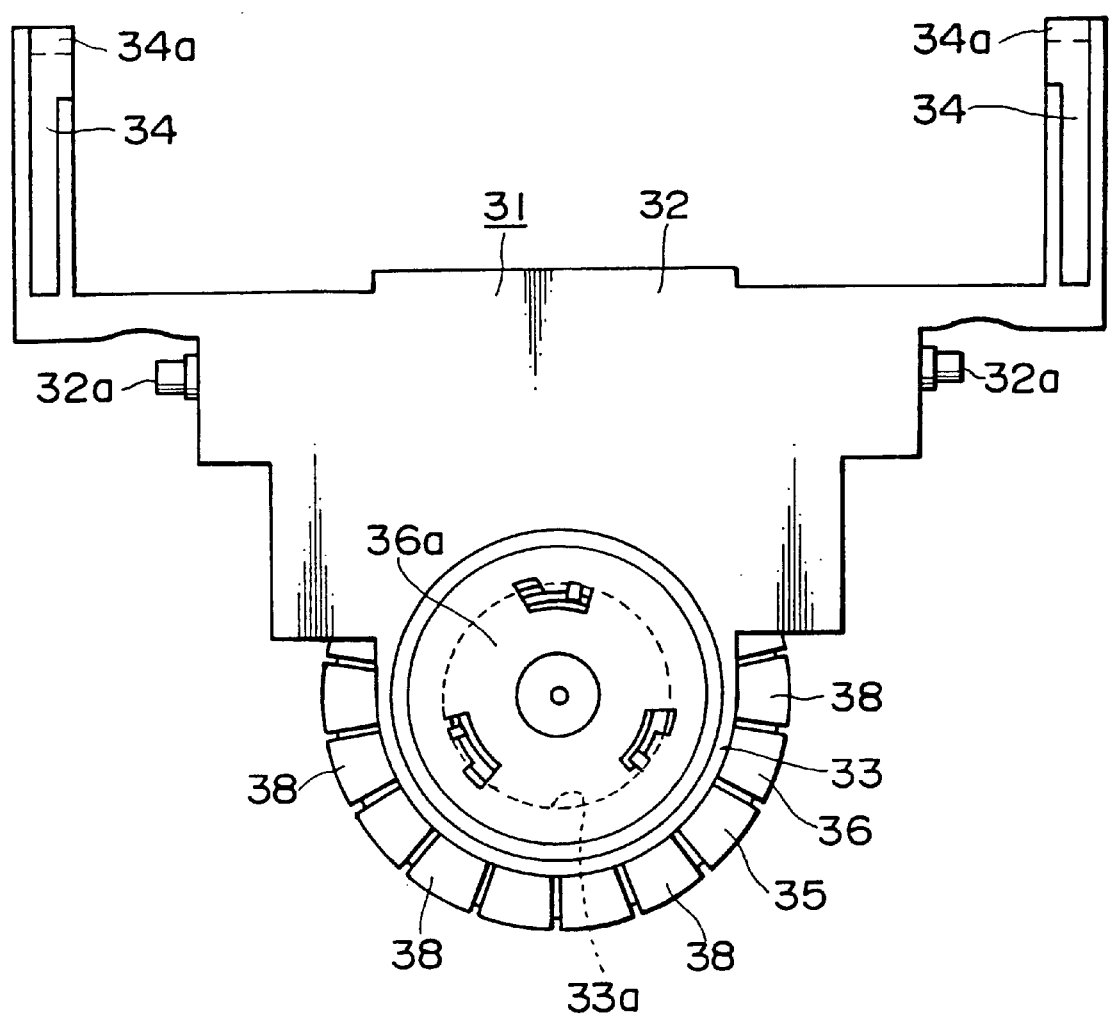
Figure 18:
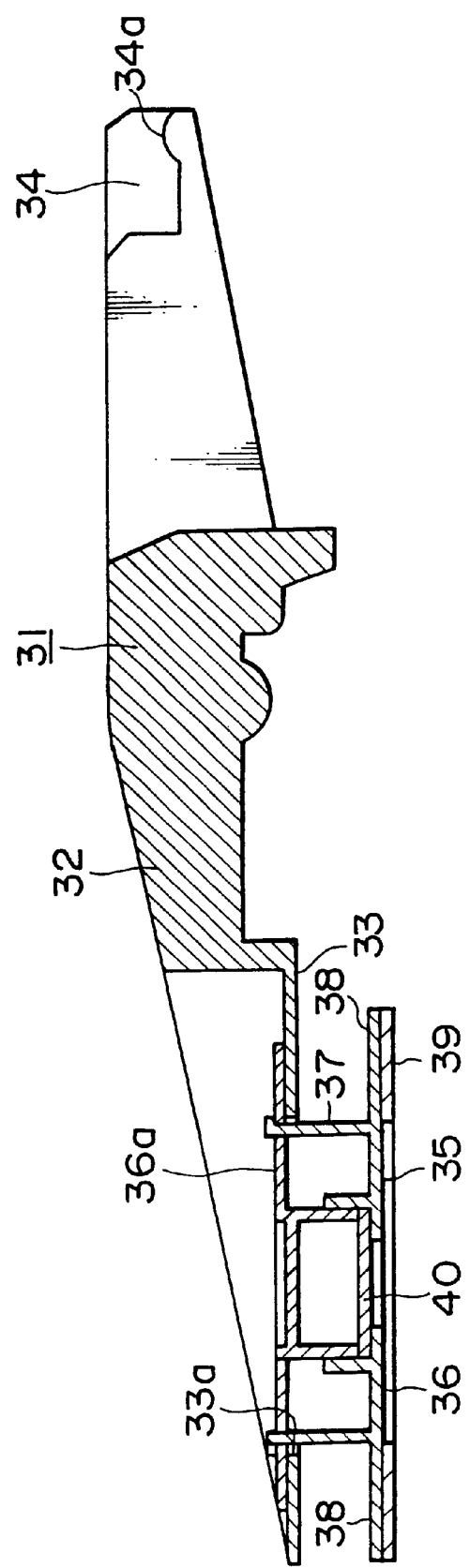

A chucking member 31 integrally includes a base portion 32, a pulley supporting portion 33 provided on the front end side of the base portion 32, and two leg portions 34 to be operated which project rearward from both right and left end portions of the base portion 32 (see FIGS. 17 and 18).

The base portion 32 has, on both right and left side surfaces, two shafts 32a to be supported which are located at positions near the rear end of the base portion 32 in such a manner as to project outward therefrom. The pulley supporting portion 33 is formed into a disc shape having at its center a pulley supporting hole 33a. A rear end portion of each leg portion 34 to be operated is formed as a portion 34a to be held down.

A chucking pulley 35 is formed by mounting a pulley 36 on a disc-like mounting plate 36a (see FIGS, 17 and 18). The pulley 36 integrally includes a shaft portion 37 and a plurality of hold-down pieces 38 projecting radially from the lower edge of the shaft portion 37. An annular rubber 39 is stuck on the back surfaces of the hold-down pieces 38. An iron plate 40 is disposed in the shaft portion 37.

The upper edge of the shaft portion 37 of the pulley 36 is mounted on the mounting plate 36a, and the shaft portion 37 is inserted in the pulley supporting hole 33a of the chucking member 31, whereby the chucking pulley 35 is supported by the chucking member 31. In the state in which the chucking pulley 35 is supported by the chucking member 31, the chucking pulley 35 is movable relative to the chucking member 31 in the axial direction of the shaft portion 37.

The chucking member 31, which has supported the chucking pulley 35 as described above, is supported by the cover body 7 by inserting the shafts 32a to be supported in the supporting groove portions 7b of the cover body 7. In this state, the chucking member 31 is turnable around the shafts 32a to be supported. In the state that the chucking member 31 is supported by the cover body 7, when the portions 34a to be held down are not held down from above by hold-down members (which will be described later), the chucking member 31 is turned by its dead weight in the direction where the chucking pulley 35 supported by the chucking member 31 is moved down. When the chucking member 31 is thus turned with its front side directed downward, the chucking pulley 35 is inserted in the cover body 7 through the pulley insertion hole 7a of the cover body 7.

Figure 19:
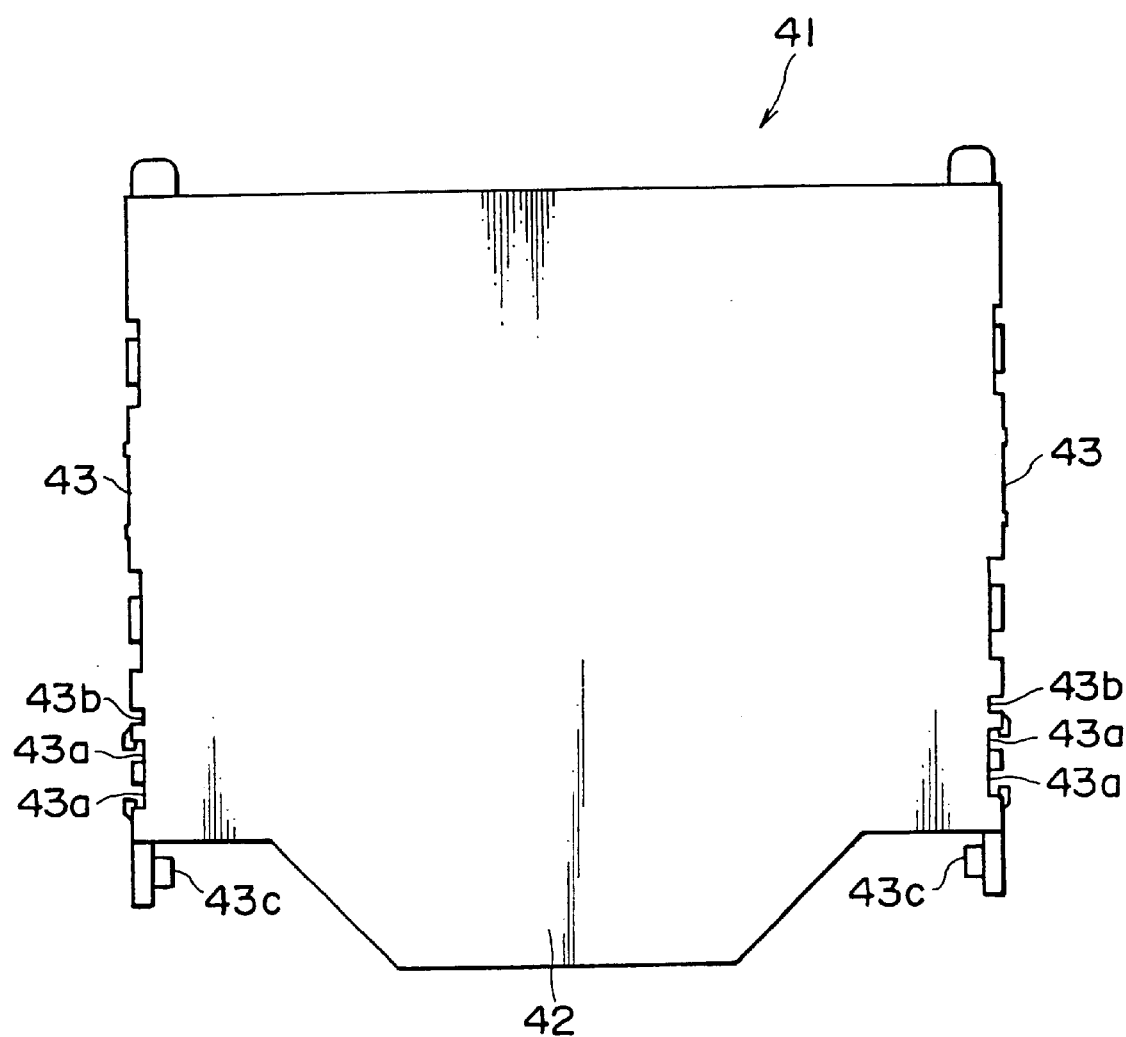
Figure 20:
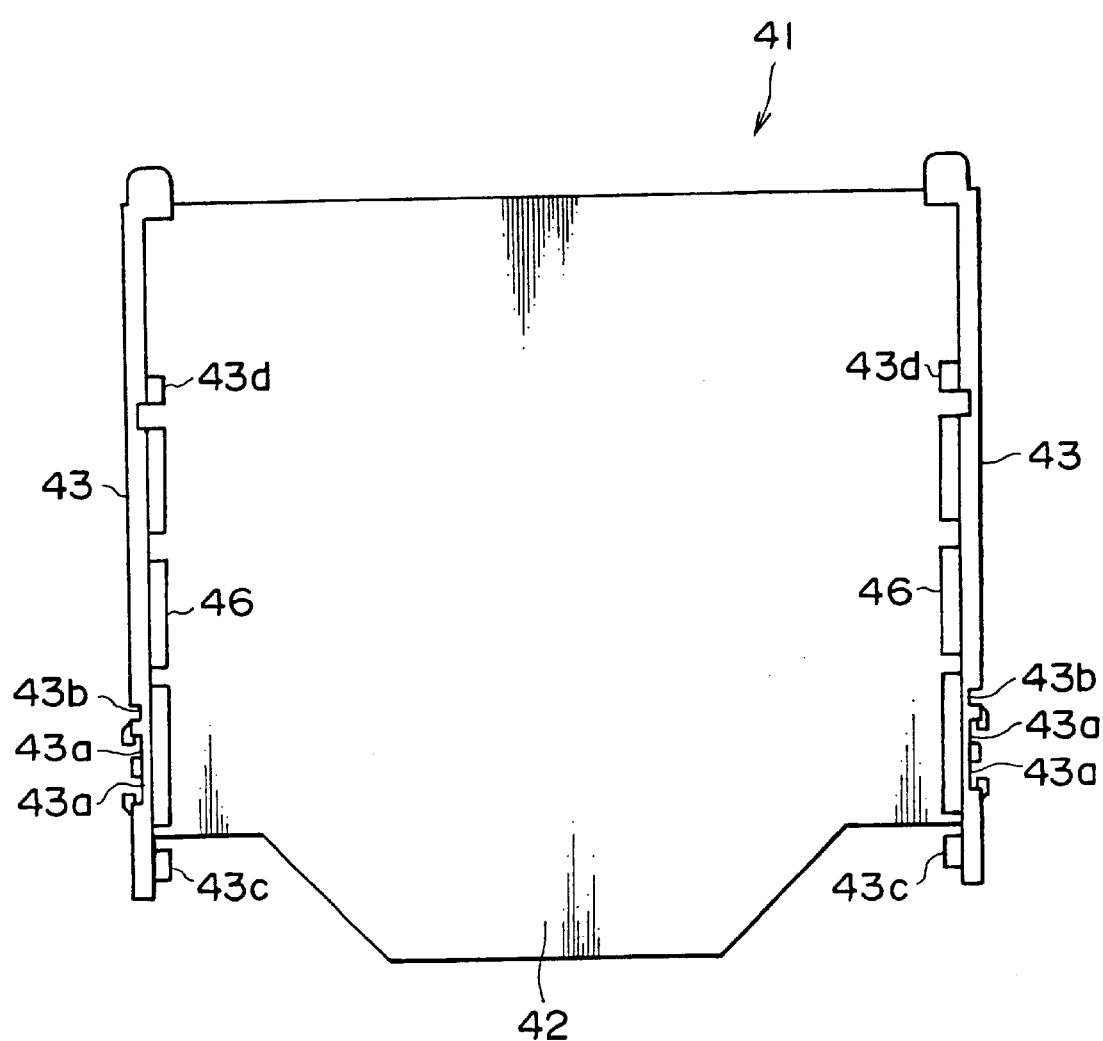
Figure 21:
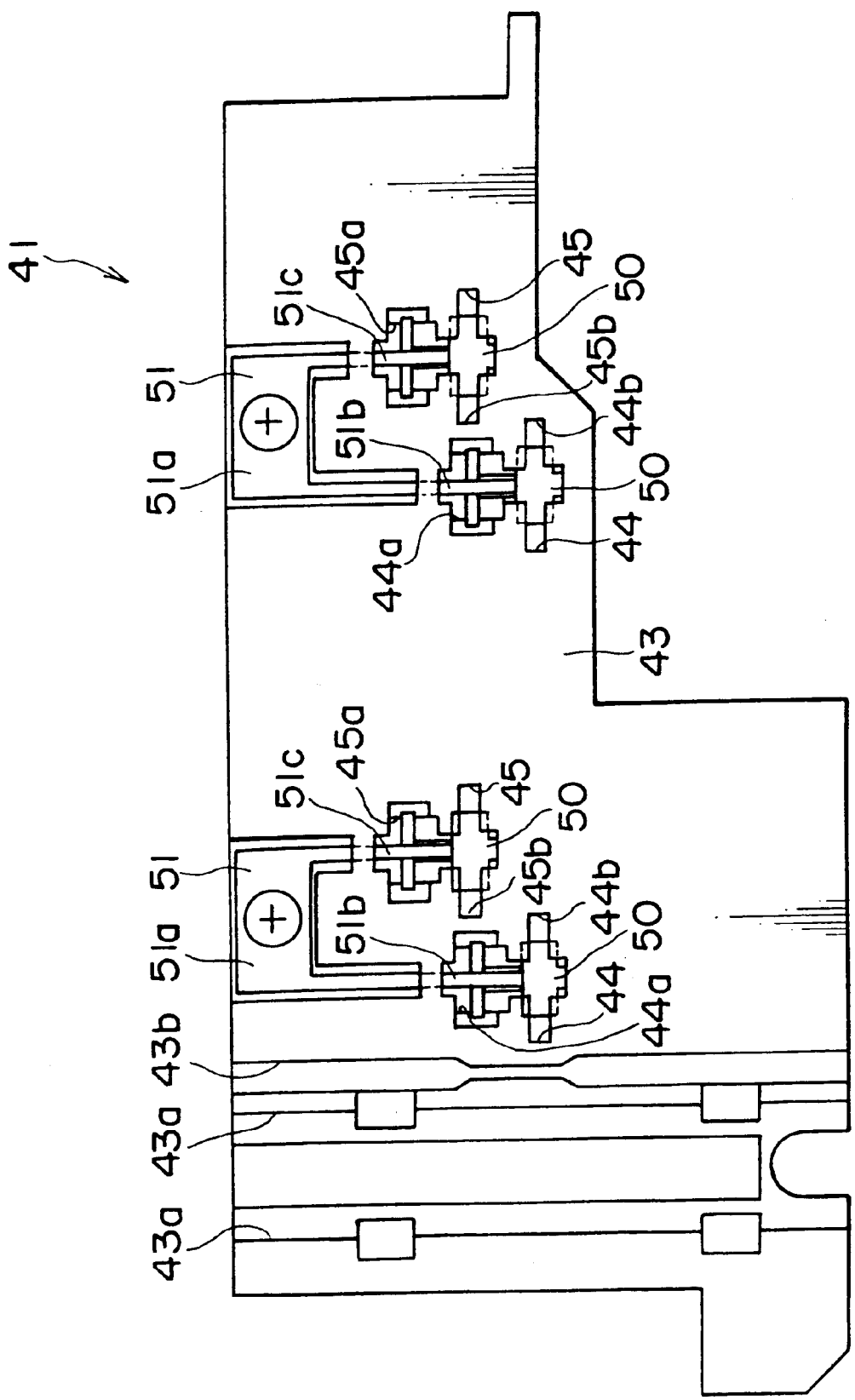

A stocker 41 integrally includes an upper wall portion 42 and two side wall portions 43 suspended from both right and left side edges of the upper wall portion 42 (see FIGS. 19 to 21).

The outer surface of each side wall portion 43 has, in a front end portion, two vertical guide grooves 43a spaced from each other in the longitudinal direction, and a vertical groove 43b to be guided which is positioned directly rearward from the guide grooves 43a. The side wall portion 43 has, at positions near the front end, two supporting holes 44 and 45 spaced from each other in the longitudinal direction, and also has, at positions near the rear end, two supporting holes 44 and 45 spaced from each other in the longitudinal direction (see FIG. 21).

The supporting holes 44 and 45 are formed into shapes similar to each other. The supporting holes 44 are located at the same height, and the supporting holes 45 are higher than the supporting holes 44. The supporting holes 44 and 45 are each formed into an approximately inverse T-shape. To be more specific, the supporting hole 44 includes a vertical portion 44a extending in the vertical direction, and a horizontal portion 44b located on the lower side of the vertical portion 44a and extending in the longitudinal direction; and the supporting holes 45 includes a vertical portion 45a extending in the vertical direction, and a horizontal portion 45b located on the lower side of the vertical portion 45a and extending in the longitudinal direction.

The side wall portion 43 has, on the inner surface of the lower edge, a pin 43c to be supported which is located on the front side and a pin 43d to be supported which is located on the rear side (see FIG. 20). The side wall portion 43 also has, on the inner wall, a pair of slip-off preventive projecting ribs 46 which extend in the longitudinal direction while being spaced from each other in the longitudinal direction. The slip-off preventive projecting pieces 46 are disposed at a height corresponding to the height of a lower side opening edge of the horizontal portion 44b of the lower side supporting hole 44.

The guide projections 4c provided on the housing 2 are engaged in the grooves 43b to be guided, whereby the stocker 41 is supported by the housing 2 in such a manner as to be movable in the vertical direction.

Figure 25:
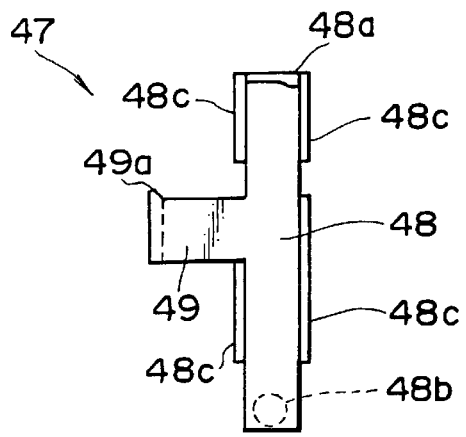
Figure 26:
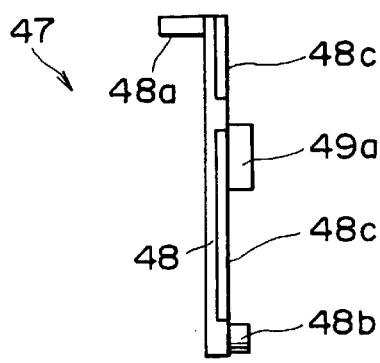
Figure 27:
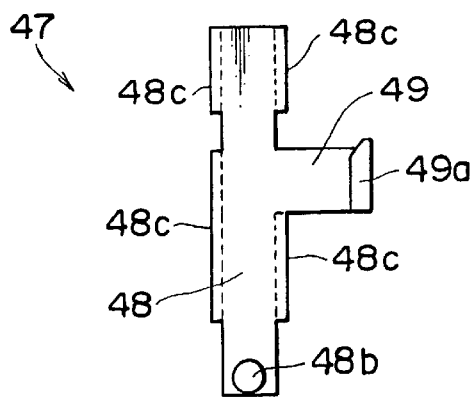

Two hold-down members 47 are vertically movably supported by the guide grooves 43a provided in each of the side wall portions 43 of the stocker 41 (see FIGS. 25 to 27). The hold-down member 47 has a vertically-elongated portion 48 to be supported, and an arm 49 projecting forward from an approximately central portion in the vertical direction of the portion 48 to be supported. A hold-down piece 48a projecting outward is provided on the upper edge of the portion 48 to be supported, and a shaft portion 48b projecting inward is provided on a lower end portion of the portion 48 to be supported. A plurality of thin pieces 48c to be supported are formed on both the front and rear side edges of the portion 48 to be supported. The front end of the arm 49 has a movement restricting projection 49a projecting inward.

The pieces 48c to be supported of the hold-down members 47 are inserted in and supported by the guide grooves 43a of each of the side wall portions 43 of the stocker 41, whereby the hold-down members 47 are vertically movably supported by each of the side wall portions 43 of the stocker 41.

A restricting member 50 is inserted in and turnably supported by each of the supporting holes 44 and 45 (see FIGS. 21 to 24).

Figure 22:
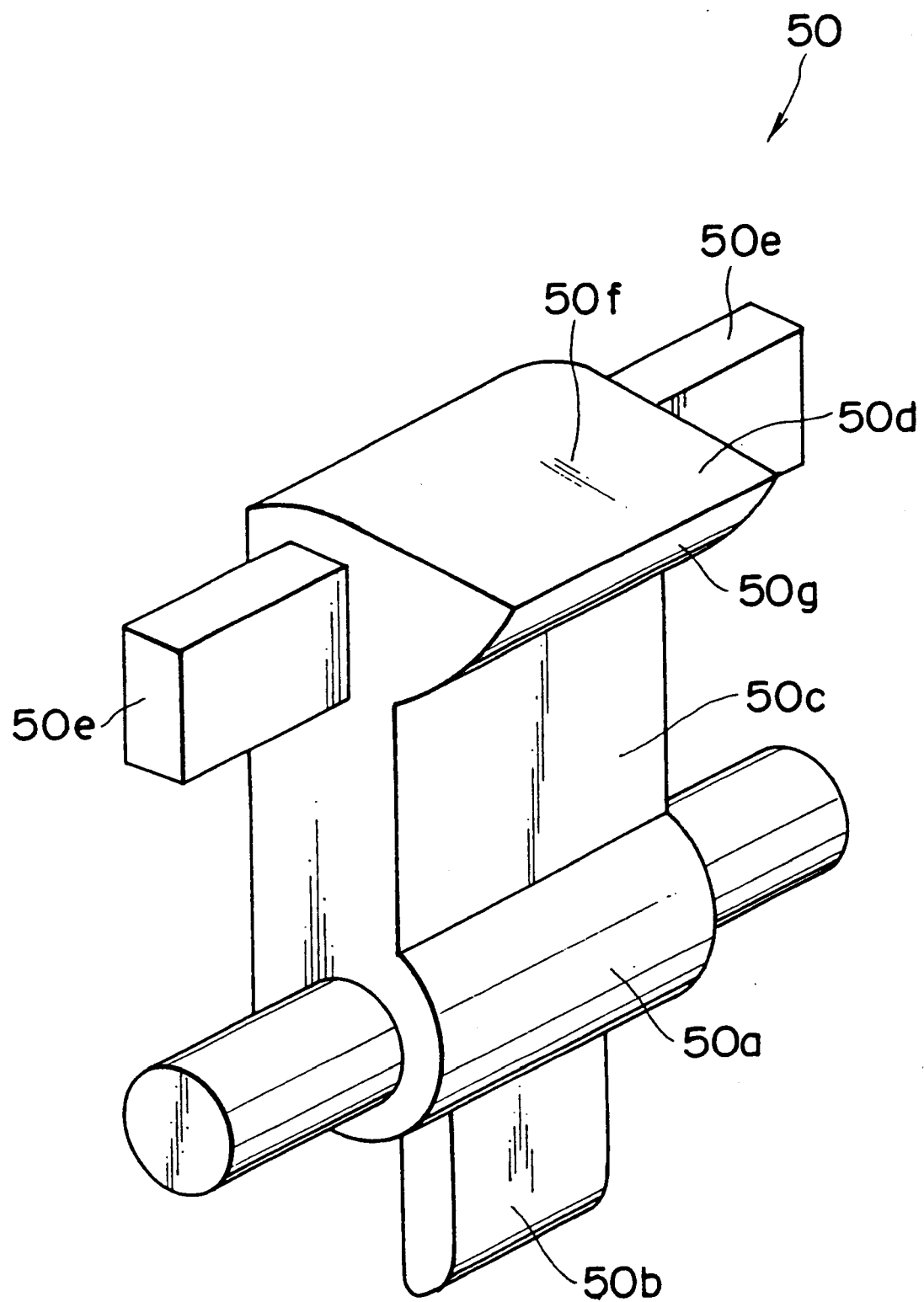

The restricting member 50 integrally includes a shaft portion 50a to be supported, a first turning restricting portion 50b projecting downward from the shaft portion 50a to be supported, a spring receiving portion 50c projecting upward from the shaft portion 50a to be supported, a restricting projecting portion 50d projecting inward from an upper end portion of the spring receiving portion 50c, and two second turning restricting portions 50e projecting forward and rearward from a position near the upper end of the spring receiving portion 50c (see FIG. 22). The restricting projection 50d has a horizontal upper surface 50f, and an obtusely curved surface 50g continuously extending downward, outward from the upper surface 50f.

The restricting member 50 is arranged in the horizontal hole 44 (45) such that the shaft portion 50a to be supported is supported by the horizontal portion 44b (45b) of the horizontal hole 44 (45), while the first turning restricting portion 50b is in contact with the lower opening edge of the inner surface of the horizontal portion 44b (45b) and the second turning restricting portion 50e is in contact with the opening side edge of the outer surface of the vertical portion 44a (45a). A biasing member 51 is then mounted to a upper side of the supporting hole 44 (45) (see FIG. 21).

The biasing member 51 is composed of a plate spring integrally including a base end portion 51a, a first spring portion 51b suspended from a front end portion of the base end portion 51a, and a second spring portion 51c suspended from a rear end portion of the base end portion 51a. The biasing member 51 is mounted to the stocker 41 such that the base end portion 51a is mounted to the upper sides of the supporting holes 44 and 45; the first spring portion 51b is brought, from external, into elastic-contact with the spring receiving portion 50c of the restricting member 50 supported by the supporting hole 44; and the second spring portion 51c is brought, from external, into contact with the spring receiving portion 50c of the restricting member 50 supported by the supporting hole 45. As a result, the biasing member 51 gives the restricting member 50 a biasing force acting in the direction where the restricting projection 50d projects inward.

In the state that the restricting members 50 are supported by the stocker 41 and the biasing members 51 are mounted on the stocker 41 as described above, the sub-tray 18 can be contained in the stocker 41. An upper space, which is formed between the upper wall portion 42 of the stocker 41 and the four restricting projections 50d of the four restricting members 50 supported by the four supporting holes 45 provided in both the side wall portions 43 of the stocker 41, is taken as a first containing portion 41a; An intermediate space, which is formed between the above four restricting projections 50d of the four restricting members 50 supported by the four supporting holes 45 provided in both the side wall portions 43 of the stoker 41 and the four restricting projections 50d of the four restricting members 50 supported by the four supporting holes 44 provided in both the side wall portions 43 of the stocker 41, is taken as a second containing portion 41b. A lower space, which is formed between the above four restricting projections 50d of the four restricting members 50 supported by the four supporting holes 44 provided in both the side wall portions 43 of the stocker 41 and the four slip-off preventive projecting ribs 46 provided on both the side wall portions 41 of the stocker 41, is taken as a third containing portion 41c (see FIGS. 23 and 24). In addition, the third containing portion 41c functions as an insertion area in which the sub-tray 18 is inserted from a disc mounting position.

Each of the sub-trays 18A, 18B and 18C is contained in either of the containing portions 41a, 41b and 41c by inserting the sub-tray 18, from the front side, in the stocker 41. If the sub-tray 18 is contained in the first or second containing portion 41a or 41b, it is placed on and held by the restricting projections 50d of the restricting members 50 (see FIGS. 23 and 24), and if the sub-tray 18 is contained in the third containing portion 41c, it is placed on and held by the slip-off preventive projecting ribs 46 (see FIG. 23).

If one sub-tray 18 is held in the third containing portion 41c and any of the other sub-trays 18 is not held in the first or second containing portion 41a or 41b, the sub-tray 18 held in the third containing portion 41c is lifted up and contained in the second containing portion 41b by the lift-up portions 23 of the unit holder 20 at the time of upward movement of the unit holder 20 to be described later (see FIGS. 23 and 24).

Since the sub-tray 18 contained in the third containing portion 41c is lifted up by the lift-up portions 23 of the unit holder 20 at the time of upward movement of the base unit 24 (unit holder 20) as described above, the base unit 24 (unit holder 20) functions as moving means for lifting up the sub-tray 18.

The back surface of the sub-tray 18 is pushed up by the lift-up portions 23. At this time, both the side edges of the sub-tray 18 push up the curved surfaces 50g of the restricting projections 50d of the restricting members 50. The restricting members 50, which has been pushed up, are turned in the direction where they project outward against the biasing forces of the biasing members 51. Such a state is shown by a two-dot chain line in FIG. 23. When the lower edges of both the side surfaces of the sub-tray 18 reach the upper surfaces 50f of the restricting members 50, the restricting members 50 are returned to the original positions by the biasing forces of the biasing members 51, so that the sub-tray 18 is placed on the upper surfaces 50f of the restricting members 50, with a result that the sub-tray 18 is contained in the second containing portion 41b (see FIG. 24).

When the sub-tray 18 is contained in the second containing portion 41b, the unit holder 20 is no longer moved up. If the two sub-trays 18 are contained in the second and third containing portions 41b and 41c and no sub-tray 18 is contained in the first containing portion 41a, when the sub-tray 18 contained in the third containing portion 41c is lifted up to the second containing portion 41b, the sub-tray 18 contained in the second containing portion 41b is lifted up by the sub-tray 18 thus pushed up, to be contained in the first containing portion 41a.

As described above, the restricting members 50 and the biasing members 51 are provided as holding/movement restricting means for holding the sub-tray 18 having been lifted up in the stocker 41 and restricting the movement of the sub-tray 18 in the downward direction opposed to the lift-up direction. The holding/movement restricting operation of the sub-tray 18 can be thus simply performed by combination of the above-described two kinds of members. This makes it possible to certainly hold the sub-tray 18 and restrict the movement of the sub-tray 18 with a simple configuration at a low production cost.

Figure 28:
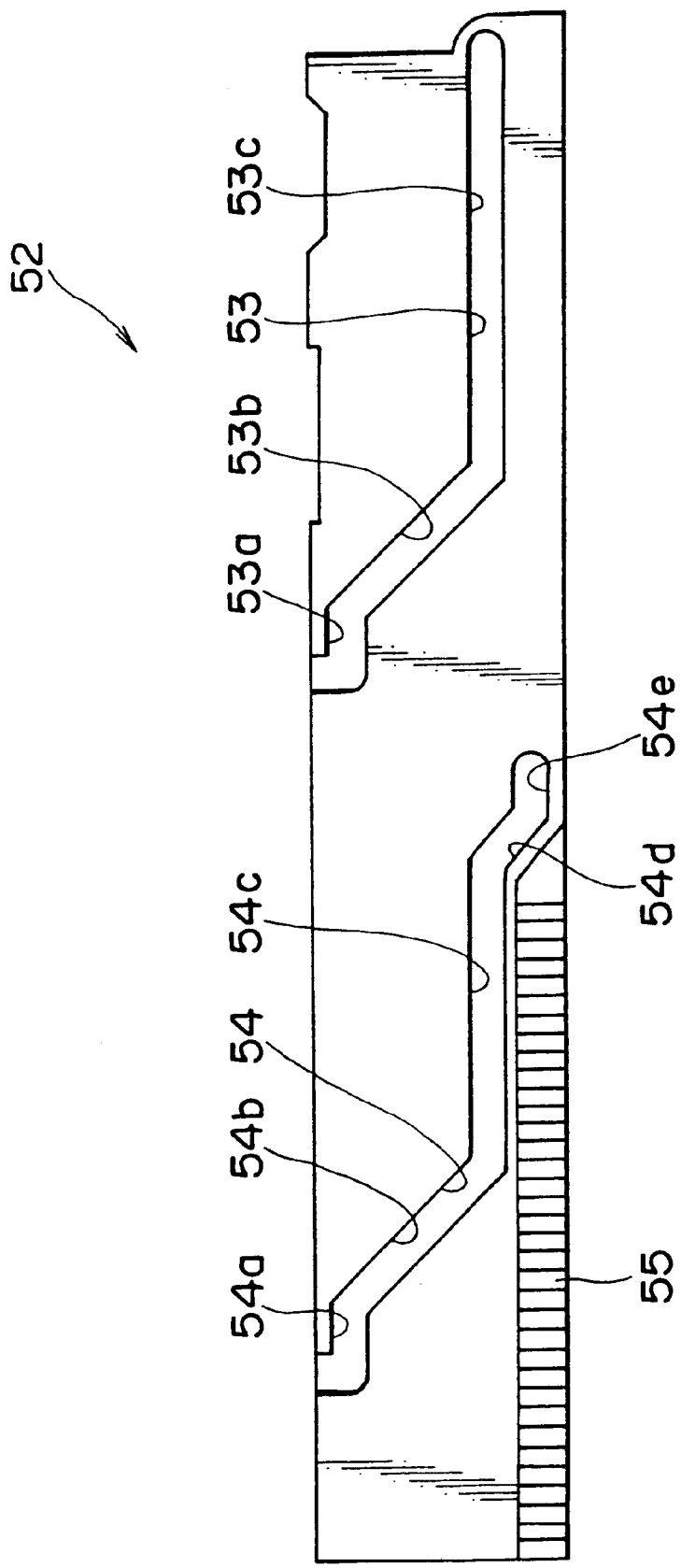
Figure 29:
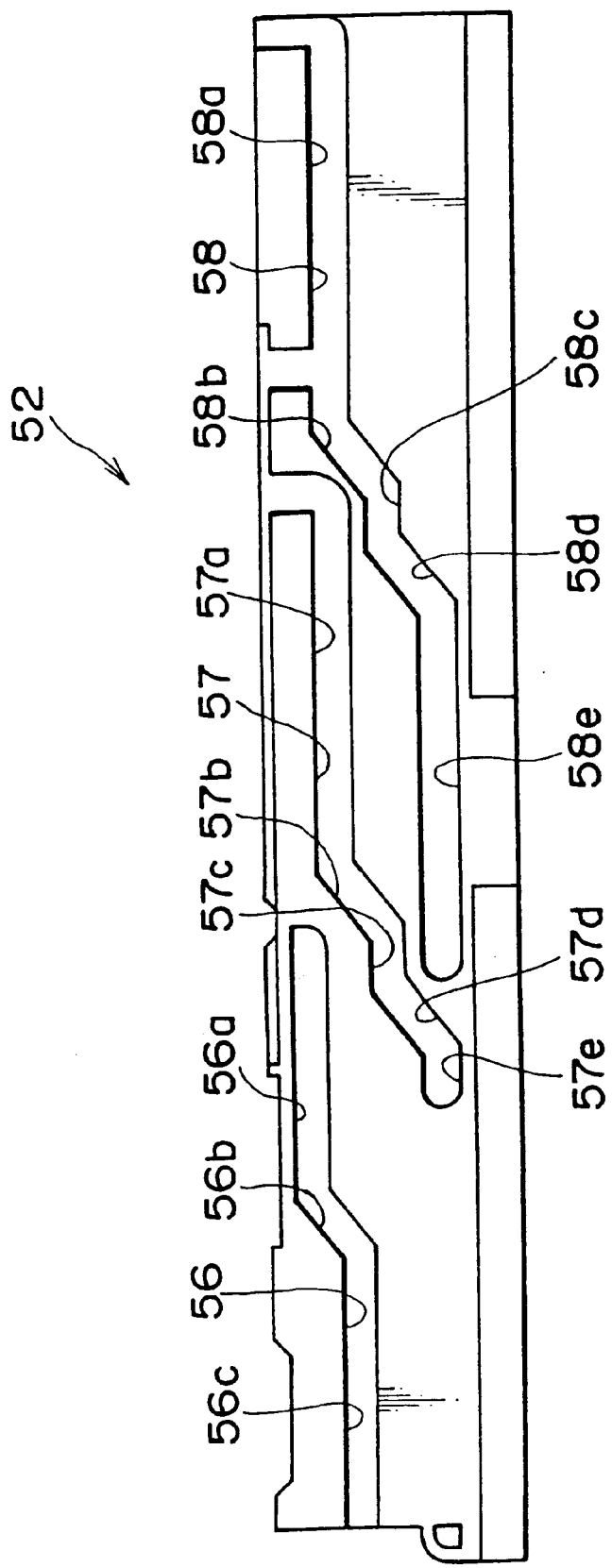

Two lifting/lowering sliders 52 are longitudinally slidably supported in the right and left slider arrangement groove portions 5b of the housing 2 (see FIGS. 28 and 29).

Each of the lifting/lowering sliders 52 has, in the inner surface, two cam grooves 53 and 54 for the unit holder which are spaced from each other in the longitudinal direction (see FIG. 28). The pins 21a and 21b to be supported, which are provided on each of the side surfaces of the unit holder 20, are slidably fitted in the cam grooves 53 and 54 of the slider 52, respectively.

The cam groove 53 for the unit holder has three cam groove portions continuous to each other: an upper side horizontal portion 53a, a tilt portion 53b tilted forward, downward from the front end of the upper side horizontal portion 53a, and a lower side horizontal portion 53c extending horizontally from the front end of the tilt portion 53b. The cam groove 54 for the unit holder has five groove portions continuous to each other: an upper side horizontal portion 54a, a tilt portion 54b tilted forward, downward from the front end of the upper side horizontal portion 54a, a lower side horizontal portion 54c extending horizontally from the front end of the tilt portion 54b, a lower side tilt portion 54d tilted forward, downward from the front end of the lower side horizontal portion 54c, and a horizontal lowermost portion 54e extending horizontally from the front end of the lower side tilt portion 54d. The upper side horizontal portion 53a and the upper side horizontal portion 54a are located at the same height, and the lower side horizontal portion 53c and the lower side horizontal portion 54c are located at the same height.

The inner surface of the lifting/lowering slider 52 has, on a rear half of a lower end portion, a rack portion 55 (see FIG. 28).

The outer surface of the lifting/lowering slider 52 has a cam groove 56 for a lock releasing lever to be described later, a cam groove 57 for the stocker, and a dual purpose cam groove 58, which are arranged in this order from the front side (see FIG. 29).

The cam groove 56 for the lock releasing lever has three groove portions continuous to each other: an upper side horizontal portion 56a, a tilt portion 56b tilted forward, downward from the front end of the upper side horizontal portion 56a, and a lower side horizontal portion 56c extending horizontally from the front end of the tilt portion 56b.

The cam groove 57 for the stocker has five groove portions continuous to each other: an upper side horizontal portion 57a, an upper side tilt portion 57b tilted forward, downward from the front end of the upper side horizontal portion 57a, an intermediate horizontal portion 57c extending horizontally from the front end of the upper side tilt portion 57b, a lower side tilt portion 57d tilted forward, downward from the front end of the intermediate horizontal portion 57c, and a lower side horizontal portion 57e extending horizontally from the front end of the lower side tilt portion 57d.

The duel purpose groove 58 has five groove portions continuous to each other: an upper side horizontal portion 58a, an upper side tilt portion 58b tilted forward, downward from the front end of the upper side horizontal portion 58a, an intermediate horizontal portion 58c extending horizontally from the front end of the upper side tilt portion 58b, a lower side tilt portion 58d tilted forward, downward from the front end of the intermediate horizontal portion 58c, and a lower side horizontal portion 58e extending horizontally from the front end of the lower side tilt portion 58d. The lower side horizontal portion 58e is longer in the longitudinal direction from the lower side horizontal portion 57e of the cam groove 57 for the stocker.

The pins 43c and 43d to be supported, which are provided on each of the right and left sides of the stocker 41, are slidably engaged in the cam groove 57 for the stocker and the duel purpose cam groove 58. The shaft portions 48b of the hold-down members 47 supported by each of the right and left sides of the stocker 41 are slidably engaged in the duel purpose groove 58.

Figure 30:
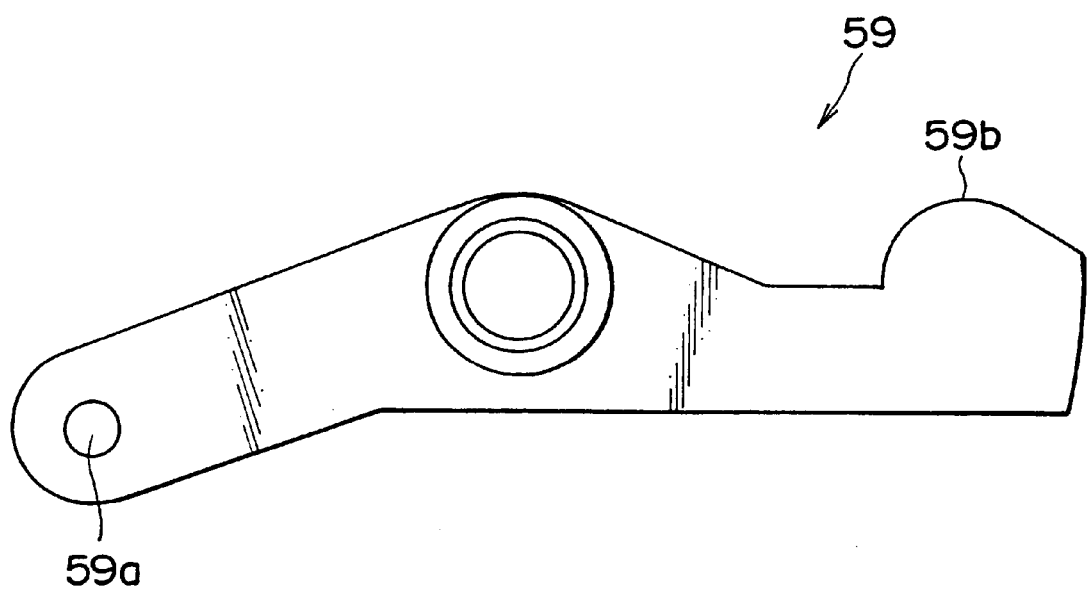
Figure 58:
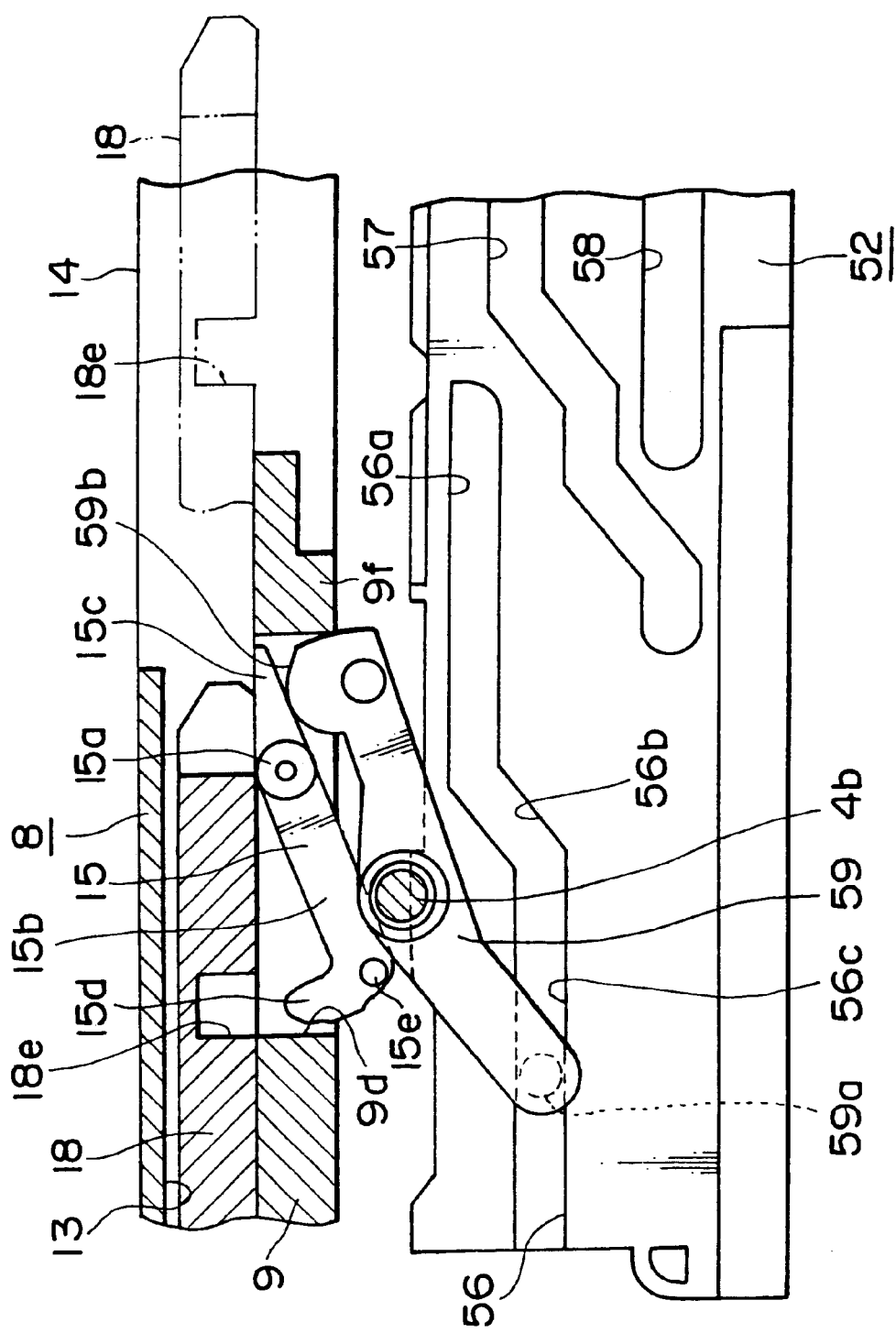

A lock releasing lever 59 is turnably supported by each of the lever supporting pins 4b of the housing 2 (see FIGS. 30 and 58). The lock releasing lever 59 extends longer in one direction, and an approximately central portion in the longitudinal direction is supported by the lever supporting pin 4b. The lock releasing lever 59 has, at a front end portion, a shaft portion 59a to be supported which projects inward and has, at a rear end portion, a pressing portion 59b. The shaft portion 59a to be supported of the lock releasing lever 59 is slidably engaged in the cam groove 56 for the lock releasing lever.

Figure 31:
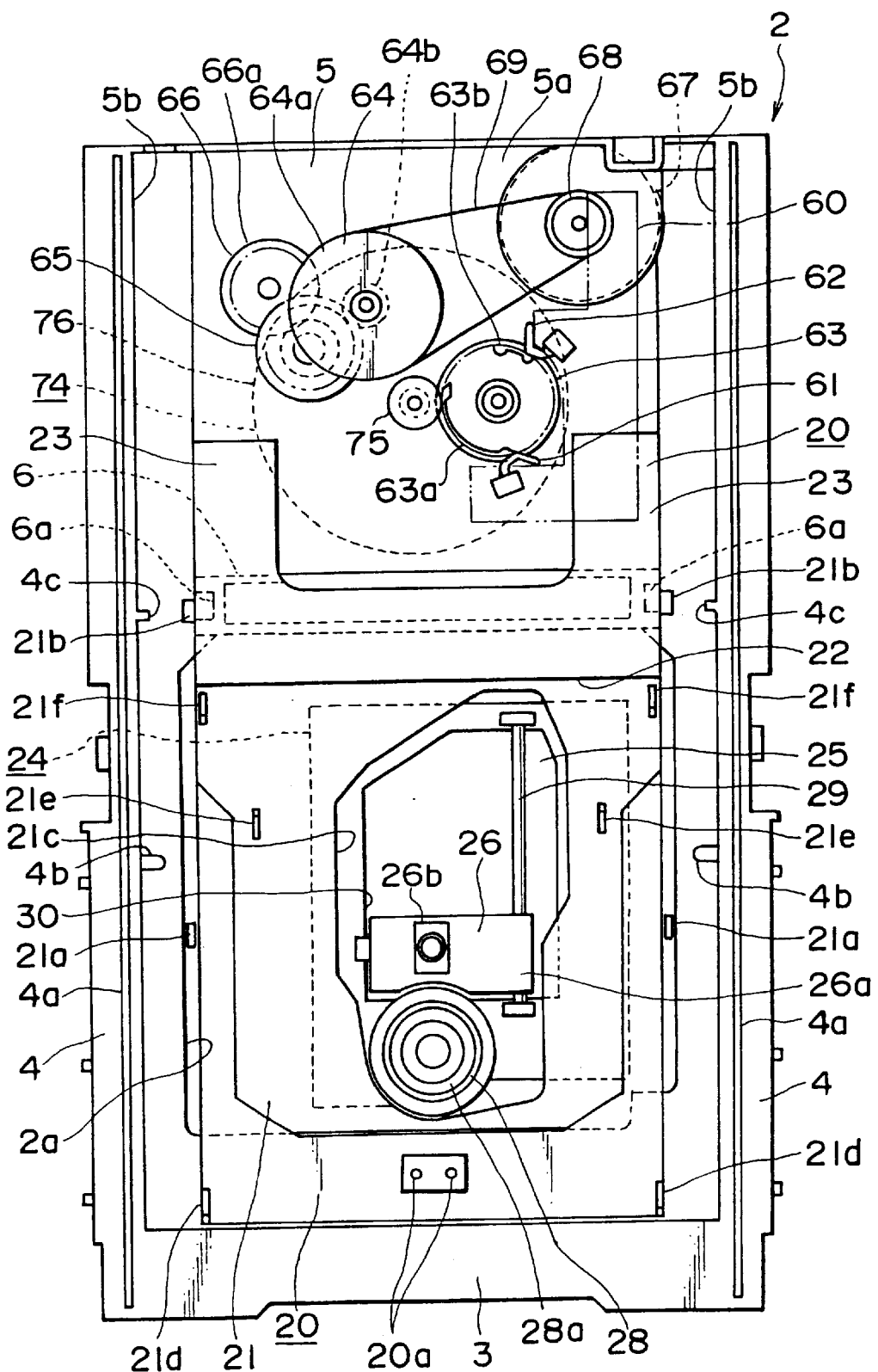

A switching circuit board 60 is mounted at a right end portion on the upper surface of the arrangement plate portion 5 of the housing 2 (see FIG. 31). A first switch 61 and a second switch 62 are provided on the switching circuit board 60 in such a manner as to be spaced from each other in the longitudinal direction (see FIGS. 31 and 32).

Figure 32:
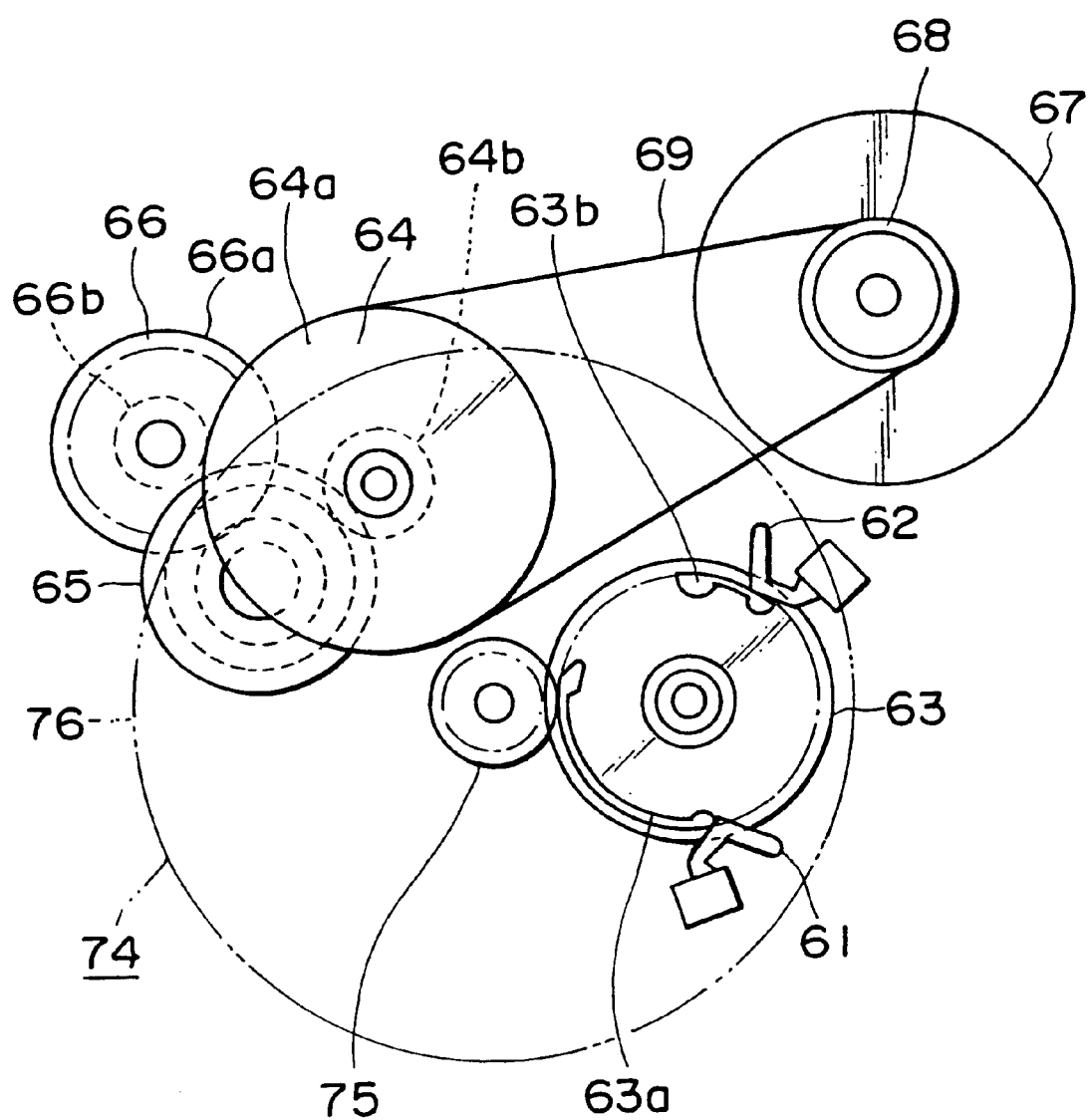

A switching gear 63 is supported on the upper surface of the arrangement plate portion 5 at a position located immediately on the left side of the switching circuit board 60 (see FIGS. 31 and 32). A first operating piece 63a and a second operating piece 63b are provided on the peripheral edge of the switching gear 63 in such a manner as to be spaced from each other in the circumferential direction. The length of the first operating piece 63a in the circumferential direction is longer than the length of the second operating piece 63b in the circumferential direction.

A pulley member 64 is supported on the upper surface of the arrangement plate portion 5. The pulley member 64 integrally includes a pulley portion 64a positioned on the upper side and a gear portion 64b positioned on the lower side (see FIGS. 31 and 32).

A first intermediate gear 65, which is configured as a two-stepped gear, is supported on the arrangement plate portion 5, and an upper gear portion of the first intermediate gear 65 is meshed with the gear portion 64b of the pulley member 64 (see FIGS. 31 and 32). A second intermediate gear 66, which is configured as a two-stepped gear, is supported on the arrangement plate portion 5, and an upper gear portion 66a of the second intermediate gear 66 is meshed with the lower gear portion of the first intermediate gear 65 (see FIGS. 31 and 32).

The second intermediate gear 66 is arranged such that the upper gear portion 66a is positioned on the upper surface side of the arrangement plate portion 5, and the lower gear portion 66b passes through the second gear insertion hole 5f to be positioned on the lower surface side of the arrangement plate portion 5.

A drive motor 67 is mounted to a rear end portion on the back surface of the arrangement plate portion 5 (see FIG. 31). A motor shaft of the drive motor 67 passes through the motor shaft insertion hole 5d, and a small pulley 68 is fixed to an upper end portion of the motor shaft. A belt 69 is wound between the small pulley 68 and the pulley portion 64a of the pulley member 64 (see FIG. 31).

Figure 33:
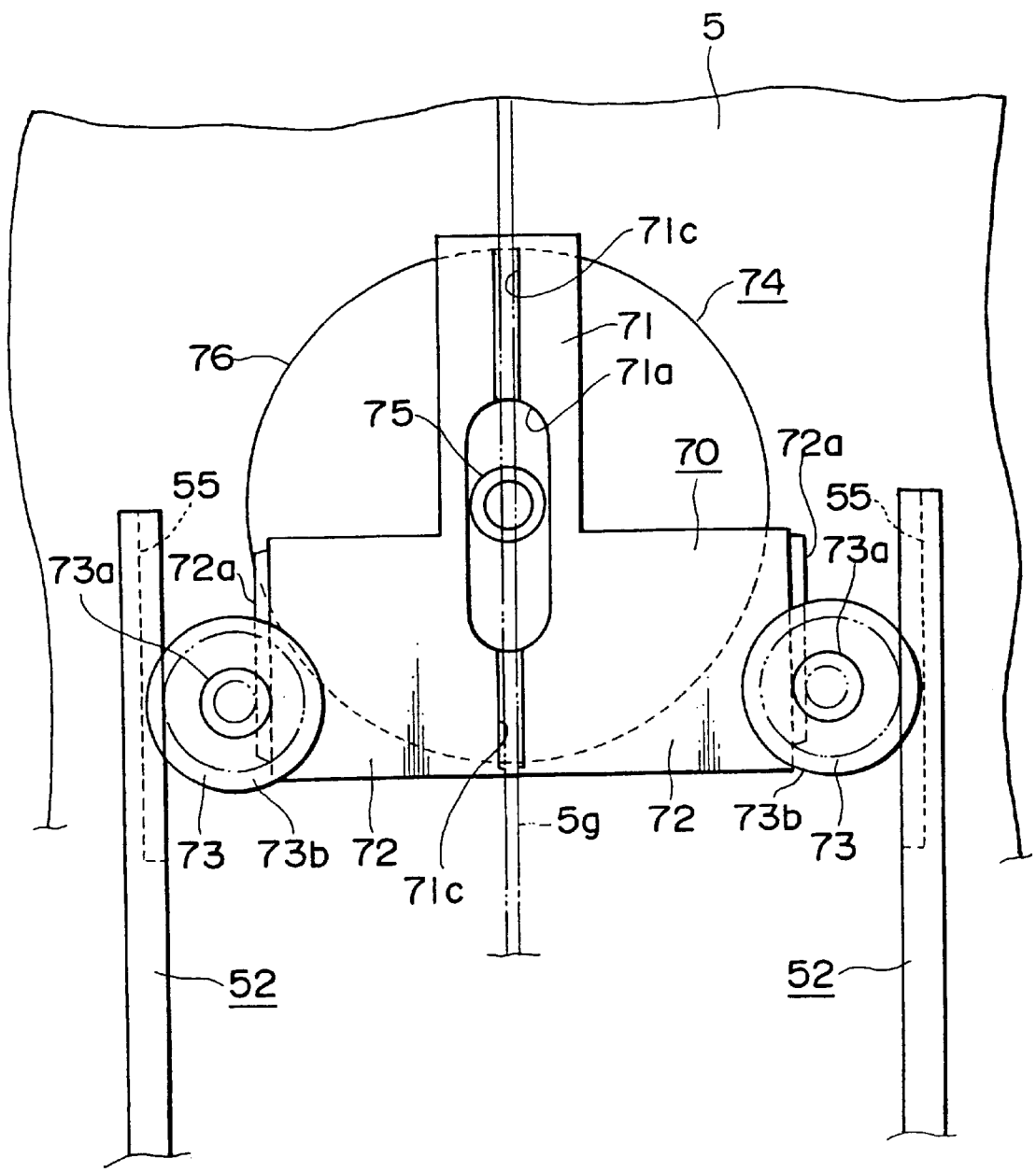
Figure 34:
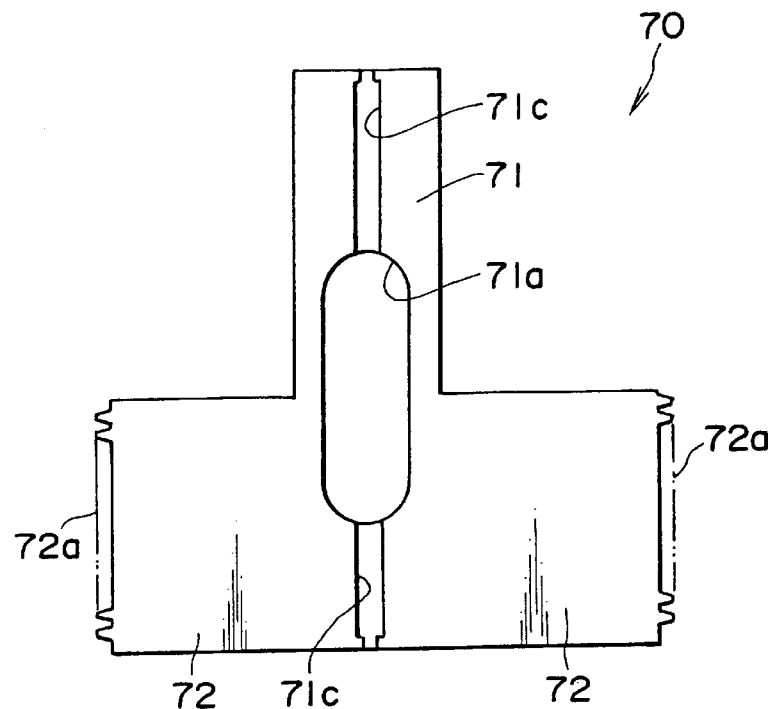
Figure 35:
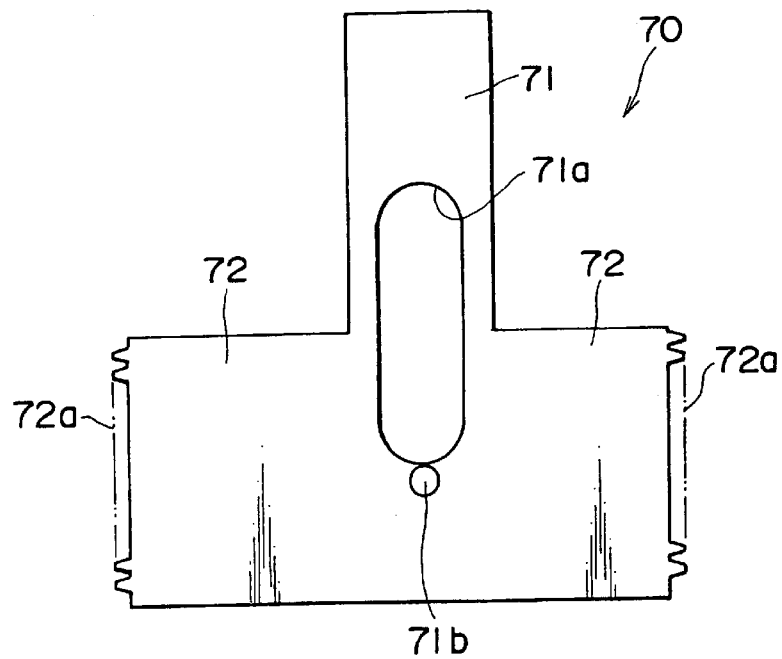

A drive force transmission slider 70 is supported on the back surface of the arrangement plate portion 5 in such a manner as to be movable in the longitudinal direction (see FIGS. 33 to 35). The drive force transmission slider 70 integrally includes a vertically-elongated rectangular plate portion 71 to be supported and two projecting plate portions 72 projecting rightward and leftward from the front half of the rectangular plate portion 71 to be supported. An escape hole 71a extending longer in the longitudinal direction is formed in a central portion in the longitudinal direction of the rectangular plate portion 71 to be supported. An engagement projection 71b projecting upward is provided at the front side opening edge of the escape hole 71a. The back surface of the rectangular plate portion 71 to be supported has, on the front and rear sides of the escape hole 71a, two grooves 71c to be guided. Two rack portions 72a are formed on both the right and left edges of the projecting plate portions 72.

Two transmission gears 73 are supported on a front end portion of the back surface of the arrangement plate portion 5 in such a manner as to be spaced from each other in the lateral direction (see FIG. 33). Each transmission gear 73 integrally includes a small gear 73a located on the upper side and a large gear 73b located on the lower side. The small gear 73a is meshed with the rack portion 72a on each of the right and left sides of the driver force transmission slider 70. The large gear 73b of the transmission gear 73 is meshed with the rack portion 55 of each of the lifting/lowering sliders 52.

A cam gear 74 is supported on the back surface of the arrangement plate portion 5 while covering, from below, the driver force transmission slider 70 (see FIGS. 33, 36 and 37). The cam gear 74 integrally includes a small gear portion 75 located on the upper side and a large gear portion 76 located on the lower side. The small gear portion 75, which passes through the first gear insertion hole 5e, is disposed on the upper surface side of the arrangement plate portion 5 and is meshed with the switching gear 63. An engagement pin 77 is provided at a position offset radially from the center on the back surface of the large gear portion 76 (see FIG. 37).

Figure 36:
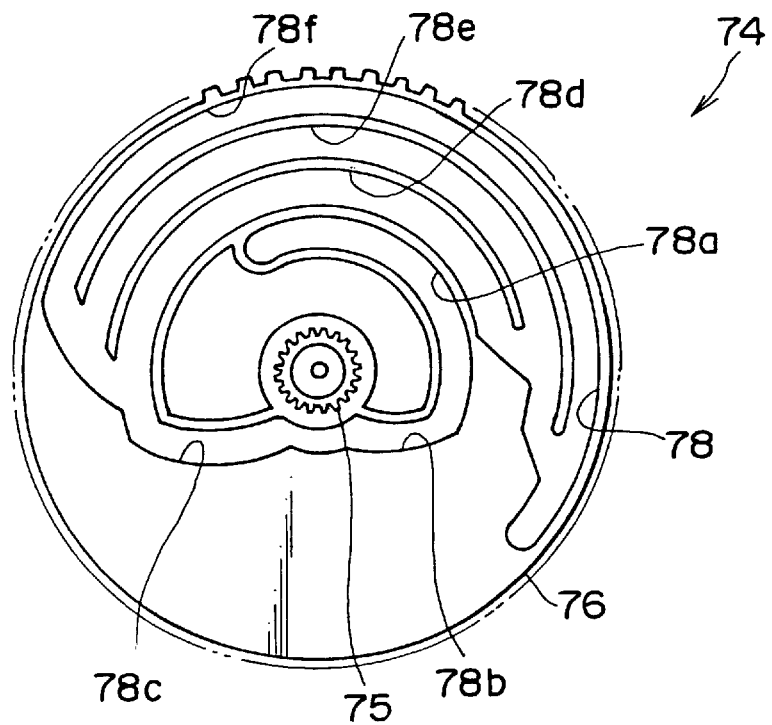
Figure 37:
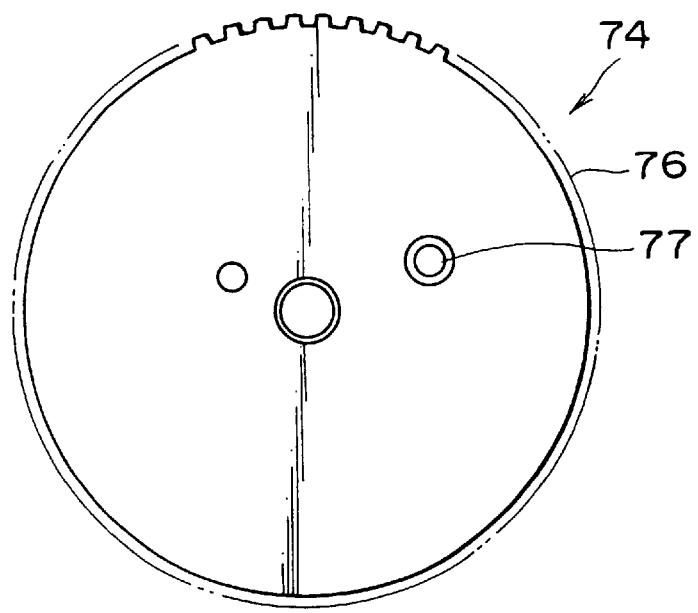

The upper surface of the cam gear 74 has a cam groove 78 (see FIG. 36). The cam groove 78 has a circular-arc shaped non-operational portion 78 located at a position offset to the center side of the cam gear 74; a first unit lifting/lowering portion 78b continuous to the non-operational portion 78a and displaced to the center side; a second unit lifting/lowering portion 78c continuous to the first unit lifting/lowering portion 78b and displaced to the outer peripheral side; a first circular-arc portion 78d continuous to the second unit lifting/lowering portion 78c and located outside the non-operational portion 78a; a second circular-arc portion 78e located outside the first circular-arc portion 78d; and a third circular-arc portion 78f located outside the second circular-arc portion 78e. The starting ends (that is, the ends on the unit lifting/lowering portion 78c and the ends on the opposed side) of the first circular-arc portion 78d, second circular-arc portion 78e, and third circular-arc portion 78f are continuous to each other. The length of the second unit lifting/lowering portion 78c is slightly longer than the length of the first unit lifting/lowering portion 78b.

The engagement projection 71b of the driver force transmission slider 70 is slidably engaged in the cam groove 78 of the cam gear 74.

Figure 38:
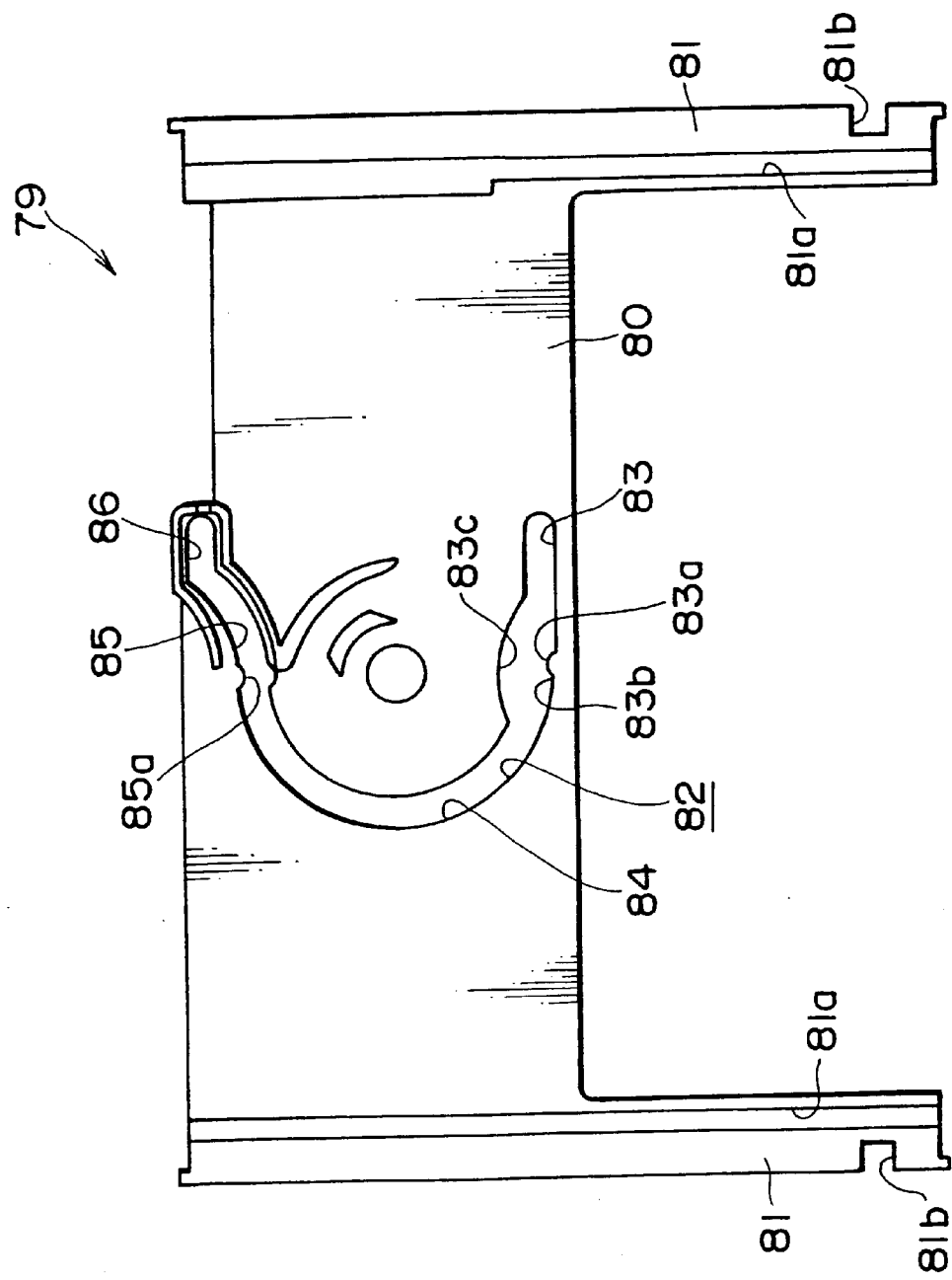
Figure 39:
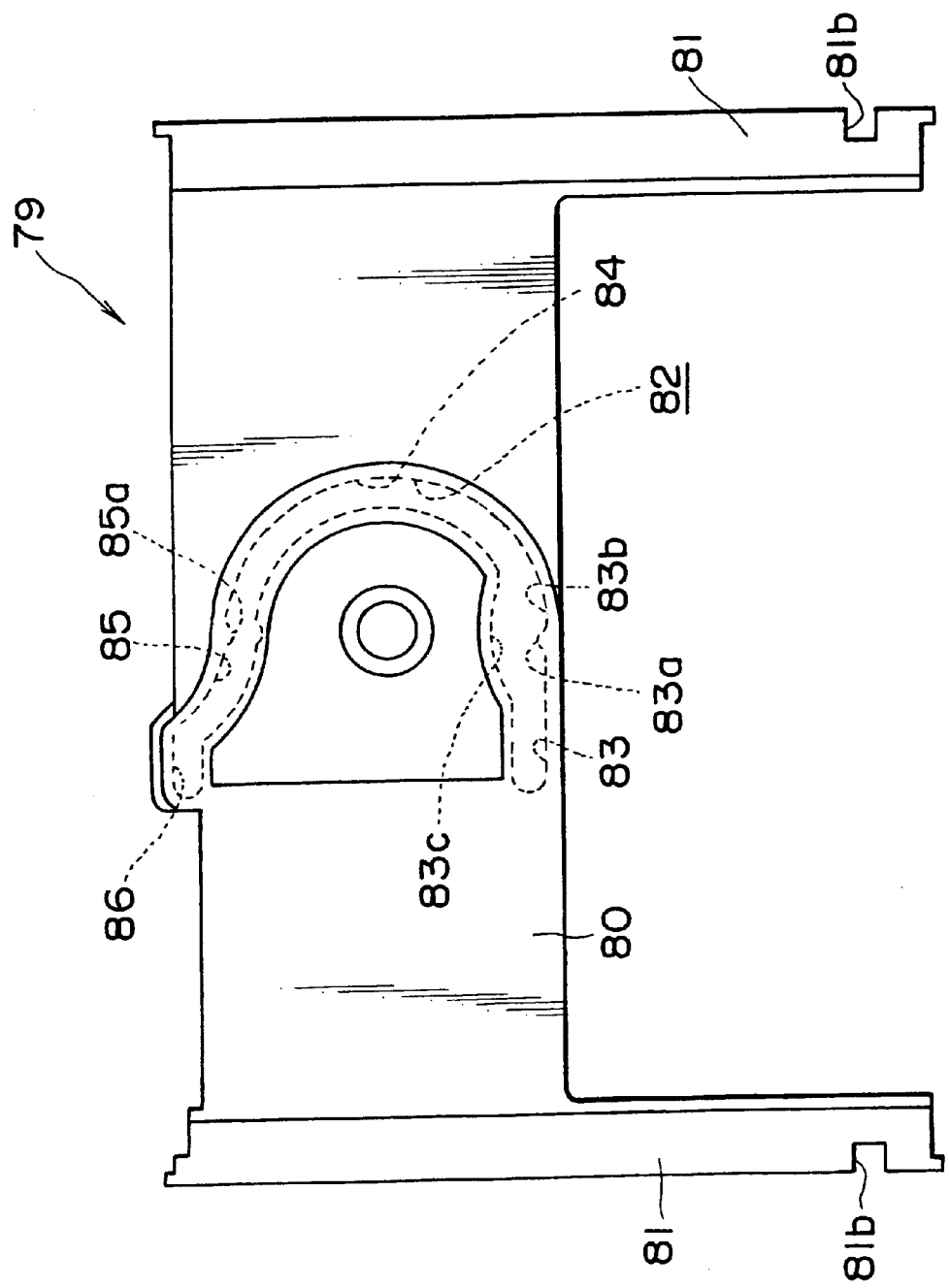

A slider 79 for movement is supported on the guide rails 5c provided on the back surface of the housing 2 in such a manner as to be movable in the longitudinal direction (see FIGS. 38 and 39). The slider 79 for movement integrally includes a horizontally-elongated rectangular main plate portion 80 and two projections 81 to be guided which project forward from both the side edges of the main plate portion 80.

The main plate portion 80 has, in a central portion in the lateral direction, a cam groove portion 82. The cam groove portion 82 has a starting end portion 83 positioned on the front end side and extending in the lateral direction, a front side circular-arc portion 84 continuous to the left end of the starting end portion 83 and formed into a large semicircular-arc shape projecting leftward, a rear side circular-arc portion 85 continuous to the rear end of the front side circular-arc portion 84 and projecting obliquely rightward, forward, and a trailing end portion 86 continuous to the rear side circular-arc portion 85 and extending in the lateral direction.

A circular-arc first projection 83a projecting slightly rearward is provided at a left end portion of the front side inner surface of the starting end portion 83. A left half 83b of the starting end portion 83 is wider than the other portion of the starting end portion 83, and a rear side inner surface 83c is formed into an obtusely circular shape projecting rearward. A circular-arc shaped second projection 85a projecting slightly forward is provided at a left end portion of the rear inner surface of the rear side circular-arc portion 85.

Each of the projections 81 to be guided of the slider 79 for movement has a groove 81a to be guided which is opened upward and extends in the longitudinal direction. The grooves 81a to be guided are slidably engaged on the guide rails 5c of the housing 2. The projection 81 to be guided has, at a position near the front end, a connecting recess 81b opened outward.

The slider 79 for movement, which is movably supported by the housing 2, is pressed, from below, by part of a slip-off preventive member (not shown) in order to be prevented from being slipped off from the housing 2.

Figure 40:
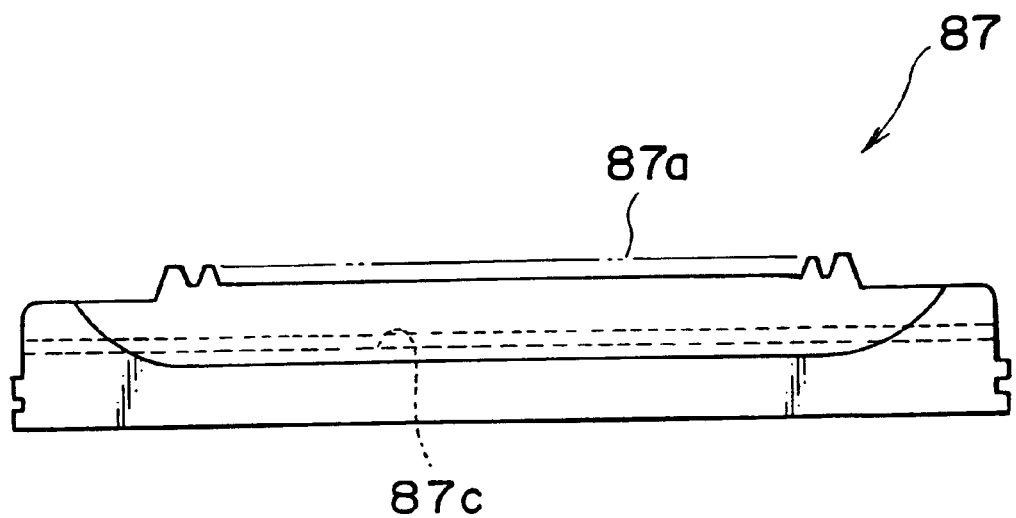
Figure 41:
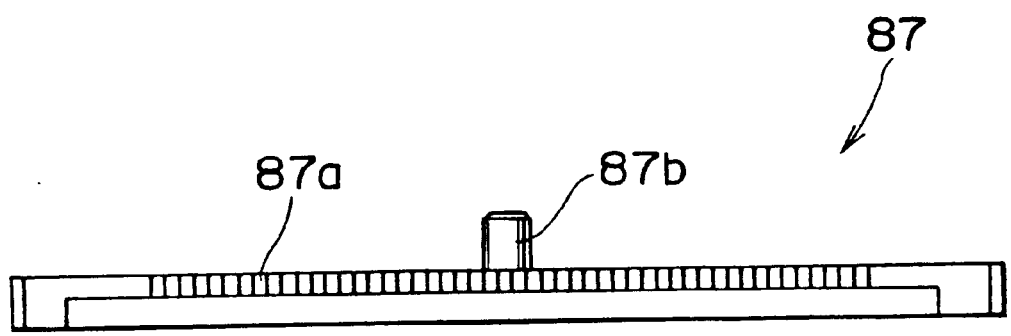

Two drive racks 87 are supported on the guide rails 4d provided on the side surface portions 4 of the housing 2 in such a manner as to be movable in the longitudinal direction (see FIGS. 40 to 42). Each of the drive racks 87 extends longer in the longitudinal direction. A rack portion 87a is formed on the upper edge of the drive rack 87 except for both end portions in the longitudinal direction. The drive rack 87 has, at a central portion in the longitudinal direction on the inner surface, a connecting pin 87b projecting inward. The drive rack 87 also has, in the inner surface, a groove 87c to be guided which extends in the longitudinal direction.

The groove 87c to be guided of the drive rack 87 is slidably supported on the guide rail 4d. The connecting pin 87b of the drive rack 87 is connected in the connecting recess 81b of the slider 79 for movement. In the state that the drive rack 87 is supported on the guide rail 4d in such a state, the drive rack 87 is moved in the longitudinal direction along with the movement of the slider 70 for movement. The drive rack 87 is held down, from side, by part of the above-described slip-off preventive member, to be thus prevented from being slipped off from the housing 2.

A first side surface gear 88 and a second side surface gear 89 are supported on each of the side surfaces 4 of the housing 2. The first side surface gear 88 is a two-stepped gear having a small gear 88a and a large gear 88b. The rack portion 87a of each drive rack 87 is meshed with the small gear 88a (see FIG. 42). The second side surface gear 89 is a two-stepped gear having a small gear 89a and a large gear 89b. The large gear 88b of the first side surface gear 88 is meshed with the small gear 89a, and the large gear 89b is meshed with the rack portion 17d of each of the rack members 17 supported by the main tray 8 (see FIG. 8). When the main tray 8 is moved in the longitudinal direction, the large gear 89b is released from the rack portion 17d of the rack member 17 and is meshed with the rack portion 14a of the main tray 8.

When the drive motor 67 is rotated, the drive force of the drive motor 67 is transmitted to the second intermediate gear 66 via the small pulley 68, the belt 69, the pulley member 64, and the first intermediate gear 65, to rotate the cam gear 74 meshed with the lower side gear portion 66b of the second intermediate gear 66. When the cam gear 74 is rotated, the switching gear 63 is rotated, to switch the first switch 61 and the second switch 62 from each other.

At the same time when the cam gear 74 is rotated, the drive force transmission slider 70 or the slider 79 for movement is selectively moved in the longitudinal direction.

When the drive force transmission slider 70 is moved, the transmission gears 73 meshed with the rack portions 72a of the drove force transmission slider 70 are rotated, to move the lifting/lowering sliders 52 in the longitudinal direction so as to lift/lower the unit holder 20, turn the chucking member 31, lift/lower the stocker 41, or lift the sub-tray 18 contained in the stocker 41.

On the other hand, when the slider 79 for movement is moved, the sub-tray 18 is moved in the longitudinal direction singly or integrally with the main tray 8 via the drive racks 87 connected to the slider 79 for movement, the first side surface gears 88, and the second side surfaces 89.

Figure 43:
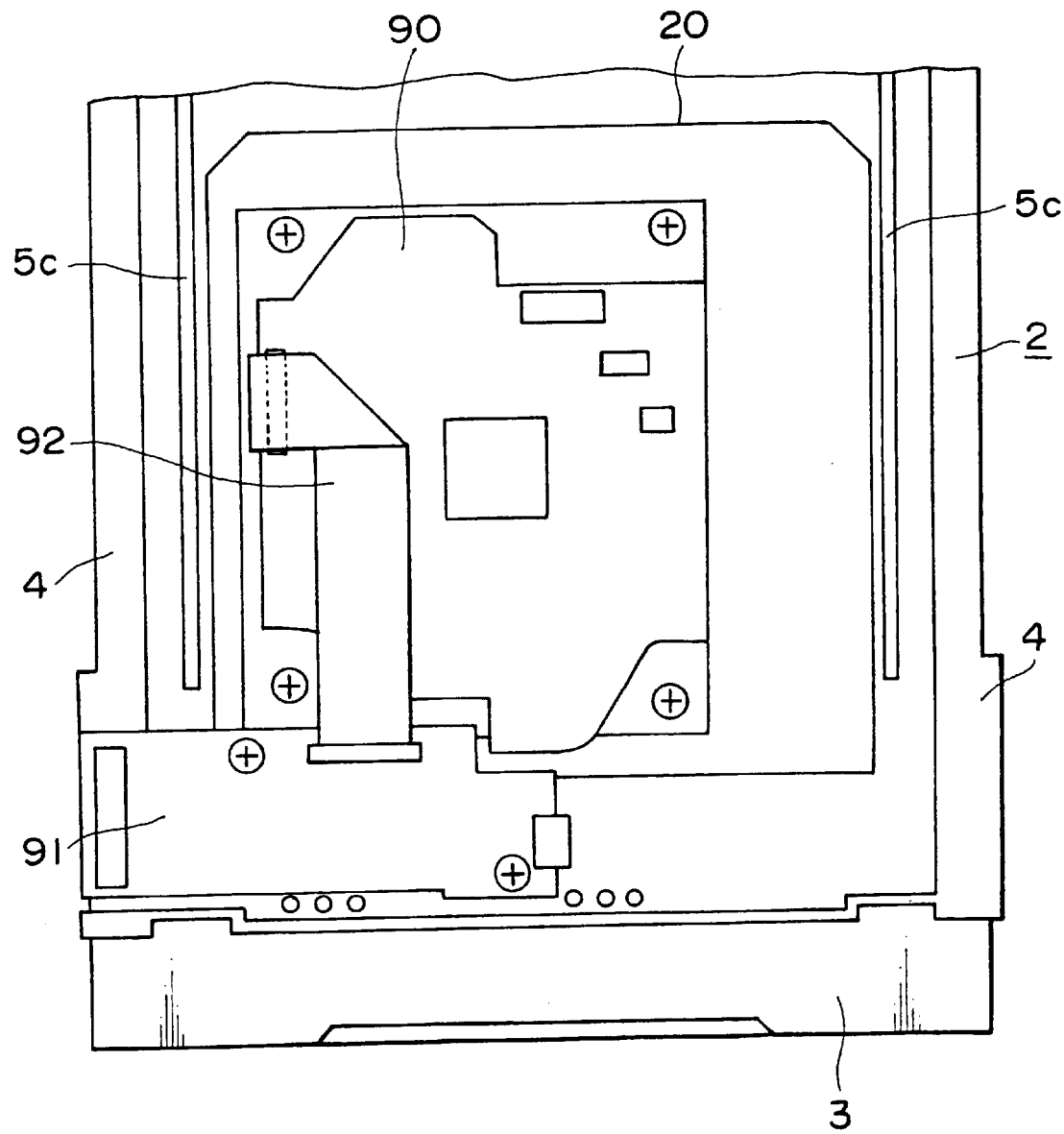

A control circuit board 90 is provided on the back surface of the base unit 24 (see FIG. 43). A relay board 91 is mounted on the back surface of a front end portion of the housing 2, and the control circuit board 90 is connected to the relay board 91 via a flexible printed board 92 (see FIG. 43) Another flexible printed board (not shown) is led from the relay board 91, and the relay board 91 is connected to a main board (not shown) for performing overall control of the acoustic equipment 100 via the flexible printed board.

Figure 44:
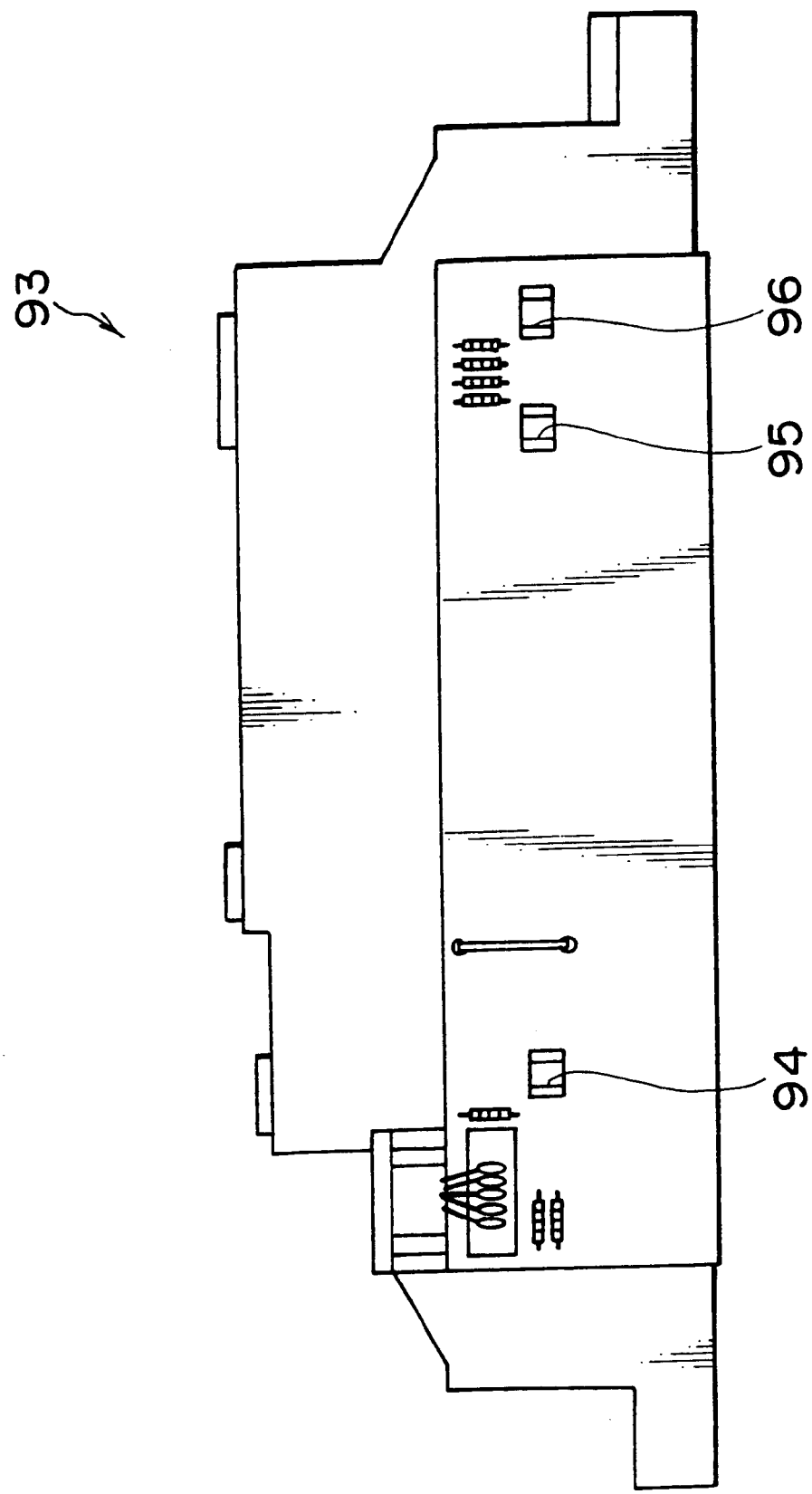

A rear surface panel 93 is mounted on a rear end portion of the housing 2 (see FIG. 44). Sensors 94, 95 and 96 are provided on the front surface of the rear surface panel 93 in such a manner as to be spaced from each other in the lateral direction. The sensors 94, 95 and 96 are provided at positions corresponding to positions in the lateral direction of the light shielding projecting pieces 18g, 18g and 18i provided on the sub-trays 18A, 18B and 18C. When each of the light shielding projecting pieces 18g, 18h and 18i of the sub-trays 18A, 18B and 18C is vertically moved in a slit of the corresponding one of the sensors 94, 95 and 96, detection light emitted from the sensor is shielded, whereby it can be decided which one of the sub-trays 18A, 18B and 18C is moving.

The operation of the disc changer apparatus 1 will be hereinafter described. In the following description, for an easy understanding, it is assumed that a state that the main tray 8 is pulled out together with the sub-tray 18 and is located at a pull-out position is taken as an initial state.

Figure 45:
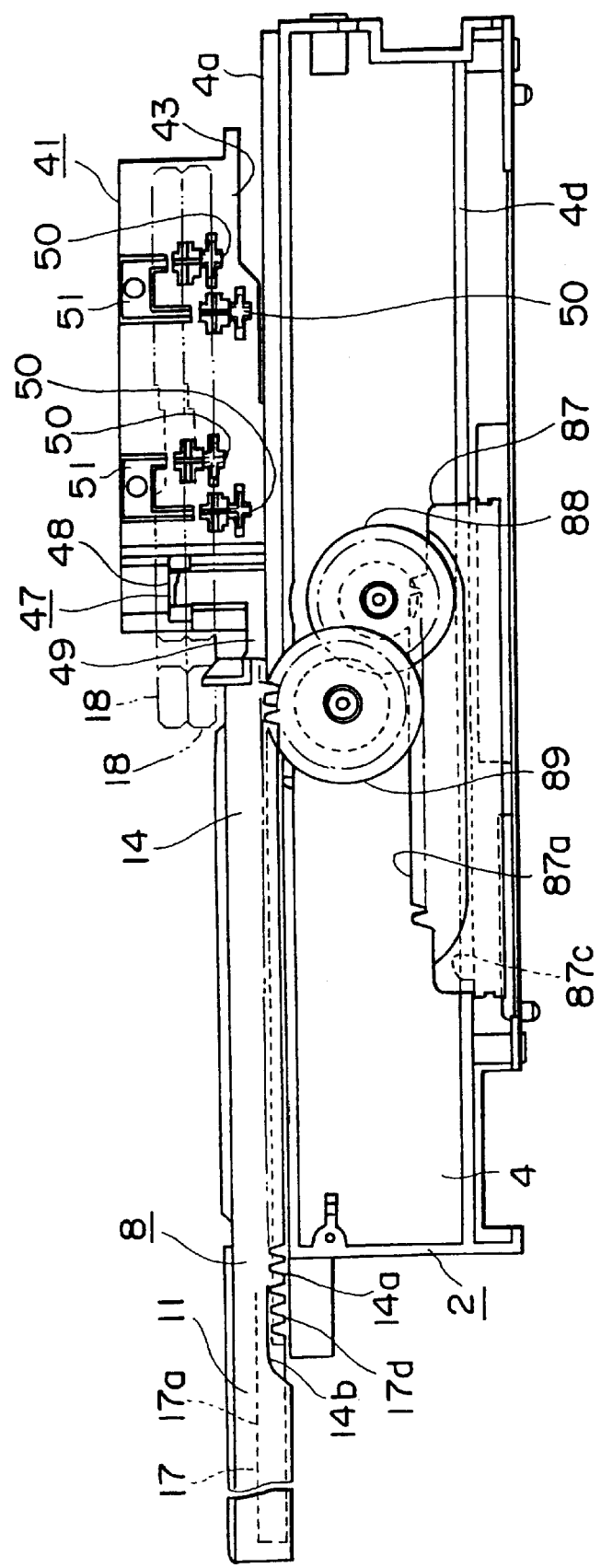

In the state that the main tray 8 is pulled out of the housing 2, that is, when the main tray 8 is located at a pull-out position together with the sub-tray 18, since the shaft portions 59*a* to be supported of the lock releasing levers 59 are engaged with the front end portions of the upper side horizontal portions 56*a* of the cam grooves 56 (for the lever) of the lifting/lowering sliders 52 to be thus kept in an approximately horizontal state (see FIG. 47), the pressing portions 59*b* are spaced from the lock levers 15. Accordingly, the lock projections 15*d* of the lock levers 15 biased by the torsion coil springs 16 are engaged in the locking recesses 18*e*, whereby the sub-tray 18 is locked with the main tray 8. Also, the connecting portions 17*c* of the rack members 17 are engaged in the connecting grooves 18*c* of the sub-tray 18, and thereby the rack members 17 are positioned at the front ends of the movement ranges of the rack members 17 (see FIG. 45). At this time, the second surface gears 89 are meshed with the rear end portions of the rack portions 14*a* of the main tray 8 (see FIG. 45).

Figure 46:
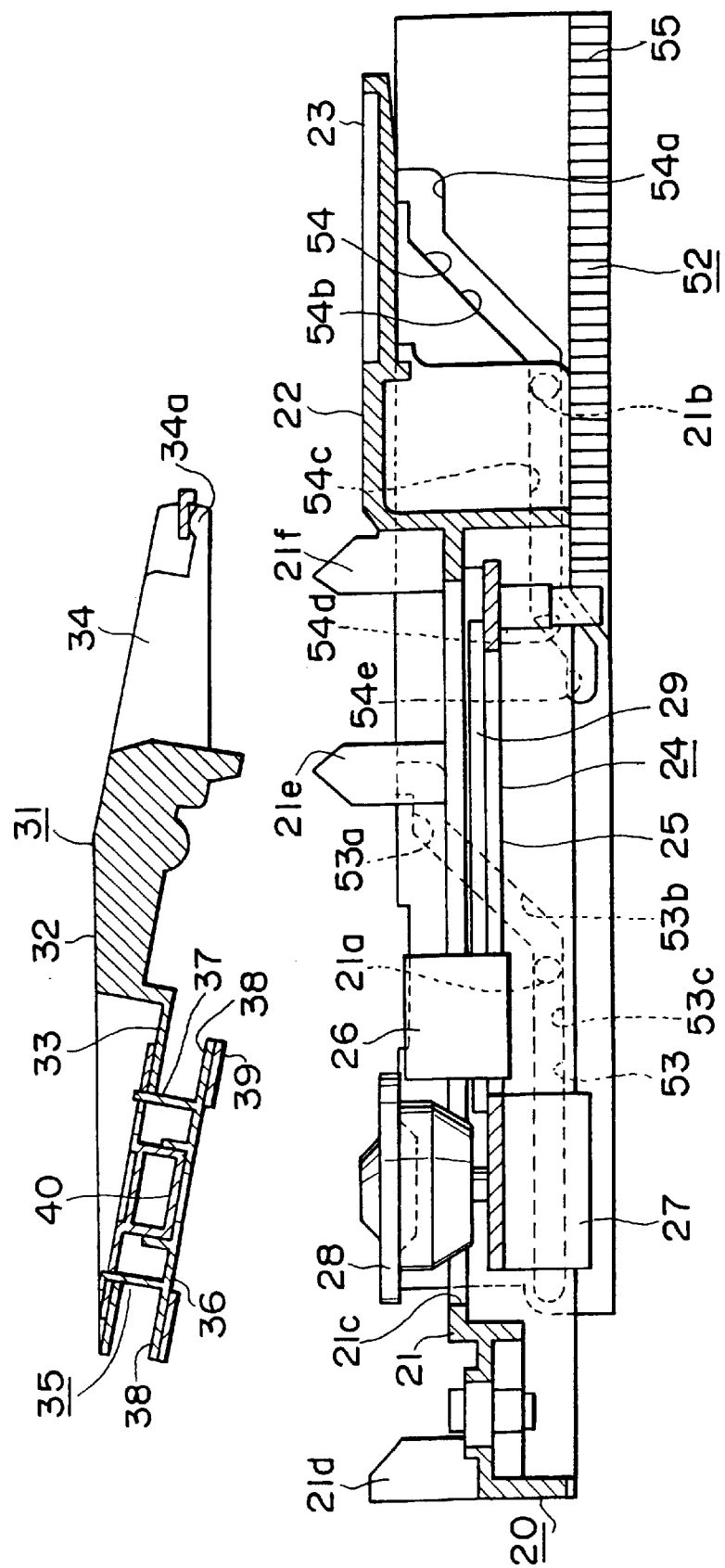

The unit holder 20 is located at a lower position, and in this state, the pins 21*a* and 21*b* to be supported, on each of side surfaces, of the unit holder 20 are engaged in the lower side horizontal portions 53*c* and 54*c* of the cam grooves 53 and 54 (for the unit holder) of each lifting/lowering slider 52, respectively (see FIG. 46). The stocker 41 is located at the upper end of the movement range thereof, and in this state, the pins 43*c* and 43*d* to be supported, on each of the side surfaces, of the stocker 41 are respectively engaged in the approximately central portions in the longitudinal direction of the upper side horizontal portions 57*a* and 58*a* of the cam groove 57 for the stocker and the duel purpose groove 58 of each lifting/lowering slider 52 (see FIG. 47).

Figure 47:
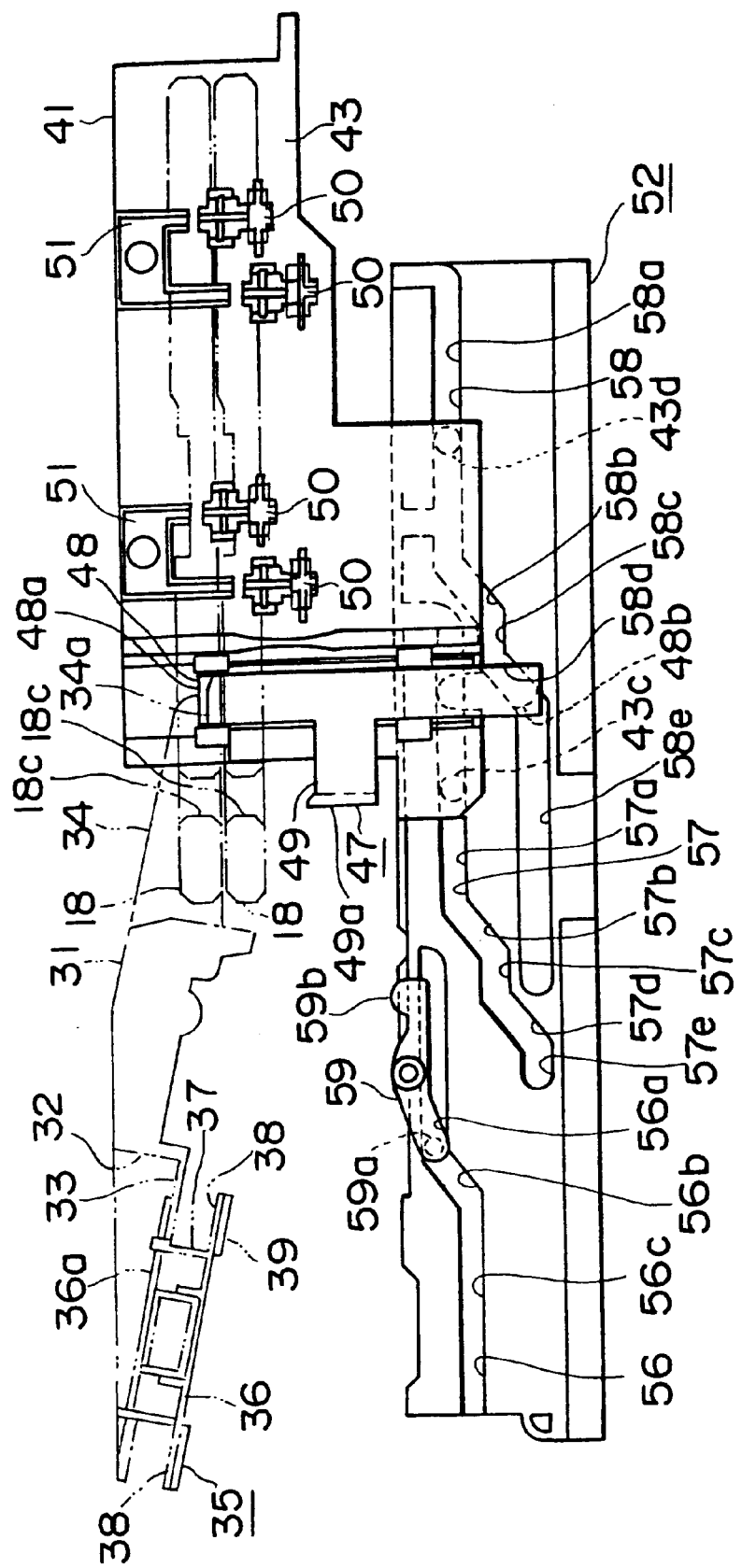

The hold-down members 47 supported by the stocker 41 are located at positions near the lower ends of the movement ranges thereof, and the shaft portions 48*b* are engaged in portions near the lower ends of the lower side tilt portions 58*d* of the duel purpose cam grooves 58 (see FIG. 47). Accordingly, the portions 34*a* to be held down of the chucking member 31 are held down, from above, by the hold-down pieces 48*a* of the hold-down members 47, so that the chucking pulley 35 is located on the upper side of the movement range thereof (see FIGS. 46 and 47). In addition, when the hold-down members 47 are located on the upper side, since the movement restricting portions 49*a* of the hold-down members 47 are inserted in the connecting grooves 18*c* of the sub-tray 18 contained in the stocker 41, the movement of the sub-tray 18 from the stocker 41 is restricted.

Figure 48:
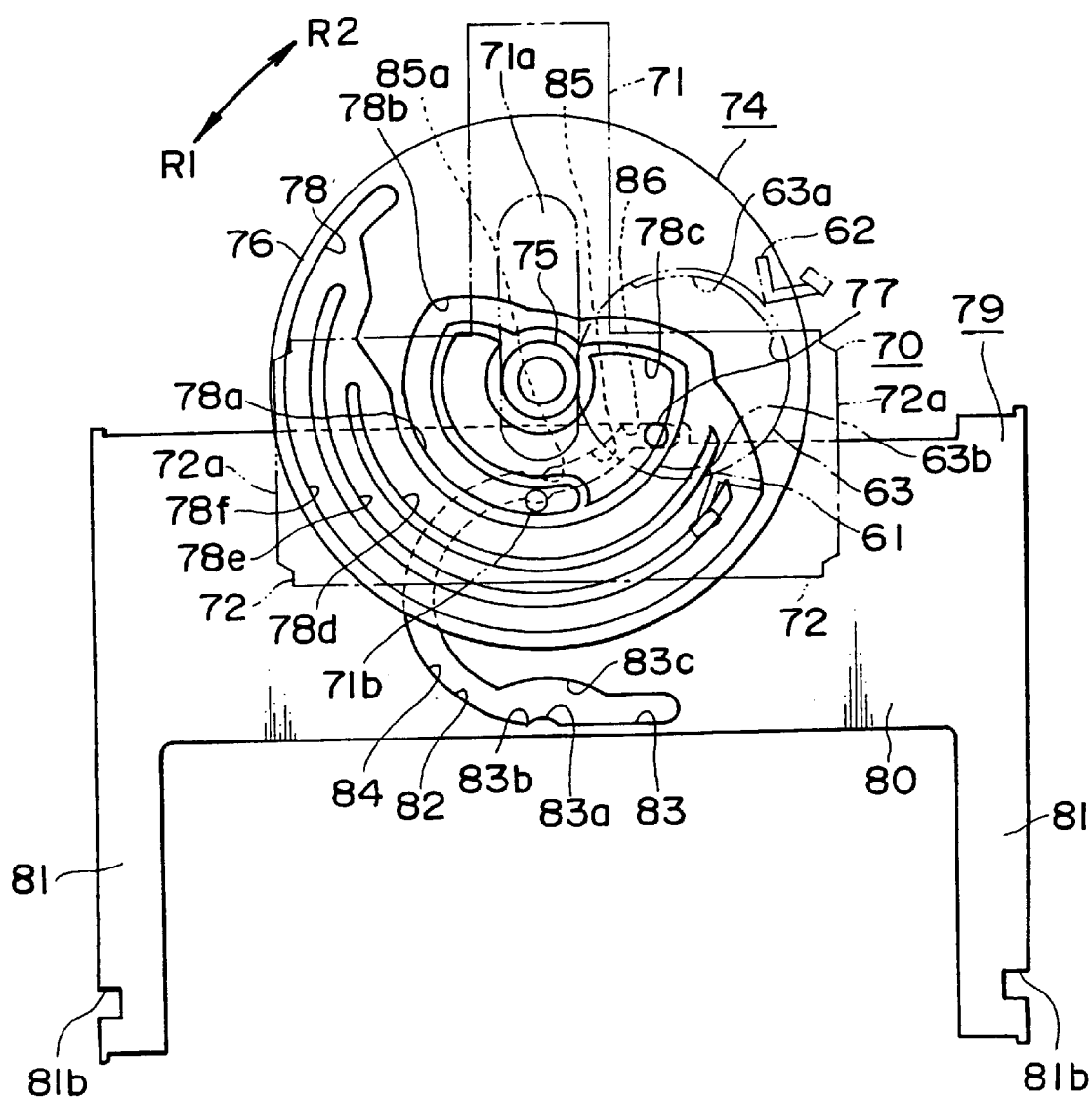

At this time, the slider 79 for movement is located at the front end of the movement range thereof, and the engagement pin 77 of the cam gear 74 is engaged in the trailing end portion 86 of the cam groove portion 82 of the slider 79 for the movement (see FIG. 48). The engagement projection 71*b* of the drive force transmission slider 70 is engaged in the starting end of the non-operational portion 78*a* of the cam gear 74, and located at an intermediate portion of the movement range thereof (see FIG. 48).

The first switch 61 and the second switch 62 provided on the switching circuit board 60 are brought into contact with the second operating piece 63*b* and the first operating piece 63*a* of the switching gear 63 to be turned on, respectively.

In addition, when the main tray 8 is located at the pull-out position, if any disc-like recording medium is not mounted on the sub-tray 18, a user can mount a disc-like recording medium on the sub-tray 18, and if a disc-like recording medium has been already mounted on the sub-tray 18, the user can mount another disc-like recording medium. Further, in the above-described state that the main tray 8 is located at the pull-out position, it is assumed that in the stocker 41, the first and second containing portions 41*a* and 41*b* have already contained the sub-trays 18 and the third containing portion 41*c* is opened (see FIGS. 45 and 47).

Figure 49:
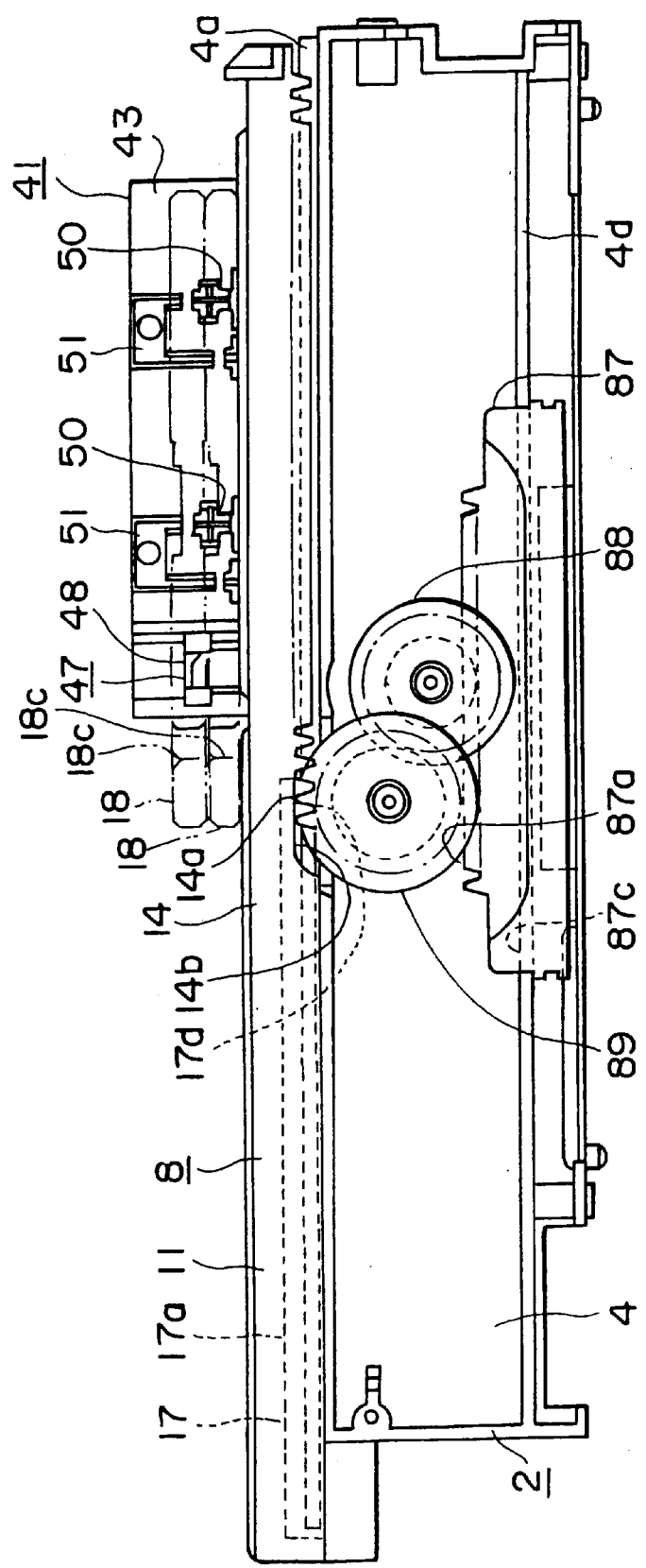

When the drive motor 67 is rotated in one direction in the state that the main tray 8 is located at the pull-out position, the cam gear 74 is rotated in a direction R1 shown in FIG. 48, so that the engagement pin 77 of the cam gear 74 is moved from the trailing end portion 86 to the rear side circular-arc portion 85 of the cam groove portion 82 of the slider 79 for movement while pressing the inner surfaces of these portions 86 and 85 of the cam groove portion 82, with a result that the slider 79 for movement is moved rearward. Accordingly, the second surface side gears 89 meshed with the rack portions 14*a* of the main tray 8 are rotated to move the main tray 8 rearward together with the sub-tray 18, whereby the main tray 8 and the sub-tray 18 are pulled in the housing 2 up to the disc mounting position (see FIG. 49). When the main tray 8 reaches the disc mounting position, the notch portion 14*a* is located at a position corresponding to that of each second side surface gear 89, so that the second side surface gear 89 is meshed with the rack portion 17*d* of the rack member 17 supported by the main tray 8 (see FIG. 49).

The user can manually move the main tray 8 located at the pull-out position to the disc mounting position by pressing the main tray 8 rearward. At this time, the engagement pin 77 of the cam gear 74 is moved from the trailing end portion 86 to the rear side circular-arc portion 85 of the cam groove portion 82 of the slider 79 for movement while pressing these portions 86 and 85 of the cam groove portion 82. In this case, since the rear side circular-arc portion 85 is formed into the obtusely circular-arc shape, the pressing load becomes small. As a result, it is possible to easily perform manual movement of the main tray 8 with a small force.

Even when the cam gear 74 is rotated as described above, the drive force transmission slider 70 is not moved in the longitudinal direction because the engagement projection 71*b* is relatively moved in the non-operational portion 78*a* of the cam groove 78. Accordingly, the positions of the unit holder 20, the chucking member 31, and the stocker 41 are not changed.

Figure 50:
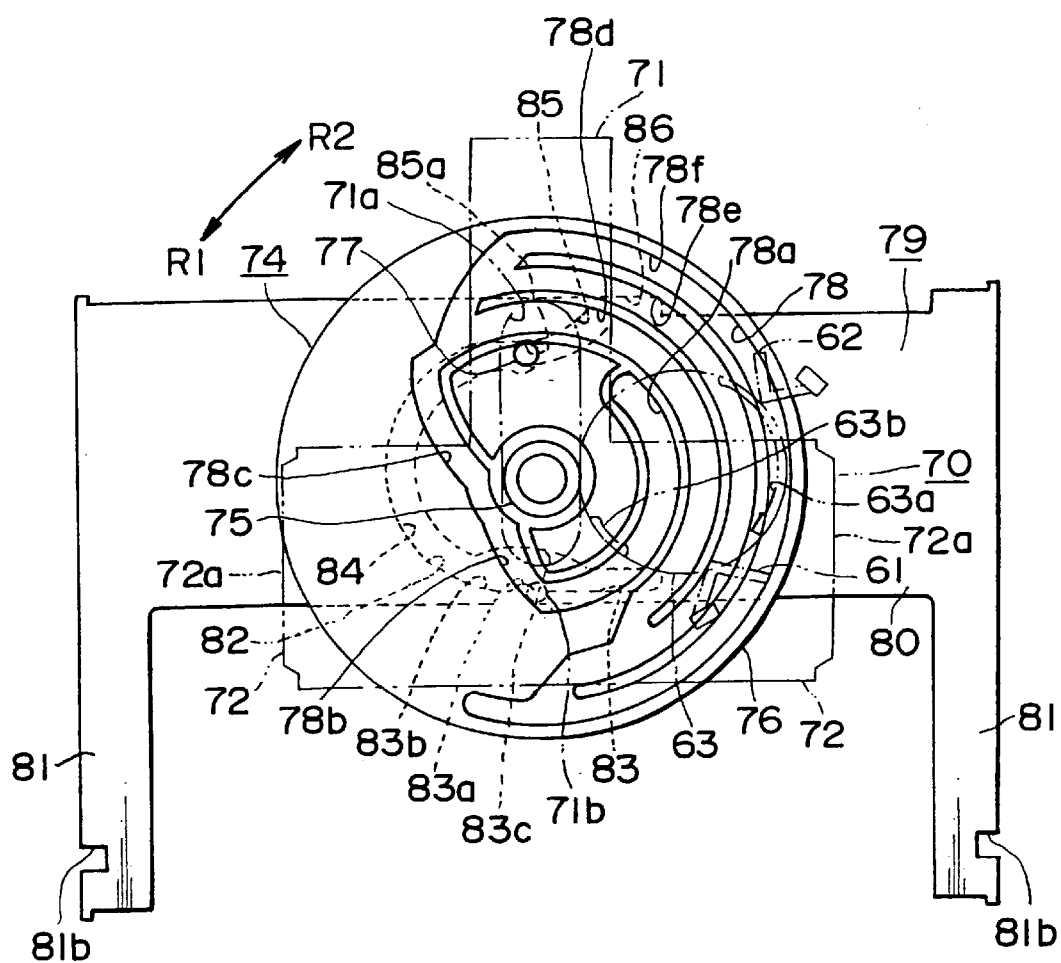

When the slider 79 for movement is moved rearward, the engagement pin 77 of the cam gear 74 is slightly moved from the trailing end portion 86 to the rear side circular-arc portion 85 of the cam groove portion 82 of the slider 79 for movement, and when the main tray 8 reaches the disc mounting position, the engagement pin 77 is positioned in the rear side circular-arc portion 85 (see FIG. 50). Further, when the main tray 8 reaches the disc mounting position, the engagement projection 71*b* of the slider 70 for movement is positioned at an intersection between the non-operational portion 78*a* of the cam groove 78 and the first unit lifting/lowering portion 78*b* (see FIG. 50).

On the other hand, the switching gear 63 is rotated by rotation of the cam gear 74, and when the main tray 8 reaches the disc mounting position, the second operating piece 63*b* of the switching gear 63*b* is separated from the first switch 61 to be turned off. At this time, the first operating piece 63*a* of the switching gear 63 is kept in contact with the second switch 62, that is, left turned off.

When the drive motor 67 is further rotated in the one direction after the main tray 8 is moved to the disc mounting position, the cam gear 74 is rotated in an R1 direction shown in FIG. 50, so that the engagement pin 77 of the cam gear 74 is relatively moved from the rear side circular-arc portion 85 to the front side circular-arc portion 84 of the cam groove portion 82 of the slider 79 for movement (see FIG. 55). Accordingly, the slider 79 for movement is no longer moved in the longitudinal direction, whereby the main tray 8 and the sub-tray 18 are held at the disc mounting position.

Figure 51:
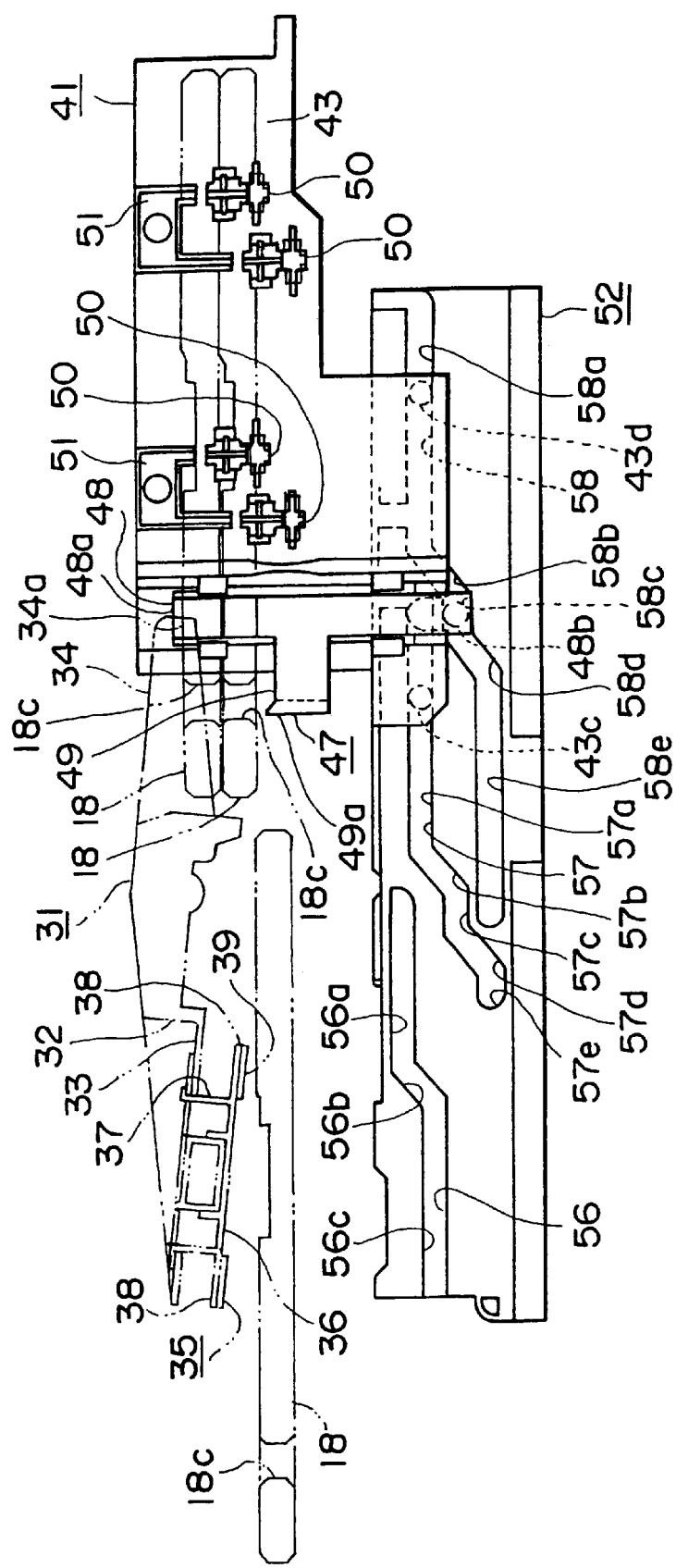
Figure 52:
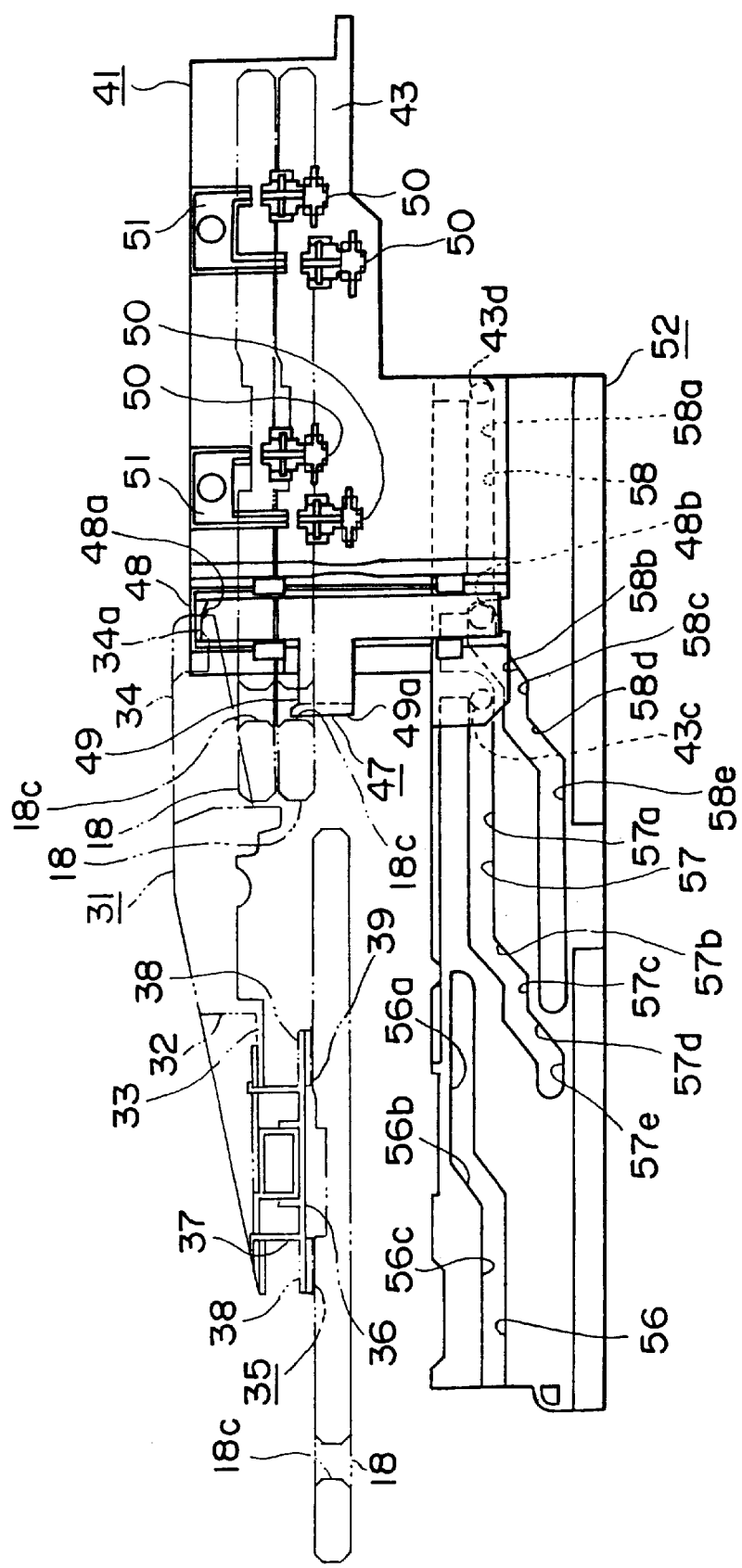

Along with the rotation of the cam gear 74, the engagement projection 71b of the drive force transmission slider 70 is relatively moved in the first unit lifting/lowering portion 78b of the cam groove 78, and thereby the drive force transmission slider 70 is moved rearward and the lifting/lowering sliders 52 are moved forward. Along with the forward movement of the lifting/lowering sliders 52, the shaft portions 48b of the hold-down members 47 supported on each of the right and left sides of the stocker 41 are moved from the lower side tilt portion 58d to the intermediate horizontal portion 58c of the duel purpose cam groove 58d (see FIG. 51), and further relatively moved from the upper side tilt portion 58b to the upper side horizontal portion 58a of the duel purpose cam groove 58 (see FIG. 52). Accordingly, the hold-down members 47 are moved up, and the chucking member 31 is turned in the direction where the front end portion of the chucking member 31 is moved down (see FIGS. 52 and 53).

On the other hand, even when the lifting/lowering sliders 52 are moved forward, the pins 43c and 43d to be supported, on each of the side surfaces, of the stocker 41 are relatively moved in the upper side horizontal portions 57a and 58a of the cam groove 57 for the stocker and the duel purpose cam groove 58 of each lifting/lowering slider 52, respectively, and accordingly, the pins 43c and 43d to be supported of the stocker 41 are not moved in the vertical direction and held at the movement ends thereof on the upper sides.

Figure 53:
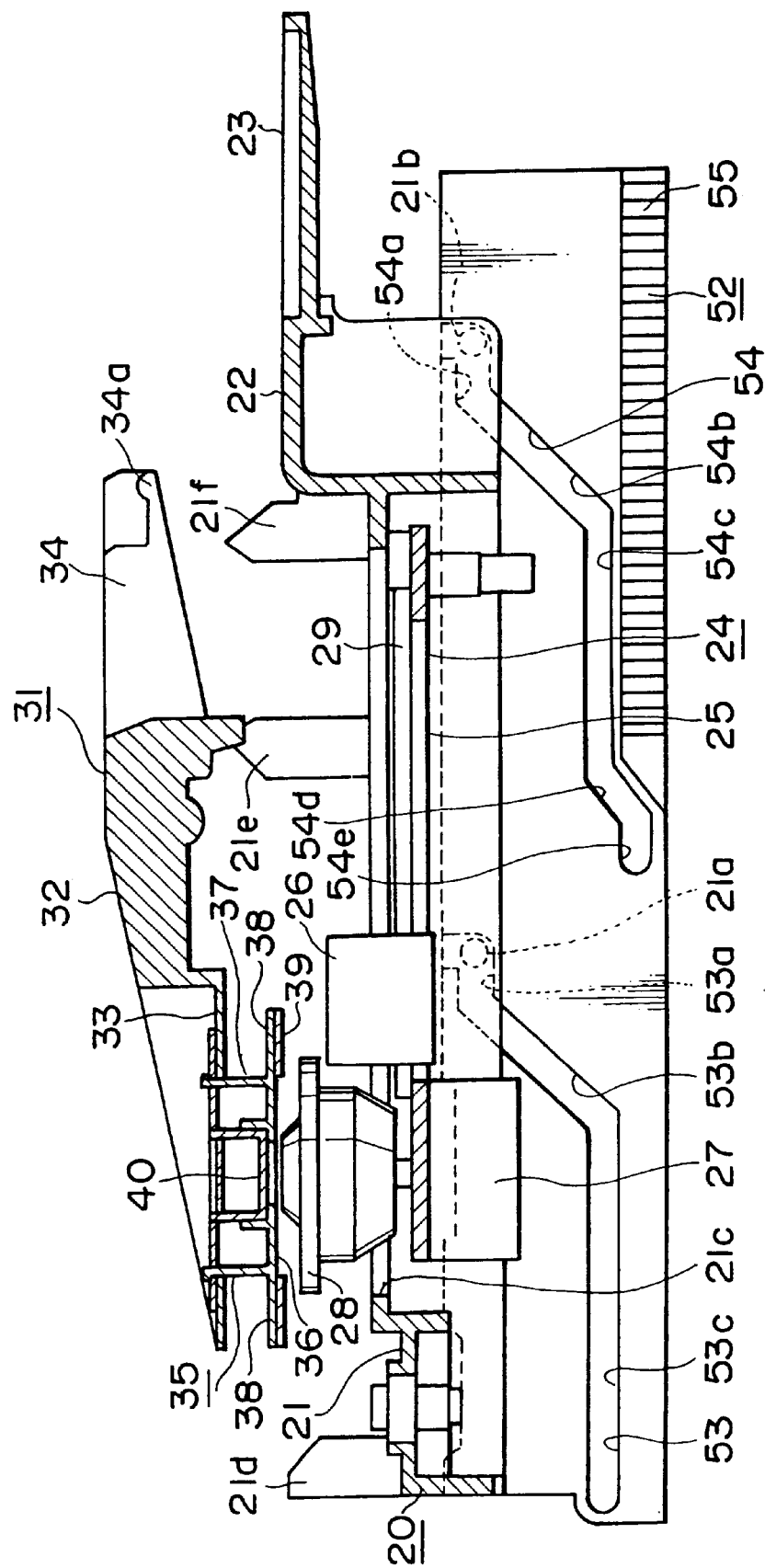

Along with the forward movement of the lifting/lowering sliders 52, the pins 21a and 21b to be supported, on each of the side surfaces, of the unit holder 20 are relatively moved from the lower side horizontal portions 53c and 54c to the upper side horizontal portions 53a and 54a via the tilt portions 53b and 54b of the cam grooves 53 and 54 for the unit holder, respectively (see FIG. 53). Accordingly, the unit holder 20 is lifted, and the disc table 28 is inserted in the center hole of the disc-like recording medium mounted on the sub-tray 18. Further, along with the lifting of the unit folder, the disc-like recording medium is separated upward from the sub-tray 18 and is held, that is, chucked between the disc table 28 and the chucking pulley 35 (see FIG. 53). At this time, the iron plate 40 provided on the chucking pulley 35 is attracted by the magnet 28a provided on the disc table 28 and also the disc-like recording medium is held on the magnet 28a in a state that the rubber 39 is in contact with the upper surface of the disc-like recording medium.

When the unit holder 20 is lifted, the positioning projections 21d provided on the unit holder 20 are inserted, from below, in the positioning holes 9c and the positioning holes 12a (vertically overlapped to the positioning holes 9c) of the main tray 8 and the positioning holes 18d of the sub-tray 18. Further, the positioning projections 21e of the unit holder 20 is brought into sliding-contact with the rear edge of the sub-tray 18, whereby the unit holder 20 is positioned to the sub-tray 18 (see FIG. 54). In this case, as described above, since the upper surfaces of the positioning projections 21d and 21e are tilted, the positioning projections 21d of the unit holder 20 can be certainly inserted in the positioning holes 9c and 12a of the main tray 8 and the positioning holes 18d of the sub-tray 18, and the positioning projections 21e of the unit holder 20 can be certainly brought into contact with the rear edge of the sub-tray 18.

Accordingly, the disc table 28 can be certainly inserted in the center hole of the disc-like recording medium mounted on the sub-tray 18, and the disc-like recording medium can be certainly chucked.

Figure 54:
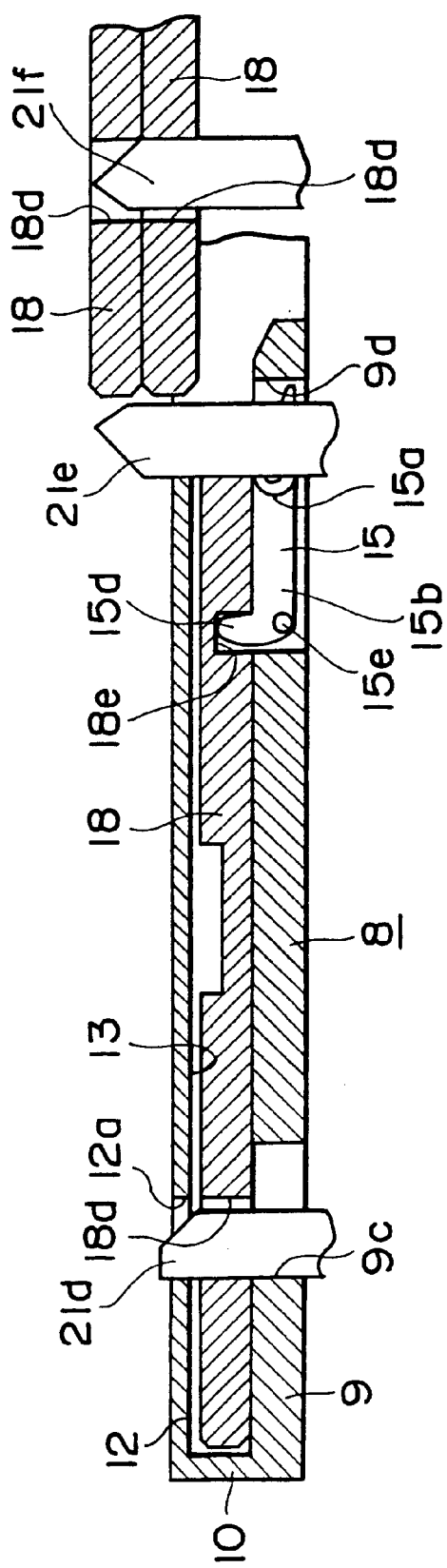

In addition, when the unit holder 20 is lifted, the positioning projections 21f provided at the rear end portion of the unit holder 20 are inserted, from below, in the positioning holes 18d of the sub-trays 18 contained in the stocker 41, whereby the movement of the sub-trays 18 in the longitudinal direction is restricted (see FIG. 54).

Along with the rotation of the cam gear 74, the engagement projection 71b of the drive force transmission slider 70 is relatively moved in the first unit lifting/lowering portion 78b of the cam groove 78, and when the disc-like recording medium is chucked, the engagement projection 71b is positioned at an intersection between the first unit lifting/lowering portion 78b and the second unit lifting/lowering portion 78c, that is, at a position, closest to the center portion of the cam gear 74, of the cam groove 74 (see FIG. 55) Accordingly, the lifting/lowering sliders 52 are no longer moved forward and are positioned at the front ends of the movement ranges thereof.

After the disc-like recording medium is chucked by the disc table 28 and the chucking pulley 35 as described above, the disc-like recording medium thus chucked is rotated by the spindle motor 27 and simultaneously information signals recorded on the disc-like recording medium are reproduced by drive of the optical pickup.

On the other hand, when the switching gear 63 is rotated by rotation of the cam gear 74 and the disc-like recording medium is chucked, the first and second operating pieces 63a and 63b do not operate, that is, turn off the first and second switches 61 and 62, respectively (see FIG. 55). As a result, it is detected that the disc-like recording medium is located at the reproducing position.

When the drive motor 67 is further rotated in the one direction after the reproducing of the information signals recorded on the disc-like recording medium is ended, the cam gear 74 is rotated in the R1 direction shown in FIG. 55, so that the engagement pin 77 of the cam gear 74 is further relatively moved in the front side circular-arc portion 84 of the cam groove portion 82 of the slider 79 for movement. Accordingly, the slider 79 for movement is not moved in the longitudinal direction and thereby the main tray 8 and the sub-tray 18 are held at the mounted positions.

Figure 56:
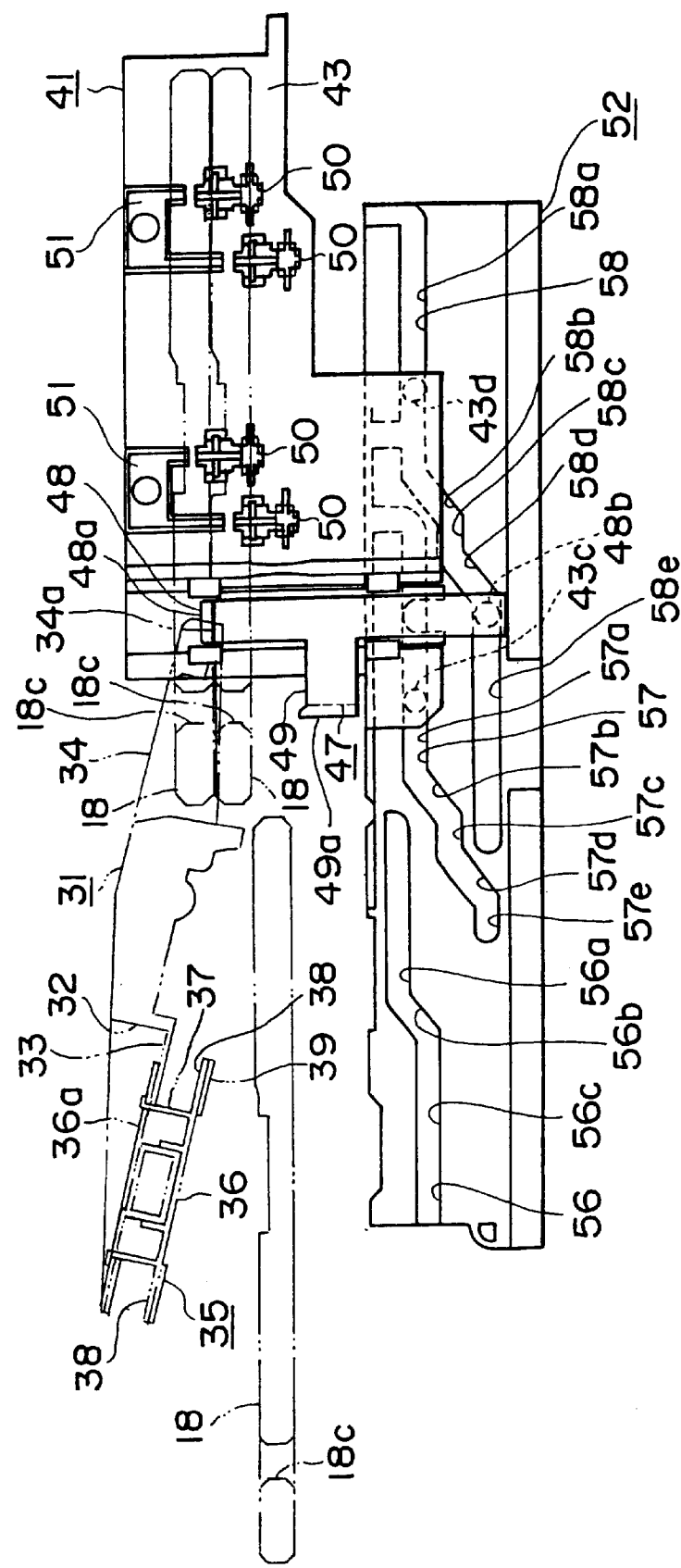

Along with the rotation of the cam gear 74, the engagement projection 71b of the drive force transmission slider 70 is relatively moved in the unit lifting/lowering portion 78c of the cam groove 78, so that the drive force transmission slider 70 is moved forward and the lifting/lowering sliders 52 are moved rearward. When the lifting/lowering sliders 52 are moved rearward, the shaft portions 48b of the hold-down members 47 supported on each of the right and left sides of the stocker 41 are moved from the upper side horizontal portion 58a to the lower side horizontal portion 58e of the duel purpose cam groove 58 (see FIG. 56) of each lifting/lowering slider 52. Accordingly, the hold-down members 47 are moved down and thereby the chucking member 31 is turned in the direction being separated from the disc table 28. The chucking of the disc-like recording medium is thus released.

On the other hand, even when the lifting/lowering sliders 52 are moved rearward, the pins 43c and 43d to be supported, on each of the side surfaces, of the stocker 41 are relatively moved in the upper side horizontal portions 57a and 58a of the cam groove 57 for the stocker and the duel purpose cam groove 58 of each lifting/lowering slider 52, respectively, and accordingly, the pins 43c and 43d to be supported of the stocker 41 are not moved in the vertical direction and held at the movement ends on the upper sides.

Along with the rearward movement of the lifting/lowering sliders 52, the pins 21a and 21b to be supported, on each of the side surfaces, of the unit holder 20 are relatively moved from the upper side horizontal portions 53c and 54c to the lower side horizontal portions 53a and 54a via the tilt portions 53b and 54b of the cam grooves 53 and 54 (for the unit holder) of each lifting/lowering slider 52, respectively. Accordingly, the unit holder 20 is lowered, and thereby the disc-like recording medium is mounted again in the sub-tray 18 and the disc table 28 is moved down from the sub-tray 18.

When the unit holder 20 is lowered, the positioning projections 21d, 21e, and 21f provided on the unit holder 20 are also lowered.

Figure 57:
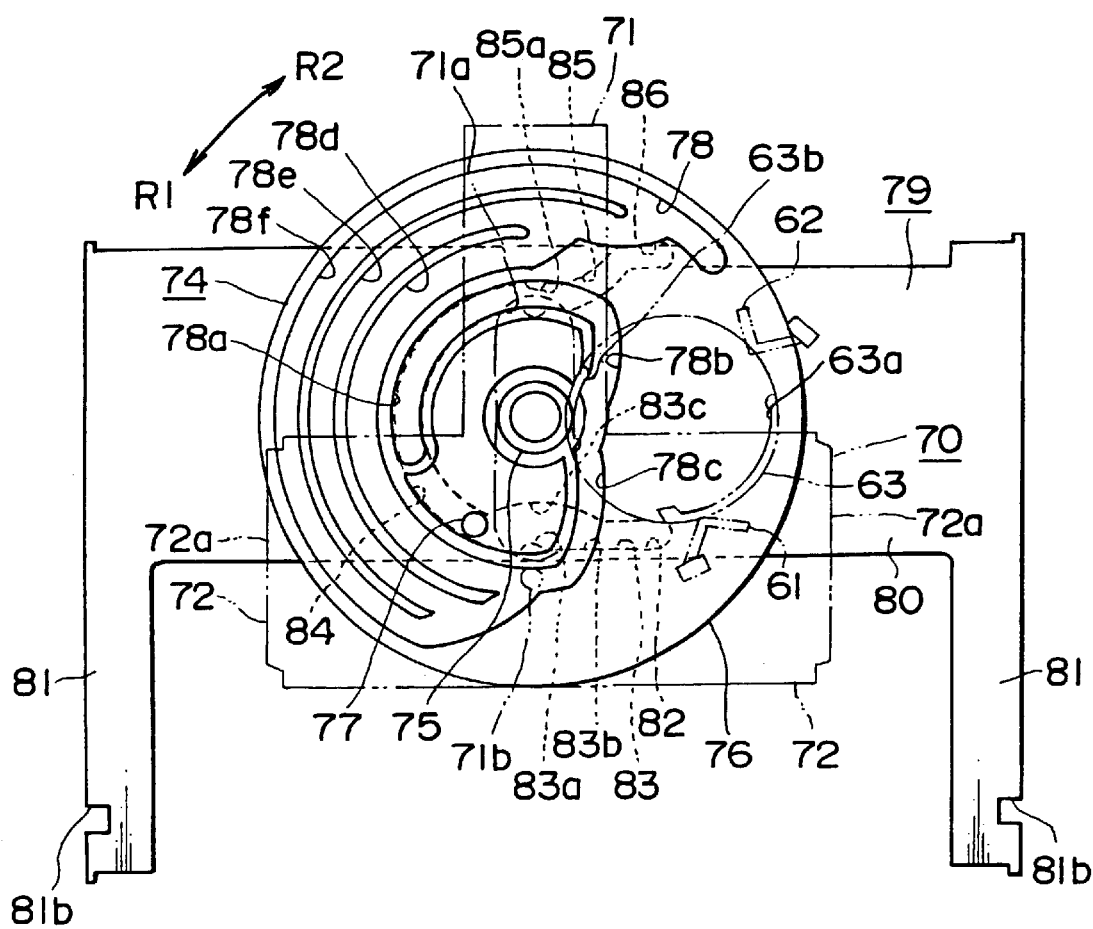

Along with the rotation of the cam gear 74, the engagement projection 71b of the drive force transmission slider 70 is relatively moved in the second unit lifting/lowering portion 78c of the cam groove 78, and when the unit holder 20 is lowered, the engagement projection 71b is relatively moved to a position near the intersection between the second unit lifting/lowering portion 78c and the first circular-arc portion 78d (see FIG. 57).

On the other hand, along with the rotation of the cam gear 74, the switching gear 63 is rotated, and when the unit holder 20 is lowered and the chucking of the disc-like recording medium is released, the first operating piece 63a is brought into contact with the first switch 61 to turn on the first switch 61, with the second switch 62 left turned off (see FIG. 57).

Since the length of the second unit lifting/lowering portion 78c is slightly longer than the length of the first unit lifting/lowering portion 78b as described above, when the unit holder 20 is lowered, each lifting/lowering slider 52 is moved rearward over the position thereof on the initial state. Accordingly, the lock releasing lever 59 is relatively moved from the upper side horizontal portion 56a to the lower side horizontal portion 56c via the tilt portion 56b of the cam groove 56 (for the lever) of each lifting/lowering slider 52 (see FIG. 58).

When the shaft portion 59a to be supported of each lock releasing lever 59 is engaged in the lower side horizontal portion 56c, the lock releasing lever 59 is turned in the direction where the pressing portion 59b is moved up, whereby the pressing portion 59b presses, from below, the portion 15c to be operated of the lock lever 15. When the portions 15c to be operated of the lock levers 15 are pressed, the lock levers 15 are turned against the biasing forces of the torsion coil springs applied around the supporting shafts 15a, to release the locking of the sub-tray 18 by the locking projections of the lock levers 15. Further, since the pressing portions 59b of the lock releasing levers 59 come in proximity to or in contact with the front ends of the projecting pieces 9f to be restricted of the main tray 8, the movement of the main tray 8 in the longitudinal direction is restricted (see FIG. 58). Accordingly, the sub-tray 18 and the main tray 8 are independently movable rearward.

Figure 59:
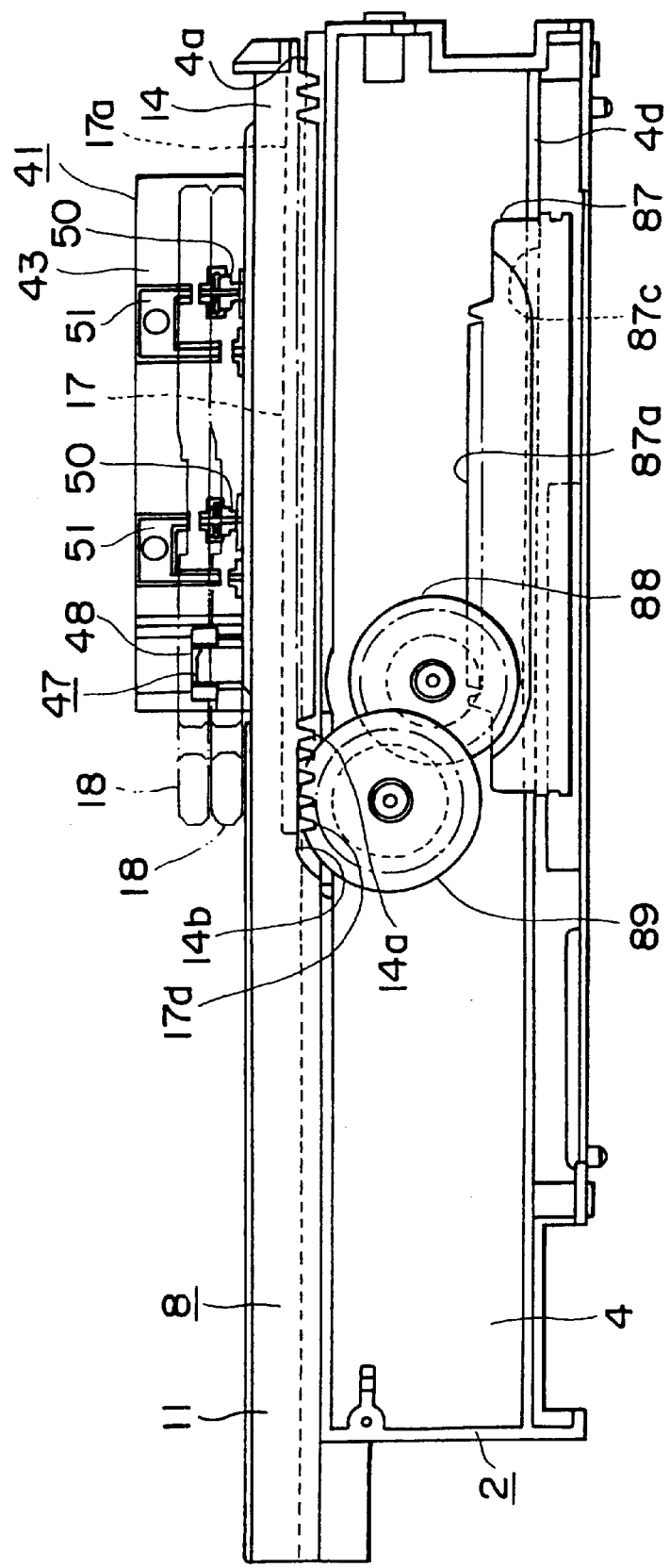
Figure 60:
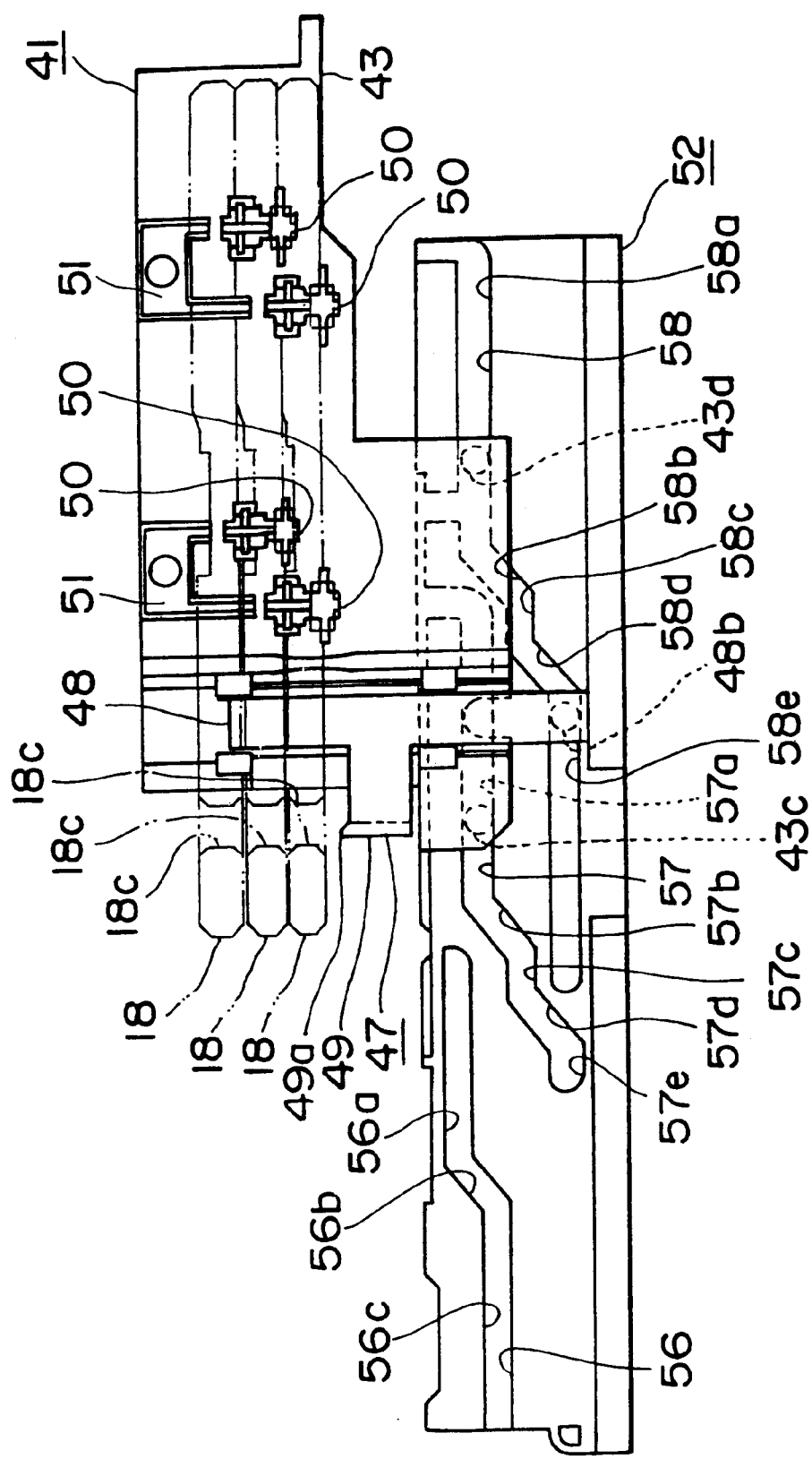

When the drive motor 67 is further rotated in the one direction after the unit holder 20 is lowered as described above, the cam gear 74 is rotated in the R1 direction shown in FIG. 57, so that the engagement pin 77 of the cam gear 74 is relatively moved from the front side circular-arc portion 84 to the starting end portion 83 of the cam groove portion 82 of the slider 79 for movement (see FIG. 61), to press the inner surface of the starting end portion 83 rearward, whereby the slider 79 for movement is moved rearward. Accordingly, the second side surface gears 89 meshed with the rack portions 17d of the rack members 17 are rotated, whereby the sub-tray 18 is singly moved rearward (see FIG. 59). At this time, since the third containing portion 41c of the stocker 41 is positioned at the back of the sub-tray 18, the sub-tray 18 moved rearward is contained in the third containing portion 41c (see FIG. 60).

Even when the cam gear 74 is rotated as described above, since the engagement projection 71b of the drive force transmission slider 70 is relatively moved in the first circular-arc portion 78d of the cam groove 78, the drive force transmission slider 70 is not moved in the longitudinal direction. Accordingly, the positions of the unit holder 20, the chucking member 31 and the stocker 41 are not changed.

Figure 61:
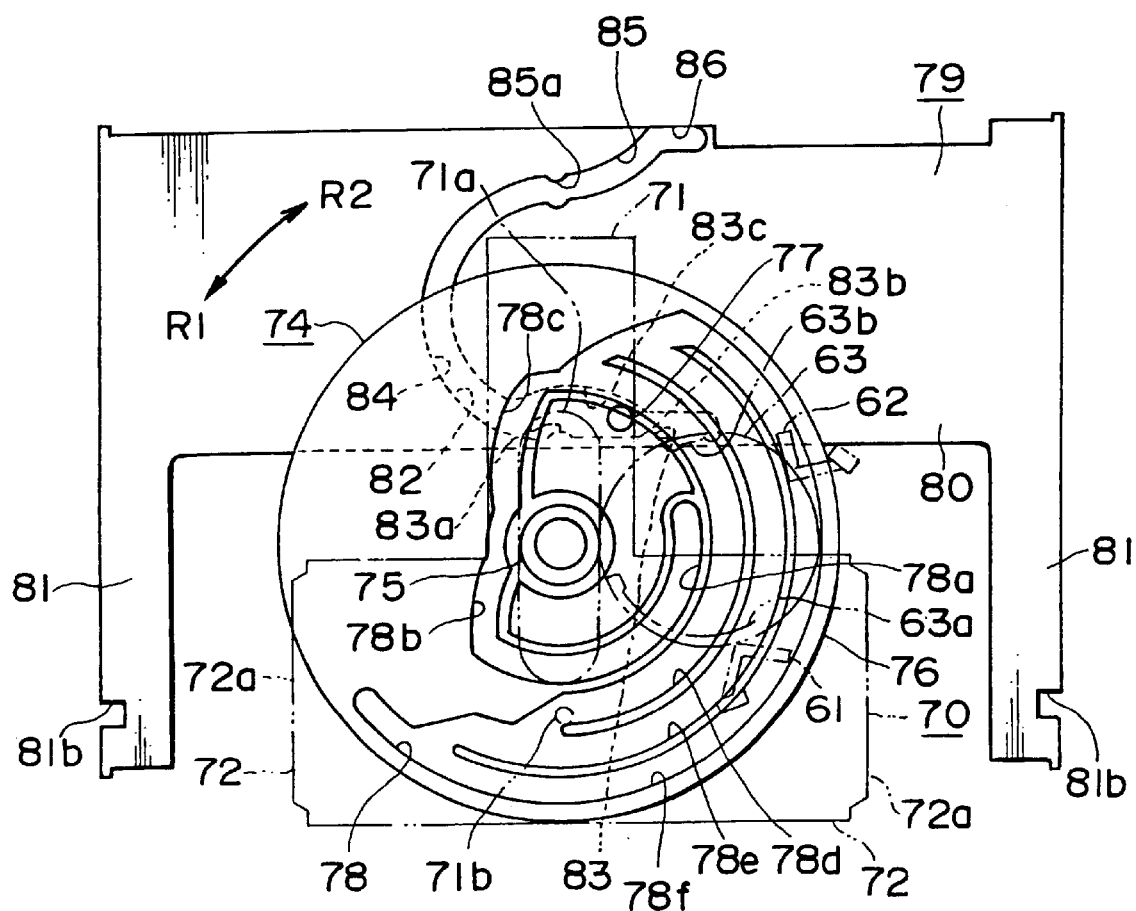

When the sub-tray 18 is contained in the stocker 41 and moved to a disc containing position and the slider 79 for movement is moved rearward to the movement end on the rear side, the engagement pin 77 of the cam gear 74 is positioned at an approximately central portion of the starting end portion 83 of the cam groove portion 82 of the slider 79 for movement (see FIG. 61). When the sub-tray 18 reaches the disc containing position, the engagement projection 71b of the drive force transmission slider 70 is positioned at the trailing end of the first circular-arc portion 78d of the cam groove 78 (see FIG. 61).

On the other hand, when the switching gear 63 is rotated by rotation of the cam gear 74 and the sub-tray 18 reaches the disc containing position, the first operating piece 63a is brought into contact with the first switch 61 to turn on the first switch 61 (see FIG. 61), with the second switch 62 lest turned off.

When the drive motor 67 is further rotated in the one direction after the sub-tray 18 is contained in the stocker 41, the cam gear 74 is rotated in the R1 direction shown in FIG. 61, so that the engagement pin 77 of the cam gear 74 is moved in the left half 83b of the starting end portion 83 of the cam groove portion 82 of the slider 79 for movement. As described above, the left half 83b of the starting end portion 83 is wider than the other portion of the starting end portion 83, and the inner surface 83c is formed into a circular shape. As a result, when the cam gear 74 is rotated in the state that the sub-tray 18 is contained in the stocker 41, the engagement pin 77 is moved while being not brought into contact with both the inner surfaces of the left half 83b (see FIG. 62), and accordingly the slider 79 for movement is stopped at the rear side movement end, with a result that the sub-tray 18 is not moved in the longitudinal direction.

When the cam gear 74 is rotated as described above, the engagement projection 71b of the drive force transmission slider 70 is relatively moved from the trailing end of the first circular-arc portion 78d to the second circular-arc portion 78e of the cam groove 78 (see FIG. 62), so that the drive force transmission slider 70 is moved forward and the lifting/lowering sliders 52 are moved rearward. When the lifting/lowering sliders 52 are moved rearward, the shaft portions 48b of the hold-down members 47 supported on each of the right and left sides of the stocker 41 are relatively moved forward in the lower side horizontal portion 58e of the duel purpose cam groove 58 of each lifting/lowering slider 52 (see FIG. 63). As a result, the hold-down members 47 are not moved in the vertical direction and thereby the chucking member 31 is held at the movement end on the upper side.

Figure 63:
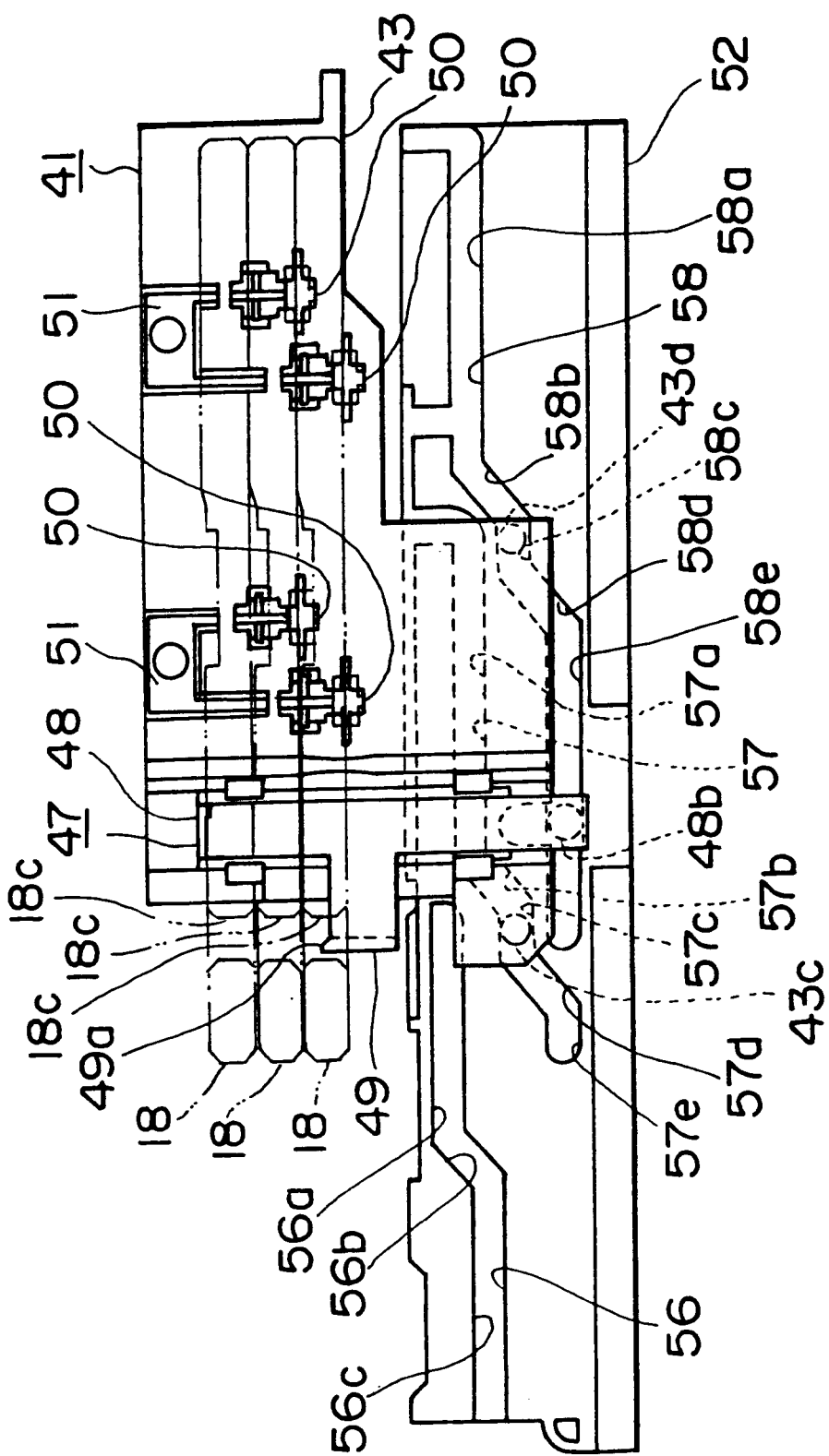

On the other hand, when the lifting/lowering sliders 52 are moved rearward, the pins 43c and 43d to be supported, on each of the side surfaces, of the stocker 41 are relatively moved from the upper side horizontal portions 57a and 58a to the intermediate horizontal portions 57c and 58c via the upper side tilt portions 57b and 58b of the cam groove 57 for the stocker and the duel purpose cam groove 58 of each lifting/lowering slider 52 (see FIG. 63). Accordingly, the stocker 41 is lowered to an intermediate height, so that the sub-tray 18 contained in the second containing portion 41b is positioned on the rear side of the main tray 8. When the sub-tray 18 contained in the second containing portion 41b is positioned on the rear side of the main tray 8, the connection of the connecting portions 17c of the rack members 17 of the main tray 8 into the connecting grooves 18c of the sub-tray 18 contained in the third containing portion 41c is released, and the connecting portions 17c of the rack members 17 of the main tray 8 are connected into the connecting grooves 18c of the sub-tray 18 contained in the second containing portion 41b.

Along with the rearward movement of the lifting/lowering sliders 52, the pins 21a and 21b to be supported, on each of the side surfaces, of the unit holder 20 are relatively moved in the lower side horizontal portions 53c and 54c of the cam grooves 53 and 54 (for the unit holder) of each of the lifting/lowering slider 52, respectively. Accordingly, the unit holder 20 is not moved in the vertical direction.

On the other hand, when the switching gear 63 is rotated by rotation of the cam gear 74 and thereby the pins 43c and 43d to be supported, on each of the side surfaces, of the stocker 41 are relatively moved in the intermediate horizontal portions 57c and 58c of the cam groove 57 for the stocker and the duel purpose cam groove 58 of each lifting/lowering slider 52, respectively, the first operating piece 63a is brought into contact with the first switch 61 to turn on the first switch 61 (see FIG. 62), with the second switch 62 left turned off.

Figure 64:
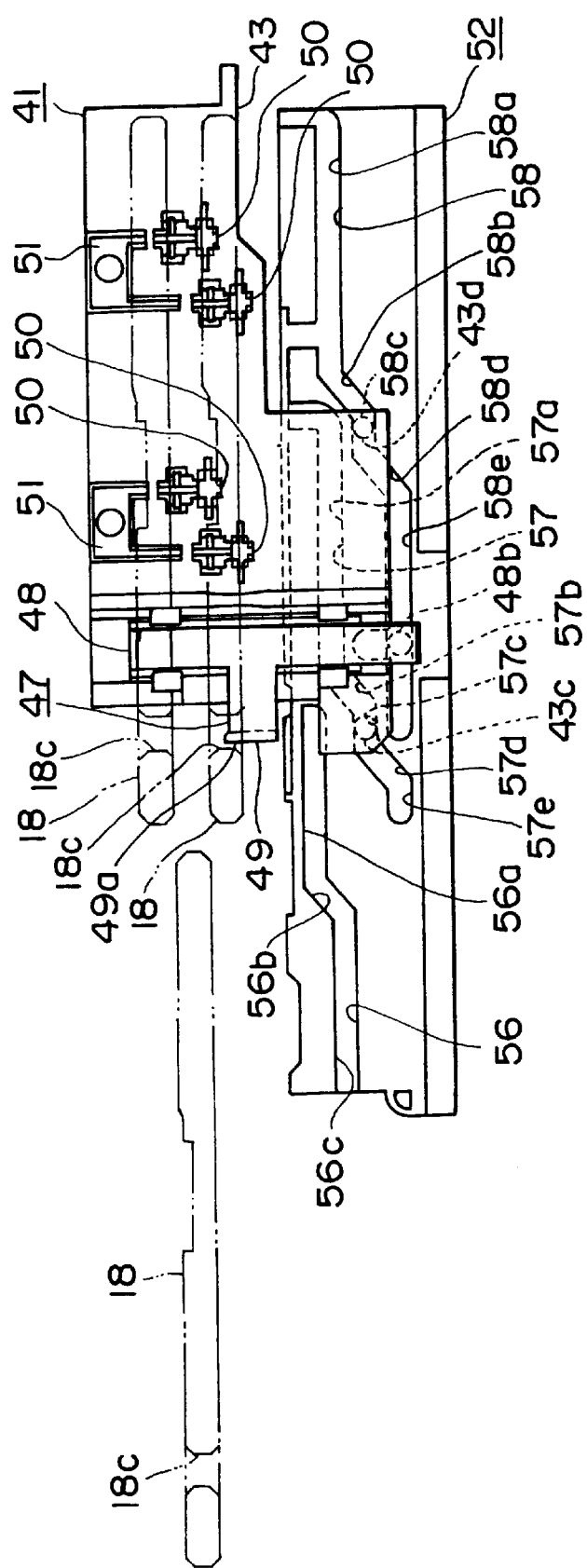

At this time, the rotation of the drive motor 67 is once stopped, and when the drive motor 67 is rotated in the direction reversed to the above-described one direction, the sub-tray 18 contained in the second containing portion 41b of the stocker 41 is pulled out of the stocker 41 and is moved to the disc mounting position (see FIG. 64).

Figure 62:
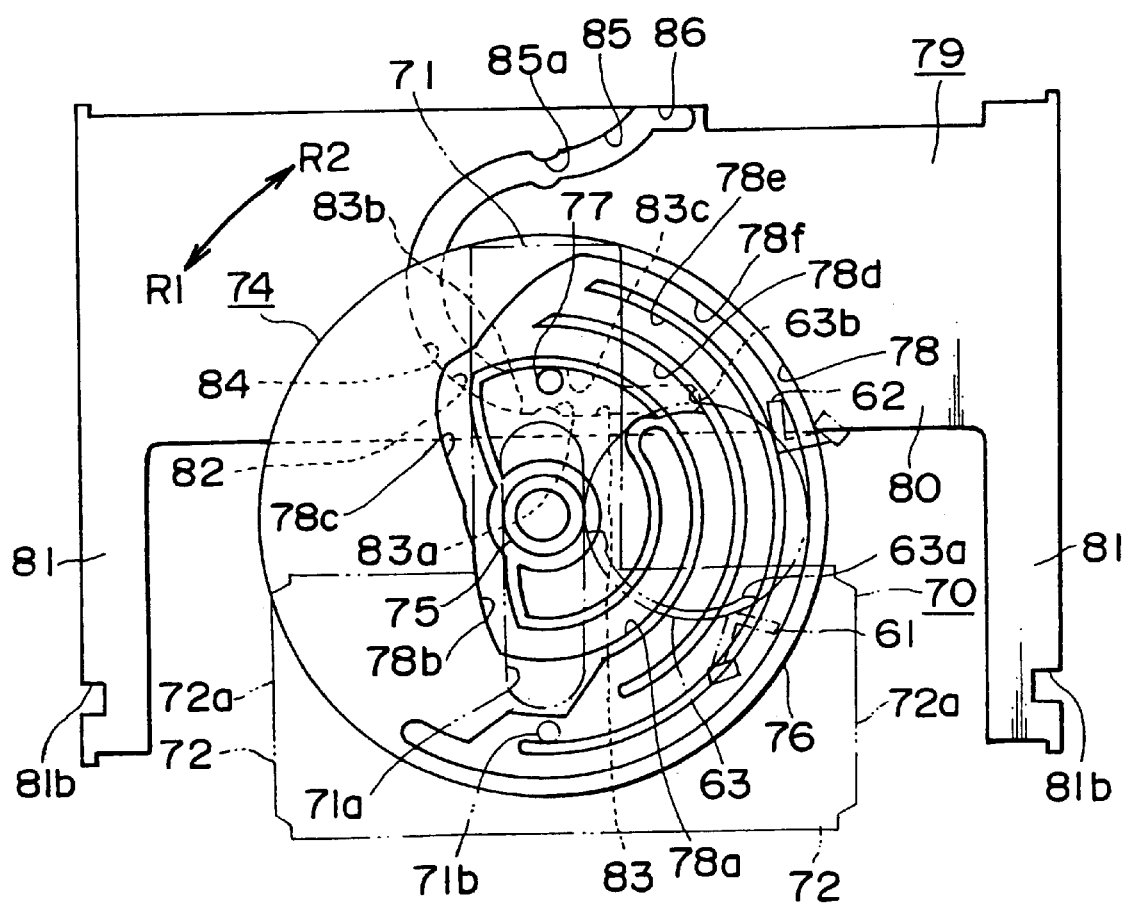

To be more specific, when the drive motor 67 is rotated in the direction reversed to the above-described one direction, the cam gear 74 is rotated in an R2 direction shown in FIG. 62, so that the engagement pin 77 of the cam gear 74 presses forward the inner surface of the starting end portion 83 of the cam groove portion 82 of the slider 79 for movement. Accordingly, the slider 79 for movement is moved forward and thereby the second side surface gears 89 are rotated in the direction reversed to the above-described direction. As a result, the rack portions 17d of the rack members 17 are fed forward, whereby the sub-tray 18 is moved forward to the disc mounting position (see FIG. 64). When the sub-tray 18 reaches the disc mounting position, the sub-tray 18 is locked with the main tray 8 with the lock levers 15.

Figure 65:
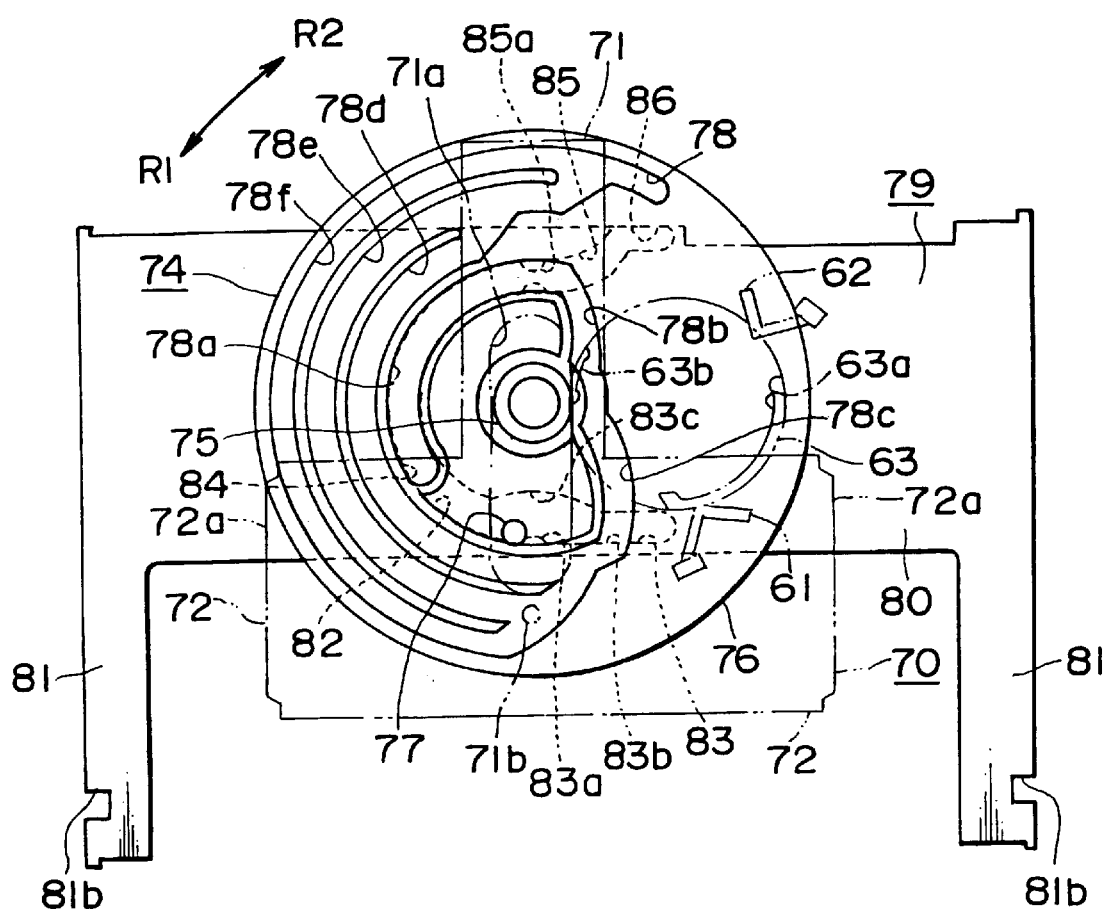

When the sub-tray 18 reaches the disc mounting position, the engagement projection 71b of the drive force transmission slider 70 is positioned at the starting end of the second circular-arc portion 78e of the cam groove 78 (see FIG. 65).

When the sub-tray 18 contained in the second containing portion 41b is positioned on the rear side of the main tray 8 located in the state shown in FIG. 62, the drive motor 67 is not stopped and continuously rotated in the one direction. At this time, the cam gear 74 is rotated in the R1 direction, so that like the above-described operation, the engagement pin 77 is moved while being not brought into contact with any of both the inner surfaces of the left half 83b (see FIG. 66). As a result, the slider 79 for movement is stopped at the movement end on the rear side, and thereby the sub-tray 18 is not moved in the longitudinal direction.

When the cam gear 74 is further rotated, the engagement projection 71b of the drive force transmission slider 70 is relatively moved to the trailing end of the third circular-arc portion 78f via the trailing end of the second circular-arc portion 78e of the cam groove 78 (see FIG. 66), so that the drive force transmission slider 70 is further moved forward and the lifting/lowering sliders 52 are further moved rearward. When the lifting/lowering sliders 52 are further moved rearward, the shaft portions 48b of the hold-down members 47 supported on each of the right and left sides of the stocker 41 are relatively moved in the lower side tilt portion 58d of the duel purpose cam groove 58 to reach the front end of the duel purpose groove 58 of each lifting/lowering slider 52 (see FIG. 67). Accordingly, the hold-down members 47 are not moved in the vertical direction and thereby the chucking member 31 is held at the movement end on the upper side.

Figure 67:
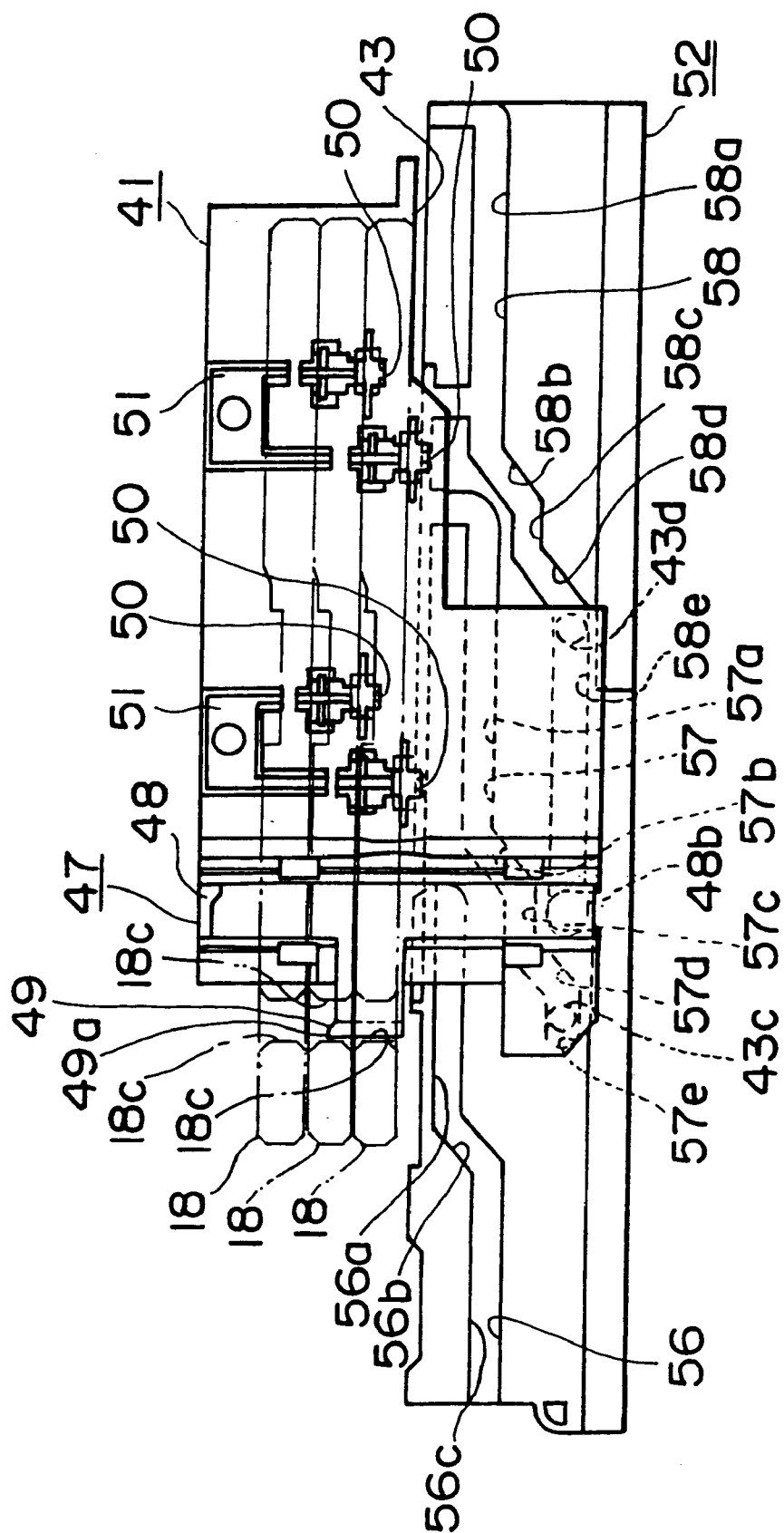

On the other hand, when the lifting/lowering sliders 52 are further moved rearward, the pins 43c and 43d to be supported, on each of the side surfaces, of the stocker 41 are relatively moved to the lower side horizontal portions 57e and 58e via the intermediate horizontal portions 57c and 58c and the lower side tilt portions 57d and 58d of the cam groove 57 for the stocker and the duel purpose cam groove 58 of each lifting/lowering slider 52 (see FIG. 67). Accordingly, the stocker 41 is located at a further lower position, and the sub-tray 18 contained in the first containing portion 41a is position on the rear side of the main tray 8. When the sub-tray 18 contained in the first containing portion 41a is positioned on the rear side of the main tray 8, the connecting portions 17c of the rack members 17 are connected to the connecting grooves 18c of the sub-tray 18 contained in the first containing portion 41a.

Figure 68:
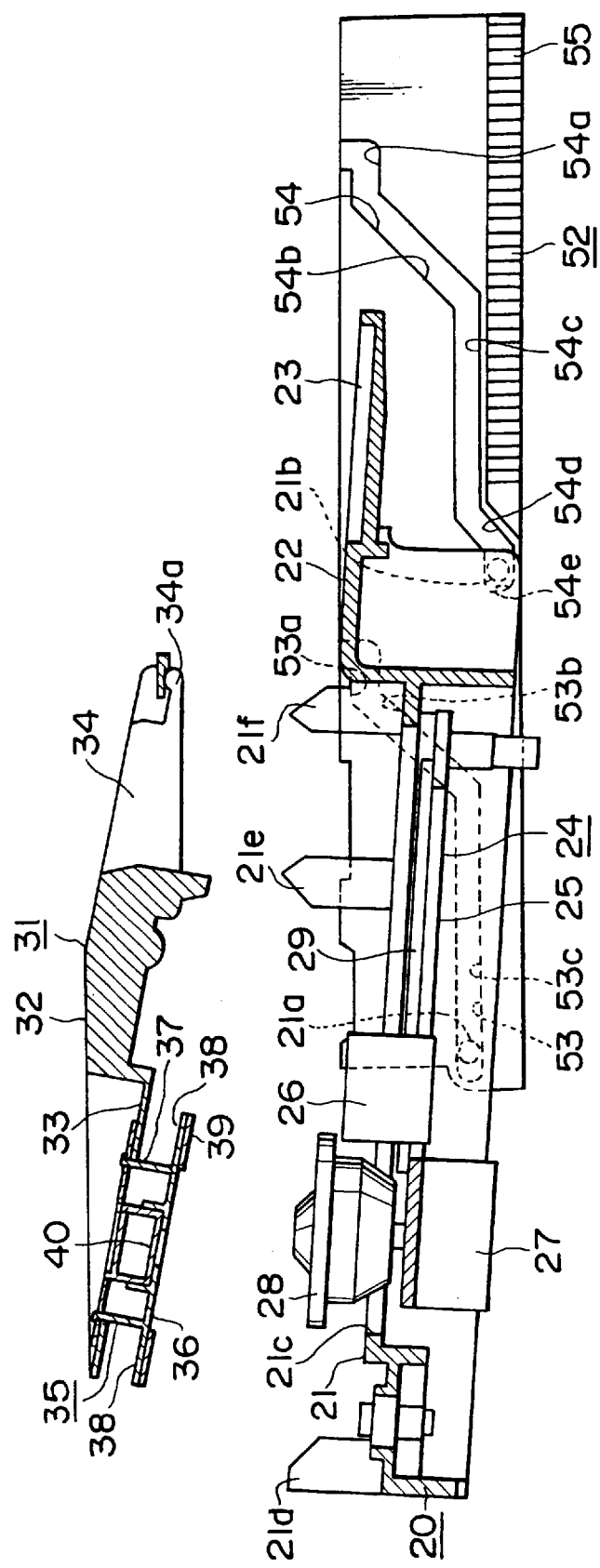

Along with the rearward movement of the lifting/lowering sliders 52, the pin 21a to be supported, on each of the side surfaces of the unit holder 20, is relatively moved forward in the lower side horizontal portion 53c of the cam groove 53 (for the unit holder) of each lifting/lowering slider 52, and the pin 21b to be supported, on each of the side surfaces of the unit holder 20, is moved from the lower side horizontal portion 54c to the lowermost portion 5e via the lower side tilt portion 54d of the cam groove 54 (for the unit holder) of each lifting/lowering slider 52. Accordingly, the unit holder 20 is tilted rearward, downward (see FIG. 68).

Since the unit holder 20 is tilted rearward, downward as described above, the stocker 41 moving down is not brought into contact with the unit holder 20. As a result, it is possible to realize the suitable downward movement of the stocker 41.

On the other hand, the switching gear 63 is rotated by rotation of the cam gear 74, and when the pins 43c and 43d, on each of the right and left sides of the stocker 41, are relatively moved in the lower side horizontal portions 57e and 58e of the cam groove 57 for the stocker and the duel purpose cam groove 58 of each lifting/lowering slider 52, respectively, the first operating piece 63a is brought into contact with the first switch 61 to turn on the first switch 61, with the second switch 62 left turned off.

Figure 69:
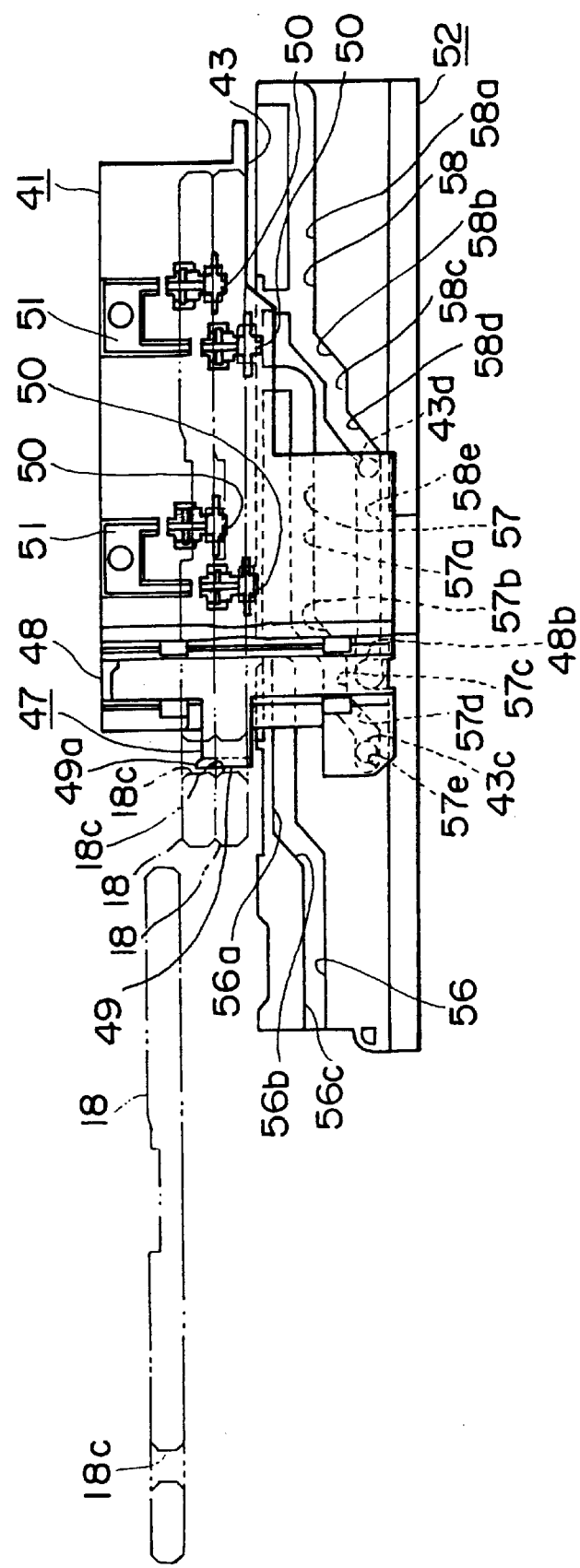

At this time, the rotation of the drive motor 67 is once stopped, and when the drive motor 67 is rotated in the direction reversed to the one direction, the sub-tray 18 contained in the first containing portion 41a of the stocker 41 is pulled out of the stocker 41 and is moved to the disc mounting position (see FIG. 69).

Figure 66:
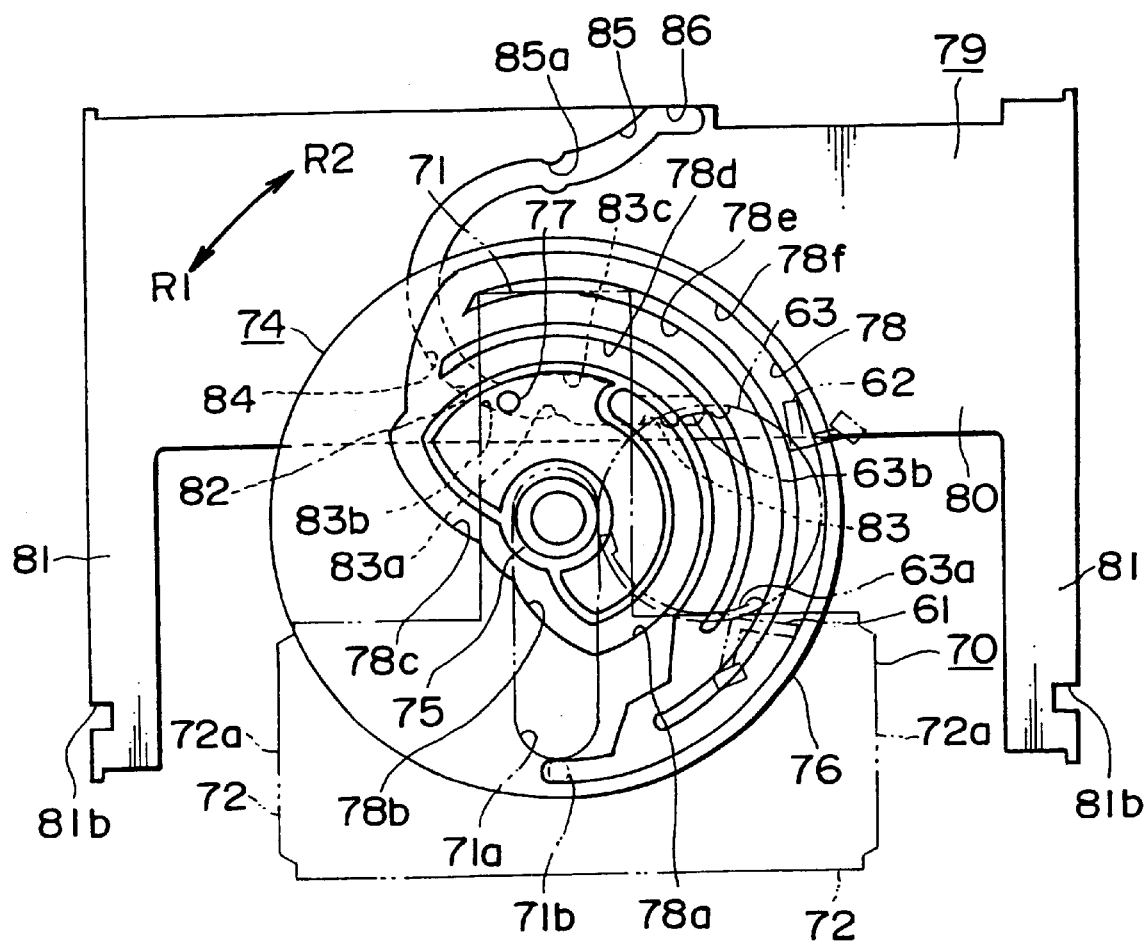

To be more specific, when the drive motor 67 is rotated in the direction reversed to the one direction, the cam gear 74 is rotated in the R2 direction shown in FIG. 66, so that the engagement pin 77 of the cam gear 74 presses forward the inner surface of the starting end portion 83 of the cam groove portion 82 of the slider 79 for movement. Accordingly, the slider 79 for movement is moved forward, and thereby the rack members 17 are fed forward, with a result that the sub-tray 18 is moved forward to the disc mounting position (see FIG. 69). When the sub-tray 18 reaches the disc mounting position, the sub-tray 18 is locked with the main tray 8 by the lock levers 15.

Figure 70:
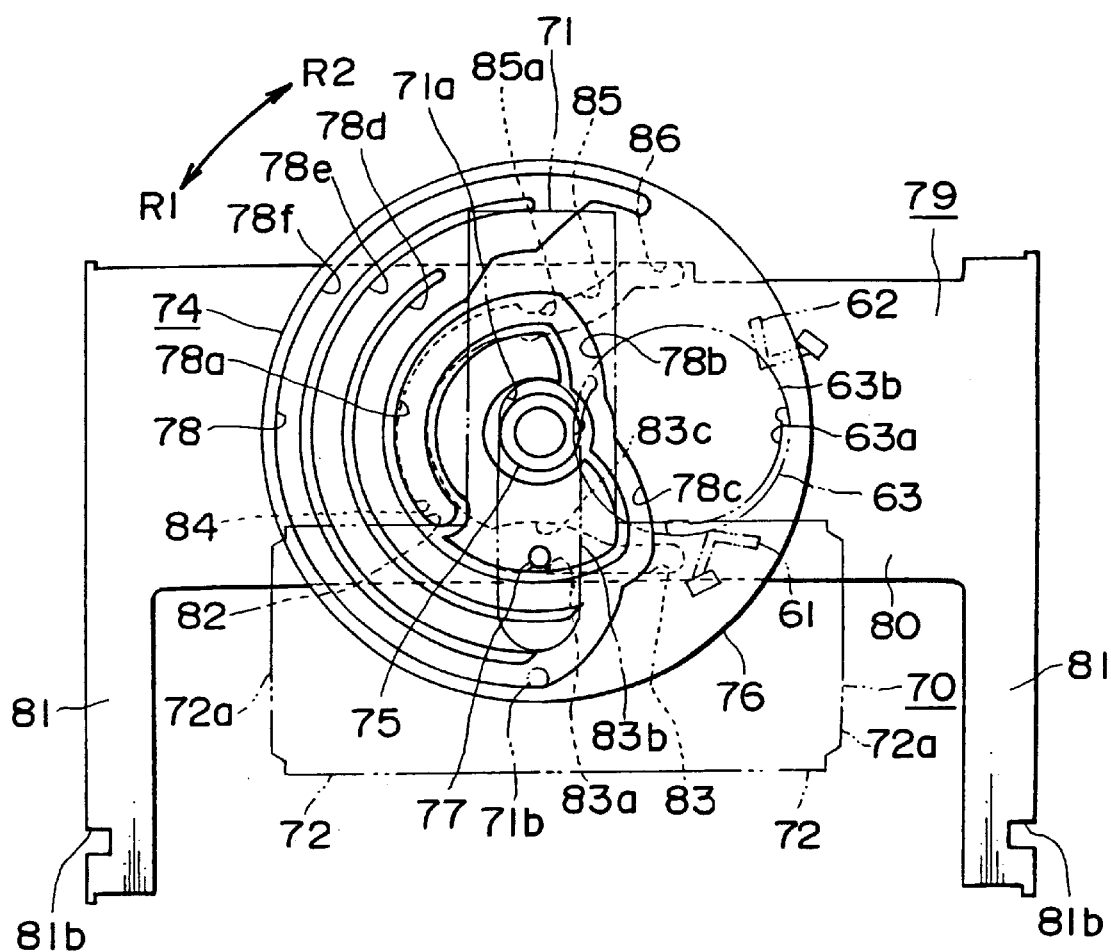

When the sub-tray 18 reaches the disc mounting position, the engagement projections 71b of the drive force transmission slider 70 is positioned at the starting end of the third circular-arc portion 78f of the cam groove 78 (see FIG. 70).

When the sub-tray 18 is moved rearward from the disc mounting position and contained in the third containing portion 41c of the stocker 41, the drive motor 67 is once stopped and is then rotated in the direction reversed to the one direction. At this time, like the above-described operation, the engagement pin 77 presses forward the inner surface of the starting end portion 83 of the cam groove portion 82 of the slider 79 for movement, so that the slider 79 for movement is moved forward and thereby the sub-tray 18 contained in the third containing portion 41c is moved again to the disc mounting position. When the sub-tray 18 reaches the disc mounting position, the engagement pin 71b of the drive force transmission slider 70 is positioned at the starting end of the first circular-arc portion 78d of the cam groove 78.

Even if either of the sub-trays 18 contained in the first, second, and third containing portions 41a, 41b and 41c of the stocker 41 is moved to the disc mounting position, when the drive motor 67 is further moved in the direction reversed to the one direction, the cam gear 74 is rotated in the R2 direction, so that the engagement pin 77 of the cam gear 74 is relatively moved in the front side circular-arc portion 84 of the cam groove portion 82 of the slider 79 for the movement. Accordingly, the slider 79 for movement is not moved in the longitudinal direction and thereby the main tray 8 and the sub-tray 18 are held at the disc mounting positions.

On the other hand, when the drive motor 67 is further rotated in the direction reversed to the one direction, the cam gear 74 is rotated, so that the engagement projection 71b of the drive force transmission slider 70 is relatively moved in the second unit lifting/lowering portion 78c of the cam groove 78 toward the first unit lifting/lowering portion 78b, with a result that the drive force transmission slider 70 is moved rearward and the lifting/lowering sliders 52 are moved forward. When the lifting/lowering sliders 52 are moved forward, the shaft portions 48b of the hold-down members 47 supported by each of the right and left sides of the stocker 41 are moved in the lower side horizontal portion 58e of the duel purpose cam groove 58 of each lifting/lowering slider 52. Accordingly, the chucking member 31 is held on the upper side.

On the other hand, when the lifting/lowering sliders 52 are moved forward, the pins 43c and 43d to be supported, on each of the side surfaces, of the stocker 41 are relatively moved from the lower side horizontal portions 57e and 58e to the upper side horizontal portions 57a and 58a of the cam groove 57 for the stocker and the duel purpose cam groove 58 of each lifting/lowering slider 52. Accordingly, the stocker 41 is moved to the upper end of the movement range thereof, and the third containing portion 41c is positioned on the rear side of the main tray 8. At this time, the pin 21a to be supported, on each of the side surfaces of the unit holder 20, is relatively moved in the lower side horizontal portion 53c of the cam groove 53 (for the unit holder) of each lifting/lowering slider 52, while the pin 21b to be supported, on each of the side surfaces of the unit holder 20, is moved from the lowermost portion 54e to the lower side horizontal portion 54c of the cam groove 54 (for the unit holder) of each lifting/lowering slider 52. Accordingly, the unit holder 20, which has been tilted rearward, downward, is held in the horizontal state.

Figure 71:
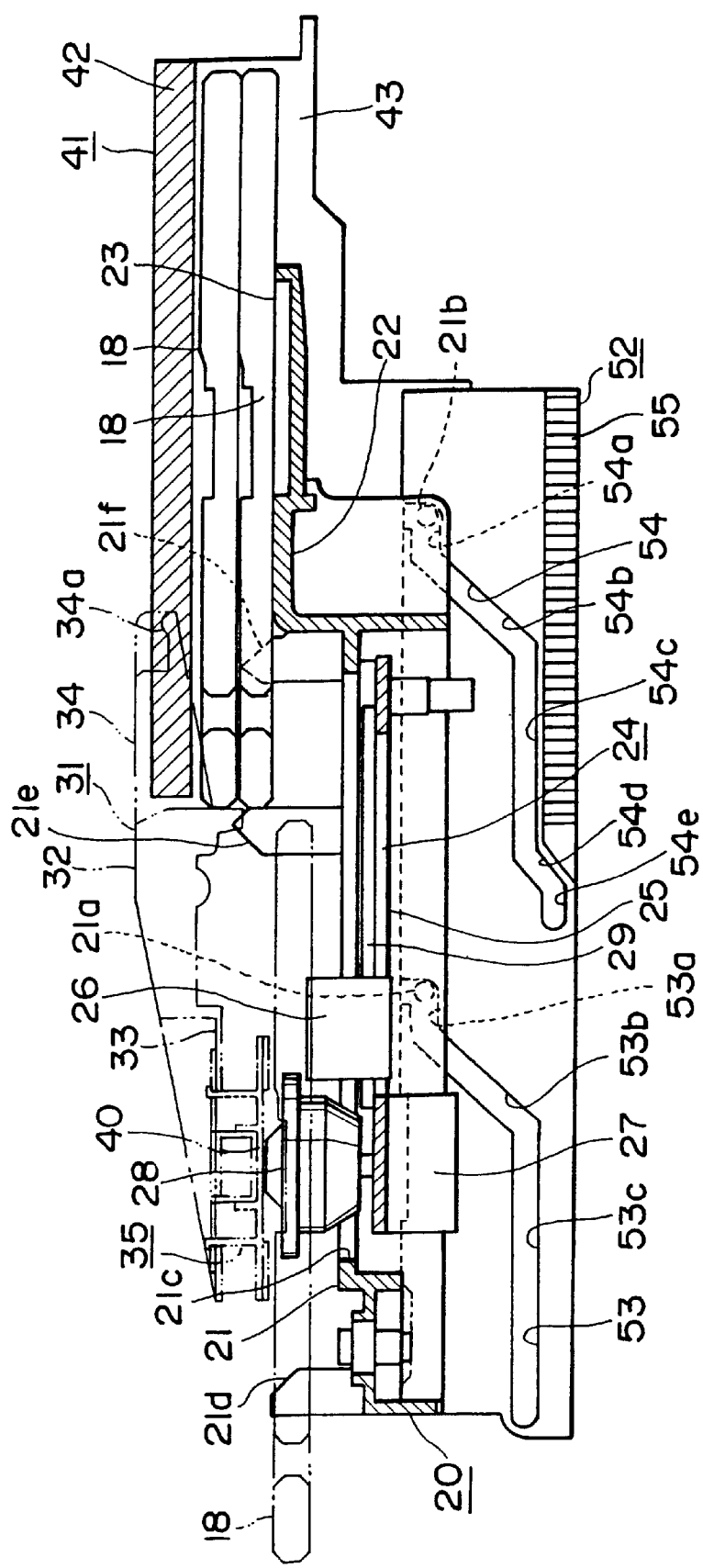

The lifting/lowering sliders 52 are further moved forward, and the pins 21a and 21b to be supported, on each of the side surfaces, of the unit holder 20 are relatively moved from the lower side horizontal portions 53c and 54c to the upper side horizontal portions 53a and 54a via the tilt portions 53b and 54b of the cam grooves 53 and 54 (for the unit holder) of each lifting/lowering slider 52, with a result that the unit holder 20 is lifted (see FIG. 71). The shaft portions 48b of the hold-down members 47 supported by each of the right and left sides of the stocker 41 are moved from the lower side horizontal portion 58e to the upper side horizontal portion 58a of the duel purpose cam groove 58 of each lifting/lowering slider 52, and thereby the chucking member 31 is turned in the direction where the front end portion thereof is moved down.

Accordingly, when the disc-like recording medium is in the state being mounted on the sub-tray 18 having been moved to the disc mounting position, the disc-like recording medium is chucked by the disc table 28 and the chucking pulley 35 (see FIG. 71).

Figure 23:
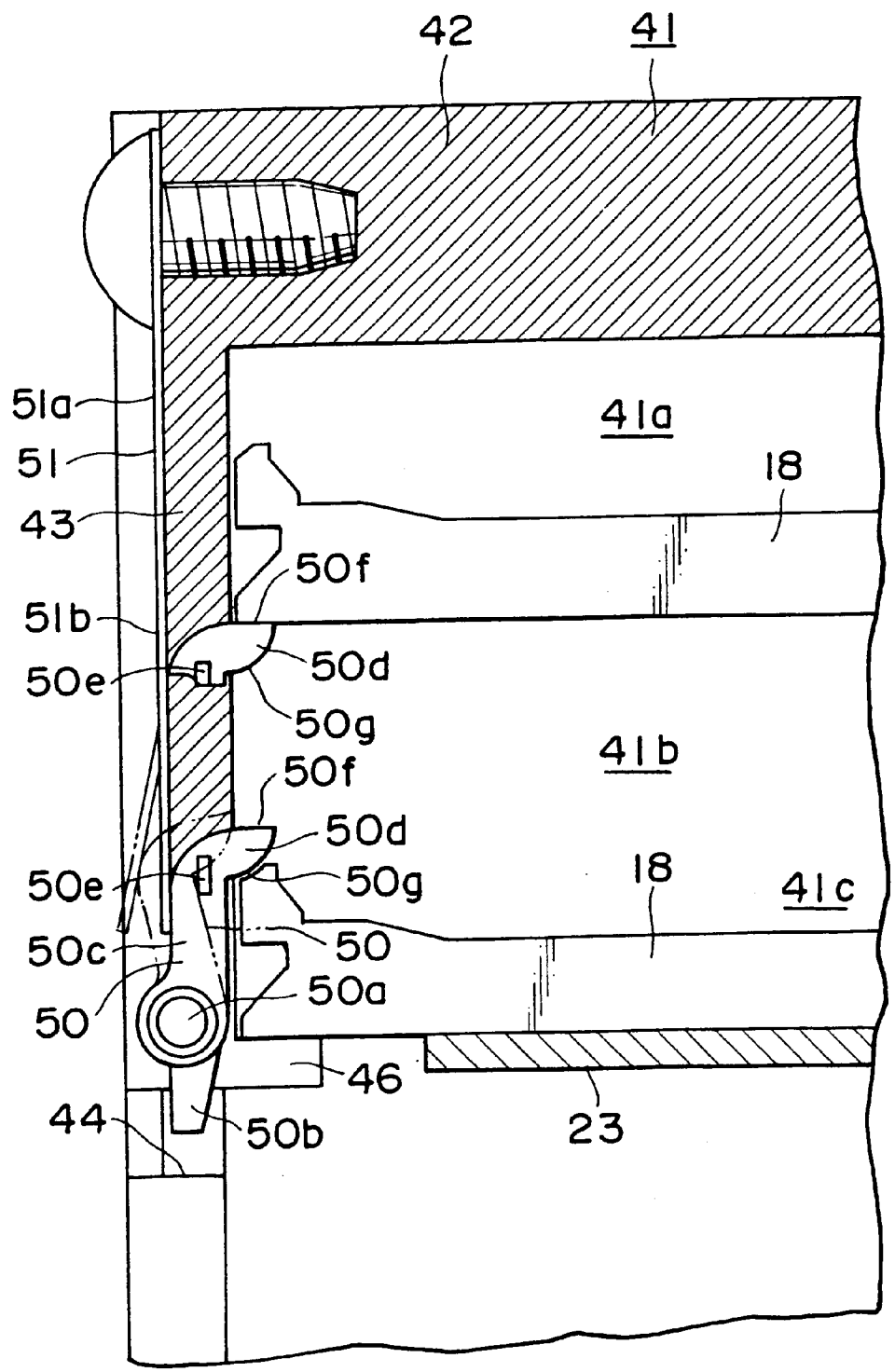
Figure 24:
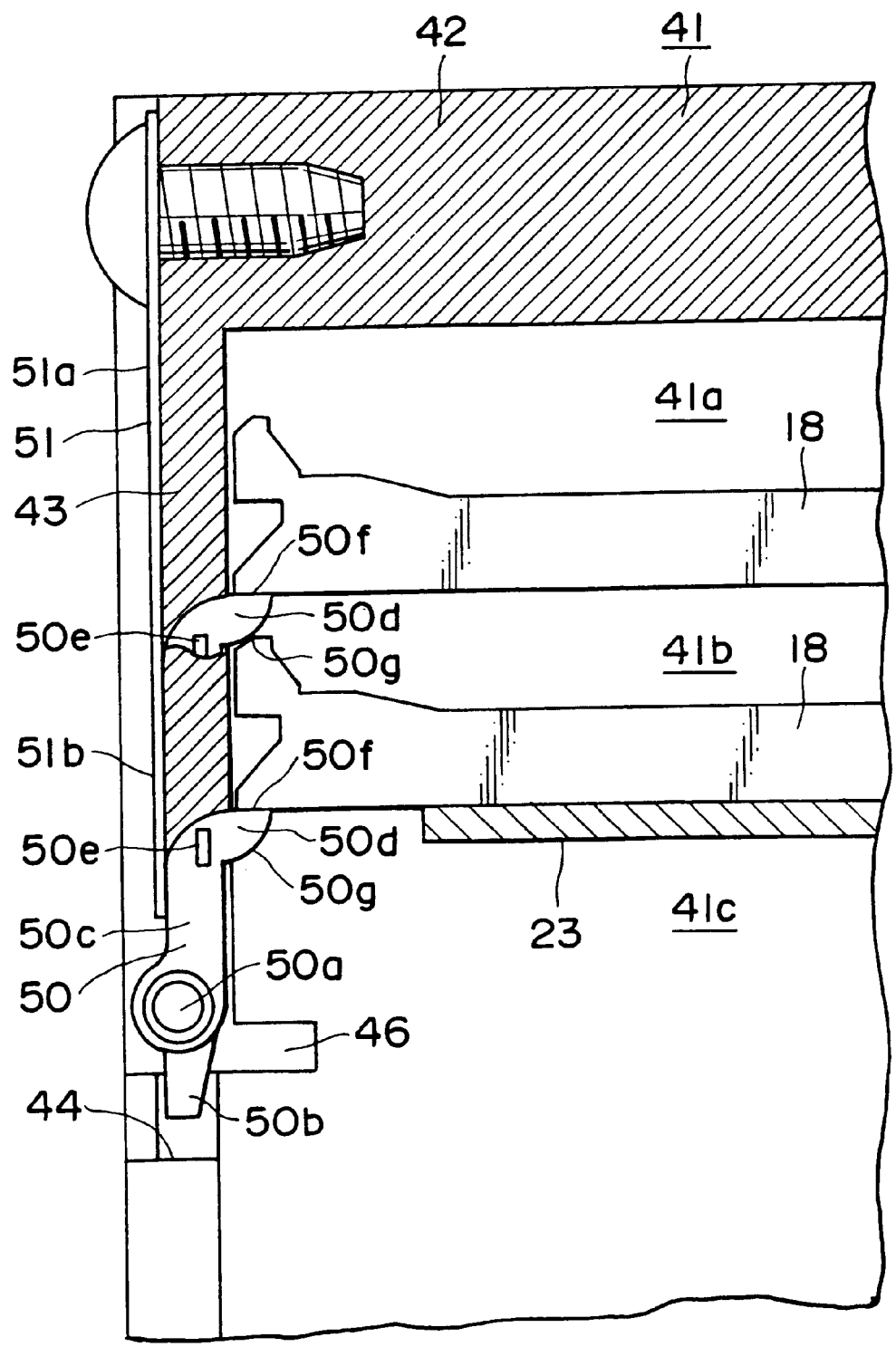

When the unit holder 20 is lifted, as described above, the sub-tray 18 is held in the third containing portion 41c, and simultaneously, if the sub-tray 18 is not held in either the first containing portion 41a or the second containing portion 41b, the sub-tray 18 is lifted up by the lift-up portions 23 of the unit holder 20, whereby the third containing portion 41c is opened (see FIGS. 23, 24 and 71). Accordingly, when the sub-tray 18 is contained from the disc mounting position into the stocker 41, the sub-tray 18 is usually contained in the third containing portion 41c.

Along with the rotation of the cam gear 74, the engagement projection 71b of the drive force transmission slider 70 is relatively moved in the second unit lifting/lowering portion 78c of the cam groove 78, and when the unit holder 20 reaches the upper end, the engagement projection 71b is positioned at the intersection between the first unit lifting/lowering portion 78b and the second unit lifting/lowering portion 78c (see FIG. 55). Accordingly, the lifting/lowering sliders 52 are no longer moved forward, and located at the front ends of the movement ranges thereof.

When the disc-like recording medium is chucked between the disc table 28 and the chucking pulley 35 as described above, the disc-like recording medium thus chucked is rotated by rotation of the spindle motor 27, and information signals recorded on the disc-like recording medium are reproduced by drive of the optical pickup 26.

On the other hand, when the switching gear 63 is rotated by rotation of the cam gear 74 and the disc-like recording medium is chucked, the first and second operating pieces 63a and 63b do not operate the first and second switches 61 and 62 so that the first and second switches 61 and 62 are left turned off (see FIG. 55), which detects that the disc-like recording medium is located at the reproducing position.

When the unit holder 20 reaches the upper end and the drive motor 67 is rotated in the direction reversed to the one direction, the cam gear 74 is rotated, so that the engagement pin 77 of the cam gear 74 is relatively moved in the front side circular-arc portion 84 of the cam groove portion 82 of the slider 79 for movement. As a result, the slider 79 for movement is not moved in the longitudinal direction and thereby the main tray 8 and the sub-tray 18 are held at the disc mounting position.

Along with the rotation of the cam gear 74, the engagement projection 71b of the drive force transmission slider 70 is relatively moved in the first unit lifting/lowering portion 78b toward the non-operational portion 78a of the cam groove 78, and thereby the drive force transmission slider 70 is moved forward and the lifting/lowering sliders 52 are moved rearward. When the lifting/lowering sliders 52 are moved rearward, the shaft portions 48b of the hold-down members 47 supported by each of the right and left sides of the stocker 41 are moved from the upper side horizontal portion 58a to the lower side horizontal portion 58e of the duel purpose cam groove 58 of each lifting/lowering slider 52 (see FIG. 56). Accordingly, the hold-down members 47 are moved down and thereby the chucking member 31 is turned in the direction where the chucking member 31 is separated from the disc table 28, to thereby release the chucking of the disc-like recording medium.

On the other hand, even when the lifting/lowering sliders 52 are moved rearward, since the pins 43c and 43d to be supported, on each of the side surfaces, of the stocker 41, are relatively moved in the upper side horizontal portions 57a and 58a of the cam groove 57 for the stocker and the duel purpose cam groove 58 of each lifting/lowering slider 52, respectively, the lifting/lowering sliders 52 are not moved in the vertical direction but are held at the upper movement ends.

Along with the rearward movement of the lifting/lowering sliders 52, the pins 21a and 21b to be supported, on each of the side surfaces, of the stocker 41 are relatively moved from the upper side horizontal portions 53c and 54c to the lower side horizontal portions 53a and 54a via the tilt portions 53b and 54b of the cam grooves 53 and 54 (for the unit holder) of each lifting/lowering slider 52. Accordingly, the unit holder 20 is lowered.

Along with the rotation of the cam gear 74, the engagement projection 71b of the drive force transmission slider 70 is relatively moved in the first unit lifting/lowering portion 78c of the cam groove 78, and when the unit holder 20 is lowered, the engagement projection 71b is relatively moved to the intersection between the first unit lifting/lowering portion 78c and the non-operational portion 78a (see FIG. 50).

On the other hand, the switching gear 63 is rotated by rotation of the cam gear 74, and when the unit holder 20 is lowered, the first switch 61 is turned off and the second switch 62 is brought into contact with the first operating piece 63a to be turned on (see FIG. 50).

When the drive motor 67 is further rotated in the direction reversed to the one direction in the state that the main tray 8 and the sub-tray 18 are located at the disc mounting position, the cam gear 74 is rotated, so that the engagement pin 77 of the cam gear 74 is moved from the rear side circular-arc portion 85 to the trailing end portion 86 of the cam groove portion 82 of the slider 79 for movement while pressing the inner surfaces of the portions 85 and 86 forward, with a result that the slider 79 for movement is moved forward. At this time, the second side surface gears 89 are meshed with the rear end portions of the rack portions 17d of the rack members 17, so that the second side surface gears 89 are rotated and thereby the rack members 17 are fed forward. Subsequently, the second side surface gears 89 are meshed with the rack portions 14a of the main tray 8, whereby the main tray 8 is moved, together with the sub-tray 18, to the pull-out position (see FIG. 45).

Even when the cam gear 74 is rotated as described above, since the engagement projection 71b of the drive force transmission slider 70 is relatively moved in the non-operational portion 78a of the cam groove 78, the drive force transmission slider 70 is not moved in the longitudinal direction. Accordingly, the positions of the unit holder 20, the chucking member 31, and the stocker 41 are not changed.

When the slider 79 for movement is moved forward, the engagement pin 77 of the cam gear 74 presses the inner surface of the trailing end portion 86 of the cam groove portion 82 of the slider 79 for movement, and accordingly, when the main tray 8 reaches the pull-out position, the engagement pin 77 is positioned in the trailing end portion 86 (see FIG. 48). Further, when the main tray 8 reaches the pull-out position, the engagement projection 71b of the drive force transmission slider 70 is positioned at the starting end of the non-operational portion 78a of the cam groove 78 (see FIG. 48).

On the other hand, when the switching gear 63 is rotated by rotation of the cam gear 74 and the main tray 8 reaches the pull-out position, the first and second operating pieces 63a and 63b are brought into contact with the second and first switches 62 and 61 to turn on the second and first switches 62 and 61, respectively.

As described above, according to the disc changer apparatus 1, the sub-tray 18 having been moved rearward from the disc mounting position is usually contained in the third containing portion 41c of the stocker 41.

Accordingly, unlike the related art disc changer apparatus in which a stocker is lifted/lowered to contain a tray in an empty containing portion, it is possible to eliminate the need of provision of a specialized lifting/lowering mechanism, a sensor for detecting an empty containing portion, and the like, and hence to correspondingly reduce the number of parts. This is advantageous in reducing the production cost.

Since the three sub-trays 18 can be stacked in the stocker 41 without use of roulette type trays serving as a stocker in consideration of reduction in the number of parts, the disc changer apparatus 1 can be miniaturized.

According to the disc changer apparatus 1, the movement of the main tray 8 and the sub-tray 18, the lifting/lowering of the unit holder 20, the turning of the chucking member 31, the lifting/lowering of the stocker 41, and the upward movement of the two sub-trays 18 contained in the stocker 41 are made by using one drive motor 67, it is possible to further reduce the number of parts.

As described above, when the sub-tray 18 is moved from the disc containing position to the disc mounting position, the slider 79 for movement is moved from the rear side to an approximately central portion in the longitudinal direction (hereinafter, referred to as "neutral area"). On the contrary, when the main tray 8 is moved from the main tray pull-out position to the disc mounting position, the slider 79 for movement is moved from the front side to the neutral area.

Figure 72:
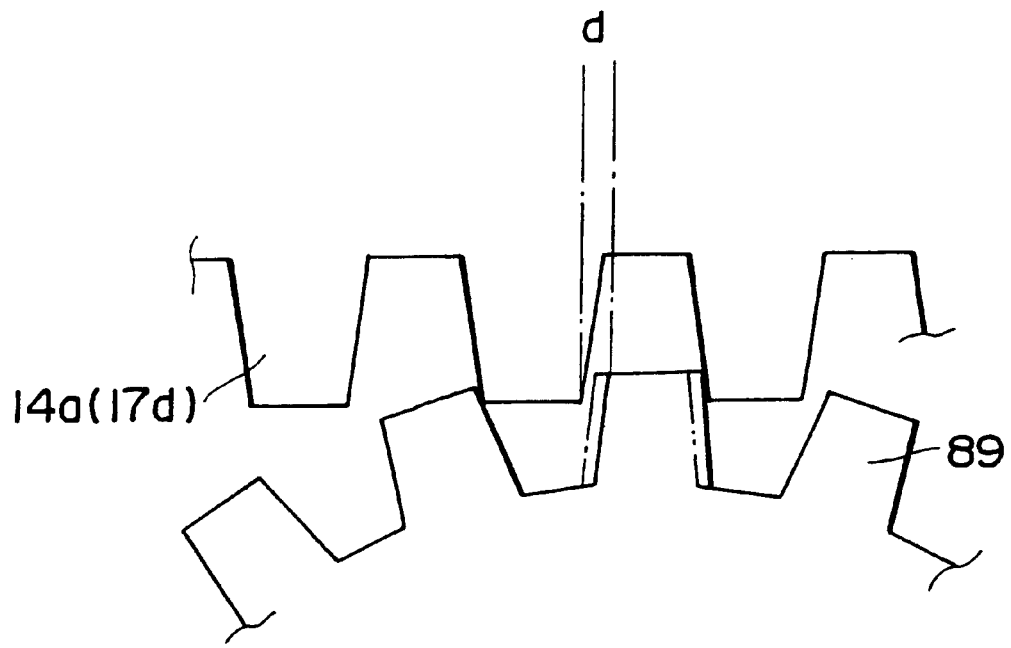
Figure 73:
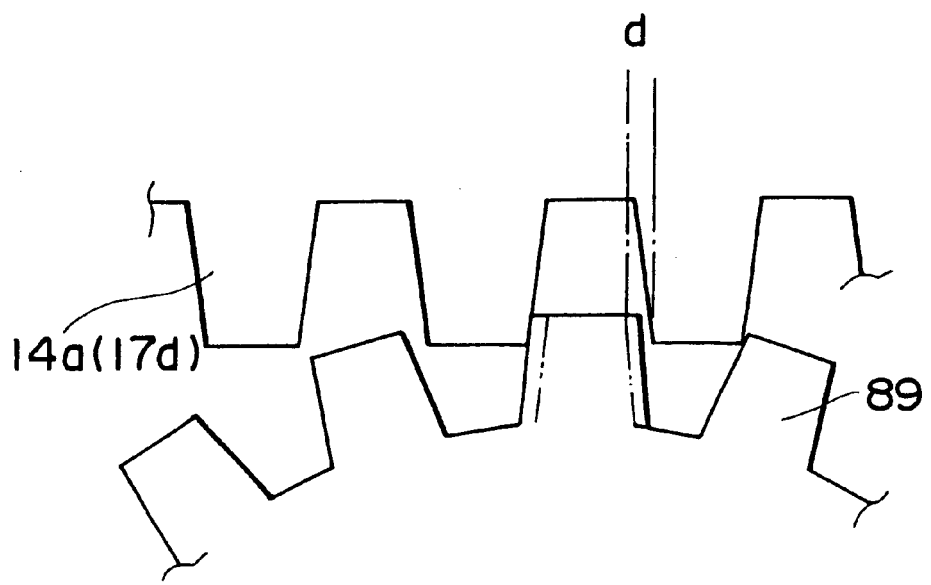

The above-described neutral area will be more fully described below. When the sub-tray 18 or the main tray 8 is moved, the second side surface gears 89 meshed with the rack portions 17d of the rack members 17 supported by the main tray 8 or the rack portions 14a of the main tray 8 are rotated, and in this case, as shown in FIGS. 72 and 73, a backlash "d" occurs between each gear tooth and the corresponding rack tooth. As a result, a slight deviation occurs between a longitudinal central position where the slider 79 for movement, which has been moved from the rear side, is stopped and a longitudinal central position where the slider 70 for movement, which has been moved from the front side, is stopped. That is, the slider 79 for movement is stopped at a position in a specific range defined as the neutral area. As shown in FIGS. 72 and 73, it is ideal that the rack member 17 or the main tray 8 be stopped in a state that each of the gear teeth of the second side surface gear 89 be located at a position shown by a two-dot chain line; however, it is difficult to realize such an ideal state from the viewpoint of gear mechanism.

For this reason, as described above, according to the disc changer apparatus 1, the positional deviation due to backlash is adjusted by the first projection 83a and the second projection 85a provided on the cam groove portion 78 of the slider 79 for movement.

To be more specific, when the sub-tray 18 is moved from the disc containing position to the disc mounting position, the engagement pin 77 of the cam gear 74, which has been moved from the starting end portion 83 to the front side circular-arc portion 84, runs over the first projection 83a, so that the slider 79 for movement is moved forward by an amount corresponding to the projecting amount of the first projection 83a. As a result, the sub-tray 18, which has been moved from the disc containing position to the disc mounting position, is moved forward by the amount corresponding to the projecting amount of the first projection 83a, to certainly reach the disc mounting position.

On the other hand, when the main tray 8 is moved from the main tray pull-out position to the disc mounting position, the engagement pin 77 of the cam gear 74, which has been moved from the rear side circular-arc portion 85 to the front side circular-arc portion 84, runs over the second projection 85a, so that the slider 79 for movement is moved rearward by an amount corresponding to the projecting amount of the second projection 85a. As a result, the main tray 8, which has been moved from the main tray pull-out position to the disc mounting position, is moved rearward by the amount corresponding to the projecting amount of the second projection 85a, to certainly reach the disc mounting position.

The projecting amount of each of the first and second projections 83a and 85a is required to be equal to or more than one-half the backlash "d".

According to the disc changer apparatus 1, the relay board 91 is mounted on the back surface of the front end portion of the housing 2, wherein the control circuit board 90 is connected to the relay board 91 via the flexible board 92 and the relay board 91 is connected to the main board, which is used for performing overall control of the acoustic equipment 100, via another flexible printed board led from the relay board 91.

Since the control circuit board 90 is connected to the main board via the relay board 91, a vibration system generated from the base unit 24 or the like at the time of reproducing the disc-like recording medium is ended in the disc changer apparatus 1, and is less affected by another flexible printed board led from the relay board 91 and connected to the main board.

Figure 76:
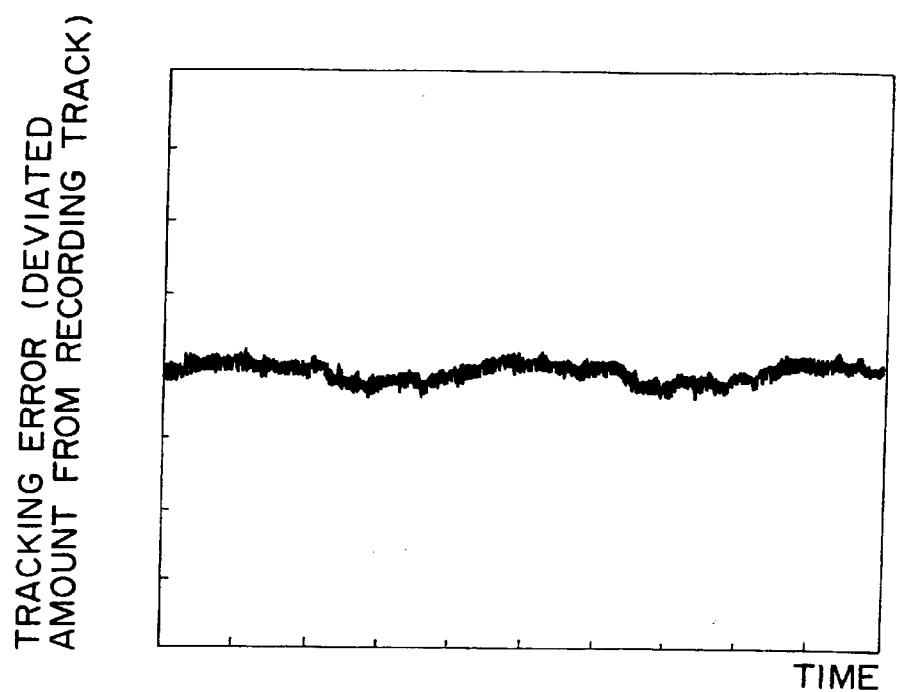
FIG. 76 is a graph, similar to FIG. 74, wherein values measured at an intermediate portion between the inner peripheral portion and an outer peripheral portion of the disc-like recording medium are shown.

FIGS. 74 and 76 are graphs showing an experimental example performed in the case where the control circuit board 90 is connected to the main board via the relay board 91, wherein FIG. 74 shows values measured at an inner peripheral portion of a disc-like recording medium, and FIG. 76 shows values measured at an intermediate portion between the inner peripheral portion and an outer peripheral portion of the disc-like recording medium.

Figure 77:
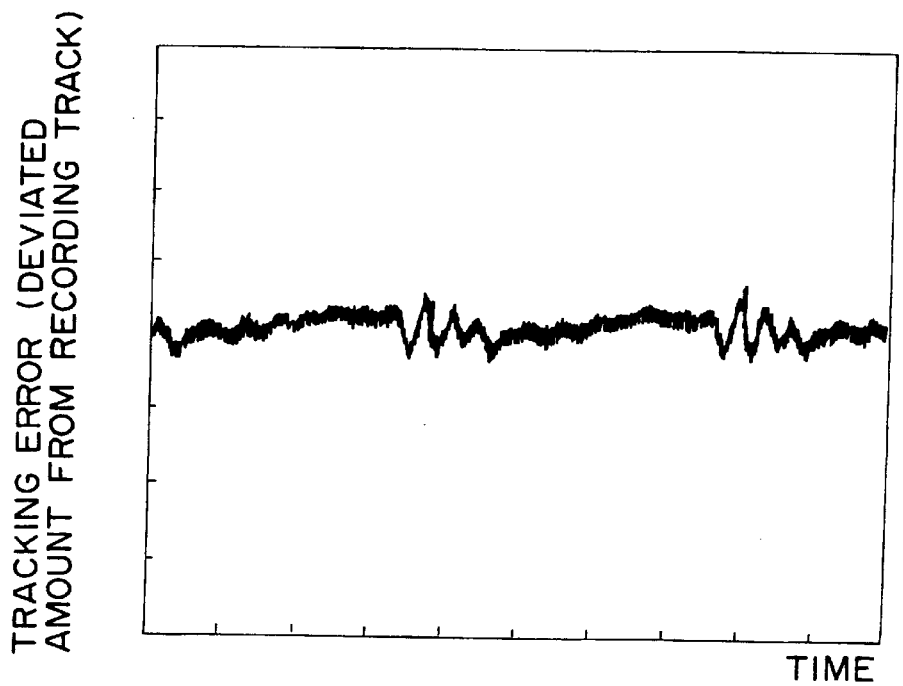
FIG. 77 is a graph, similar to FIG. 75, wherein values measured at an intermediate portion between the inner peripheral portion and an outer peripheral portion of the disc-like recording medium are shown.

FIGS. 75 and 77 are graphs showing an experimental example performed in the case where a circuit board provided in the disc changer apparatus is directly connected to the main board provided outside the disc changer apparatus not via the relay board 91, wherein FIG. 75 shows values measured at an inner peripheral portion of a disc-like recording medium, and FIG. 77 shows values measured at an intermediate portion between the inner peripheral portion and an outer peripheral portion of the disc-like recording medium.

In the figures, the ordinate designates a tracking error (deviated amount from a recording track), and the abscissa designates time. As the deviated amount on the ordinate becomes large, there occurs an inconvenience, for example, a so-called sound skip due to a tracking error.

As shown in FIGS. 74 to 77, it is revealed that in the case of providing the relay board 91, the deviated amount from the recording track becomes small, thereby optimizing the reproducing operation of signals recorded on the disc-like recording medium.

According to this embodiment, the sub-tray 18 in the stocker 41 is lifted up by the lift-up portions 23 so that the lowermost containing portion 41c is taken as a containing portion in which the next sub-tray 18 is to be contained; however, the present invention is not limited thereto. For example, the sub-tray 18 in the stocker 41 may be pushed down so that the uppermost containing portion 41a be taken as a containing portion in which the next sub-tray 18 is to be contained.

While the embodiment of the present invention has been described using specific terms, such description is for illustrative purposes only, and it is to be understood that changes and variations may be made without departing from the spirit or scope of the following claims.

What is claimed is:

1. A disc changer apparatus comprising:

a disc table rotating together with a disc mounted thereon;

reproducing means for reproducing information from a disc rotating together with said disc table;

a first tray for carrying a disc mounted thereon between a loading position at which a disc is loaded and a mounting position at which a disc is mounted on said disc table and between said disc mounting position and a containing position at which a disc is contained;

a second tray which is engaged with said first tray for carrying said first tray between said disc loading position and said disc mounting position;

containing means for stacking and containing a plurality of said first trays in a stacking direction substantially perpendicular to principal planes of discs mounted on said first trays;

moving means for moving at least one of said first trays contained in said containing means in one direction based on said stacking direction, to form a containing space for containing said first tray located at said disc mounting position on the side, opposed to the side of said one direction, of said containing means;

a chucking portion for holding a disc mounted on said disc table in cooperation with said disc table;

movement control means for moving said disc table in the direction where said disc table comes closer to a disc mounted on said first tray engaged with and held by said second tray at said disc mounting position, and moving said chucking portion disposed opposite to said disc table with the disc put therebetween in the direction where said chucking portion comes closer to the disc, thereby chucking the disc between said disc table and said chucking portion; and a positioning projection which is moved together with said disc table moved by said movement control means to be inserted in holes formed in said first and second trays located at said disc mounting position.

2. A disc changer apparatus according to claim 1, further comprising:

a first tray positioning projection which is moved together with said disc table moved by said movement control means to be inserted in holes formed in said first trays contained in said containing means.

3. A disc changer apparatus according to claim 1, wherein said movement means comprises:

pressing means moved together with said disc table moved by said movement control means;

wherein said pressing means presses, along with movement of said chucking portion, at least one of said first trays contained in said containing means in said one direction based on said stacking direction, to move said at least one first tray, thereby forming a containing space for containing said first tray located at said disc mounting position on the side, opposed to the side of said one direction, of said containing means.

4. A disc changer apparatus according to claim 3, further comprising:

restricting means for restricting the movement of each of said first trays contained in said containing means in the direction opposed to said one direction based on said stacking direction, said restricting means being escaped from said at least one first tray moved in said one direction by said pressing means.

5. A disc changer apparatus according to claim 4, wherein said restricting means comprises:

a restricting projection turnably provided on a side wall of said containing means, wherein said restricting projection supports a surface, on said pressing means side, of said first tray contained in said containing means, and said restricting projection is brought into contact with part of said first tray moved in said one direction by said pressing means and is turned in one turning direction, whereby said restricting projection is allowed to be escaped from said first tray moved in said one direction by said pressing means; and biasing means for biasing said restricting projection in another turning direction where said restricting projection is turned inwardly of said containing means, wherein after said restricting projection is turned in said one turning direction and is thereby escaped from said first tray, the contact of said restricting projection with said first tray is released by further movement of said first tray in said one direction, and at this time, said restricting projection is turned in said another turning direction by said biasing means, to thereby support again the surface, on said pressing means side, of said first tray contained in said containing means.

6. A disc changer apparatus comprising:

a disc table rotating together with a disc mounted thereon;

reproducing means for reproducing information from a disc rotating together with said disc table;

a chucking portion for holding a disc mounted on said disc table in cooperation with said disc table;

a first tray for carrying a disc mounted thereon between a loading position at which a disc is loaded and a mounting position at which a disc is mounted on said disc table and between said disc mounting position and a containing position at which a disc is contained;

a second tray which is engaged with said first tray for carrying said first tray between said disc loading position and said disc mounting position;

containing means for stacking and containing a plurality of said first trays in a stacking direction substantially perpendicular to principal planes of discs mounted on said first trays;

movement control means for moving said disc table in the direction where said disc table comes closer to a disc mounted on said first tray engaged with and held by said second tray at said disc mounting position, and moving said chucking portion disposed opposite to said disc table with the disc put therebetween in the direction where said chucking portion comes closer to the disc, thereby chucking the disc between said disc table and said chucking portion; and an engagement portion which is moved together with said disc table moved by said movement control means to be engaged with portions formed in said first and second trays located at said disc mounting position.

7. A disc changer apparatus according to claim 6, wherein said engagement portion includes a positioning projection which is moved together with said disc table moved by said movement control means to be inserted in holes formed in said first and second trays located at said disc mounting position.

8. A disc changer apparatus according to claim 7, further comprising:

a first tray positioning projection which is moved together with said disc table moved by said movement control means to be inserted in holes formed in said first trays contained in said containing means.

9. A disc changer apparatus comprising:

a base unit including a disc table rotating together with a disc mounted thereon and reproducing means for reproducing information from a disc rotating together with said disc table;

a sub-tray for carrying a disc mounted thereon between a loading position at which a disc is loaded and a mounting position at which a disc is mounted on said disc table and between said disc mounting position and a containing position at which a disc is contained;

a main tray which is engaged with said sub-tray for carrying said sub-tray between said disc loading position and said disc mounting position;

a stocker lifted or lowered relative to said main tray, said stocker internally having a plurality of containing portions allowed to stack a plurality of said sub-trays in the lifting/lowering direction of said stocker;

a cam gear rotated by a drive motor;

a first slider which is moved, along with rotation of said cam gear, in a carrying direction where said sub-trays are carried so as to carry said main tray and said sub-trays in said carrying direction along with movement of said first slider in said carrying direction;

a second slider having a cam groove formed into a stepped shape in said lifting/lowering direction of said stocker, wherein said second slider is moved in said carrying direction along with rotation of said cam gear so as to control lifting/lowering operations of at least said base unit and said stocker by said cam groove formed in said second slider; and movement means which is lifted or lowered together with said base unit along with movement of said second slider so as to move at least one of said sub-trays contained in said stocker in said lifting or lowering direction to form one containing portion for containing said sub-tray located at said disc mounting position on the side, opposed to the side of said lifting or lowering direction, of said plurality of containing portions.

10. A disc changer apparatus according to claim 9, wherein said cam gear has a cam groove in one surface and an engagement pin on the other surface;

said first slider has a cam groove in which said engagement pin of said cam gear is to be engaged; and said cam groove of said first slider has a first projection for moving, when said sub-tray is moved from said disc containing position to said disc mounting position, said first slider to a first position corresponding to said disc mounting position, and a second projection for moving, when said sub-tray is moved from said disc loading position to said disc mounting position, said first slider to a second position offset to said disc containing position side from said first position corresponding to said disc mounting position.

11. A disc changer apparatus according to claim 9, further comprising:

a housing provided to cover components of said disc changer apparatus;

a control circuit board provided in said housing and having at least a control circuit for controlling said motor;

a relay board provided in said housing and electrically connected to said control circuit board via a flexible board; and a main board provided in said housing, said main board being electrically connected to said relay board via a flexible board so as to control at least power supply to said control circuit board via said relay board.

12. A disc changer apparatus comprising:

a base unit including a disc table rotating together with a disc mounted thereon and reproducing means for reproducing information from a disc rotating together with said disc table;

a chucking member for holding a disc mounted on said disc table in cooperation with said disc table;

a cam gear rotated by a drive motor, said cam gear having a cam groove formed in one surface and an engagement pin formed on the other surface;

a slider for movement having a cam groove, wherein said engagement pin of said cam gear is engaged in said cam groove of said slider for movement, whereby said slider for movement is moved in the longitudinal direction along with rotation of said cam gear;

a gear portion which is meshed with a rack portion formed on said slider for movement and thereby rotated along with movement of said slider for movement;

a main tray having a rack portion meshed with said gear portion, wherein said main tray is moved in the longitudinal direction along with rotation of said gear portion;

a sub-tray having a disc mounting portion on which a disc is to be mounted and a rack portion formed at a position facing to said gear portion, wherein said sub-tray is moved, together with said moving main tray, between a loading position at which a disc is loaded and a mounting position at which a disc is mounted on said disc table, and said sub-tray is singly moved, along with rotation of said gear portion which is meshed with said rack portion of said sub-tray, between said disc mounting position and a containing position at which a disc is contained;

a stocker arranged at said disc containing position, said stocker having a plurality of containing portions for stacking and containing a plurality of said sub-trays in the direction perpendicular to principle planes of discs mounted on said sub-trays;

a drive force transmission slider having an engagement projection, wherein said engagement projection is engaged in said cam groove of said cam gear, whereby said slider is moved in the longitudinal direction along with rotation of said cam gear;

a transmission gear, which is meshed with a rack portion formed on said drive force transmission slider and is rotated along with movement of said drive force transmission slider;

a lifting/lowering slider having a rack portion meshed with said transmission gear, wherein said lifting/lowering slider is moved in the longitudinal direction along with rotation of said transmission gear, to thereby control a lifting/lowering operation of said base unit, a lifting/lowering operation of said chucking member, and a lifting/lowering operation of said stocker;

a unit holder for holding said base unit;

positioning projections provided on said unit holder, wherein when said unit holder is lifted along with movement of said lifting/lowering slider, said positioning projections are engaged in positioning holes of said main tray and said sub-tray at said disc mounting portion and also engaged in positioning holes of said sub-trays contained in said stocker, to thereby hold said main tray and said sub-trays; and a lift-up portion provided on said unit holder, wherein when said unit holder is lifted along with movement of said lifting/lowering slider and thereby one of said plurality of sub-trays contained in said stocker, which are located on the upper side of a lifting/lowering range of said unit holder, is positioned at the lowermost one of said plurality of containing portions, said lift-up portion presses up, from below, said sub-tray positioned at said lowermost containing portion, to ensure said lowermost containing portion as a containing position of said sub-tray located at said disc mounting position.

13. A disc changer apparatus according to claim 12, wherein said cam groove for said slider for movement comprises:

a first projection for moving, when said sub-tray is moved from said disc containing position to said disc mounting position, said slider for movement to a first position corresponding to said disc mounting position; and a second projection for moving, when said sub-tray is moved from said disc loading position to said disc mounting position, said slider for movement to a second position offset to said disc containing position side from said first position corresponding to said disc mounting position, wherein a distance between said first position and said second position is equivalent to a backlash between said gear portion and said rack portion formed on said main tray or said sub-tray.

14. A disc changer apparatus according to claim 12, further comprising:

a housing provided to cover components of said disc changer apparatus;

a control circuit board provided in said housing and having at least a control circuit for controlling said motor;

a relay board provided in said housing and electrically connected to said control circuit board via a flexible board; and a main board provided in said housing, said main board being electrically connected to said relay board via a flexible board so as to control at least power supply to said control circuit board via said relay board.

15. A disc changer apparatus according to claim 12, further comprising:

restricting means for restricting the movement of said sub-tray contained in each of said containing portions of said stocker in the downward direction, said restricting means being escaped from said sub-tray moved, from below, in the upward direction by said lift-up portion;

wherein said restricting means comprises:

a restricting projection turnably provided on a side wall portion of said stocker, wherein said restricting projection supports a back surface of said sub-tray contained in said containing portion, and said restricting projection is pressed, from below, in the upward direction by part of an upper side portion of said sub-tray lifted, from below, in the upward direction by said lift-up portion, to be thereby turned in one turning direction and is escaped from said sub-tray; and biasing means for biasing said restricting projection in another turning direction where said restricting projection is turned inwardly of said stocker, wherein after said restricting projection is turned in said one turning direction and is thereby escaped from said sub-tray, the pressing of said restricting projection with said sub-tray is released by further movement of said sub-tray in the upward direction, and at this time, said restricting projection is turned in said another turning direction by said biasing means, to thereby support said sub-tray contained in said containing portion.

* * * * *